US012658186B2

(12) United States Patent
Makker et al.

(10) Patent No.: US 12,658,186 B2
(45) Date of Patent: Jun. 16, 2026

(54) INTERACTION BETWEEN AN ENCLOSURE AND ONE OR MORE OCCUPANTS

(71) Applicant: View, Inc., Milpitas, CA (US)

(72) Inventors: Tanya Makker, Milpitas, CA (US); Dhairya Shrivastava, Los Altos, CA (US); Mark David Mendenhall, Fremont, CA (US); Stephen Clark Brown, San Mateo, CA (US); Nitesh Trikha, Pleasanton, CA (US); Anurag Gupta, San Jose, CA (US); Ajay Malik, Milpitas, CA (US); Siyao Sui, San Jose, CA (US); Chuqing Wang, San Jose, CA (US); Rao P. Mulpuri, Saratoga, CA (US)

(73) Assignee: View Operating Corporation, San Jose, CA (US)

( * ) Notice: Subject to any disclaimer, the term of this patent is extended or adjusted under 35 U.S.C. 154(b) by 493 days.

(21) Appl. No.: 17/916,986

(22) PCT Filed: Apr. 15, 2021

(86) PCT No.: PCT/US2021/027418
§ 371 (c)(1),
(2) Date: Oct. 4, 2022

(87) PCT Pub. No.: WO2021/211798
PCT Pub. Date: Oct. 21, 2021

(65) Prior Publication Data
US 2023/0132451 A1 May 4, 2023

Related U.S. Application Data

(63) Continuation-in-part of application No. 17/249,148, filed on Feb. 22, 2021, now Pat. No. 11,735,183,
(Continued)

(51) Int. Cl.
*G06T 19/00* (2011.01)
*E06B 3/67* (2006.01)
(Continued)

(52) U.S. Cl.
CPC ............ *G10L 15/22* (2013.01); *E06B 3/6722* (2013.01); *E06B 9/24* (2013.01); *G02F 1/163* (2013.01);
(Continued)

(58) Field of Classification Search
CPC ............ Y10S 715/969; H04M 1/72415; H04L 41/046; H04L 41/0686; H04L 41/069;
(Continued)

(56) References Cited

U.S. PATENT DOCUMENTS

| | | | |
|---|---|---|---|
| 4,864,314 A | 9/1989 | Bond | |
| 4,874,903 A | 10/1989 | Clarke | |

(Continued)

FOREIGN PATENT DOCUMENTS

| | | | |
|---|---|---|---|
| CN | 1267416 A | 9/2000 | |
| CN | 101032052 A | 9/2007 | |

(Continued)

OTHER PUBLICATIONS

AGC, Inc., "AGC completes development of 5G-compatible 'Glass Antenna that adds cellular base station capabilities to windows,'" Press Release, Jun. 3, 2020, 2 pp.
(Continued)

*Primary Examiner* — Dionne Pendleton
(74) *Attorney, Agent, or Firm* — Cha & Reiter, LLC.

(57) ABSTRACT

A network system in an enclosure includes one or more interactive targets such as tintable windows, HVAC components, sensors, computing devices, media display devices, and/or service devices. Diverse types of local and remote interfaces are employed for facilitating remote (e.g., indi-
(Continued)

rect) manipulation of the interactive target(s), for example, using a digital twin (e.g., representative virtual model) of a facility and/or a mobile circuitry of a user. The environment and/or targets may be controlled according to preferences and/or requests of its user(s).

21 Claims, 25 Drawing Sheets

Related U.S. Application Data which is a continuation of application No. 16/096,557, filed on Oct. 25, 2018, now Pat. No. 10,964,320, which is a continuation of application No. PCT/US2017/029476, filed on Apr. 25, 2017, which is a continuation-in-part of application No. 14/391,122, filed on Oct. 7, 2014, now Pat. No. 10,365,531, which is a continuation of application No. PCT/US2013/036456, filed on Apr. 12, 2013, application No. 17/916,986 is a continuation-in-part of application No. 16/946,947, filed on Jul. 13, 2020, now Pat. No. 11,592,723, which is a continuation of application No. 16/462,916, filed on May 21, 2019, now Pat. No. 11,137,659, which is a continuation of application No. 16/082,793, filed on Sep. 6, 2018, now Pat. No. 10,935,864, which is a continuation of application No. PCT/US2017/062634, filed on Nov. 20, 2017, application No. 17/916,986 is a continuation-in-part of application No. 16/950,774, filed on Nov. 17, 2020, now abandoned, which is a continuation of application No. 16/608,157, filed on Oct. 24, 2019, now Pat. No. 11,886,089, which is a continuation of application No. PCT/US2018/029476, filed on Apr. 25, 2018, application No. 17/916,986 is a continuation-in-part of application No. 17/083,128, filed on Oct. 28, 2020, now abandoned, which is a continuation of application No. 16/664,089, filed on Oct. 25, 2019, now Pat. No. 11,294,254, which is a continuation of application No. PCT/US2019/030467, filed on May 2, 2019, and a continuation-in-part of application No. PCT/US2018/029460, filed on Apr. 25, 2018, application No. 17/916,986 is a continuation-in-part of application No. 17/081,809, filed on Oct. 27, 2020, now Pat. No. 11,460,749, which is a continuation of application No. 16/608,159, filed on Oct. 24, 2019, now Pat. No. 11,300,849, which is a continuation of application No. PCT/US2018/029406, filed on Apr. 25, 2018, application No. 17/916,986 is a continuation-in-part of application No. PCT/US2020/053641, filed on Sep. 30, 2020.

(60) Provisional application No. 63/170,245, filed on Apr. 2, 2021, provisional application No. 63/154,352, filed on Feb. 26, 2021, provisional application No. 63/115,842, filed on Nov. 19, 2020, provisional application No. 63/085,254, filed on Sep. 30, 2020, provisional application No. 63/080,899, filed on Sep. 21, 2020, provisional application No. 63/052,639, filed on Jul. 16, 2020, provisional application No. 63/010,977, filed on Apr. 16, 2020, provisional application No. 62/975,706, filed on Feb. 12, 2020, provisional application No. 62/952,207, filed on Dec. 20, 2019, provisional application No. 62/911,271, filed on Oct. 5, 2019, provisional application No. 62/666,033, filed on May 2, 2018, provisional application No. 62/607,618, filed on Dec. 19, 2017, provisional application No. 62/551,649, filed on Aug. 29, 2017, provisional application No. 62/523,606, filed on Jun. 22, 2017, provisional application No. 62/507,704, filed on May 17, 2017, provisional application No. 62/506,514, filed on May 15, 2017, provisional application No. 62/490,457, filed on Apr. 26, 2017, provisional application No. 62/426,126, filed on Nov. 23, 2016, provisional application No. 62/327,880, filed on Apr. 26, 2016, provisional application No. 61/624,175, filed on Apr. 13, 2012.

(51) Int. Cl.
| | |
|---|---|
| *E06B 9/24* | (2006.01) |
| *G02F 1/163* | (2006.01) |
| *G05B 19/418* | (2006.01) |
| *G06F 3/04883* | (2022.01) |
| *G06F 3/04886* | (2022.01) |
| *G06F 3/16* | (2006.01) |
| *G06F 21/32* | (2013.01) |
| *G10L 15/22* | (2006.01) |
| *G10L 15/26* | (2006.01) |

(52) U.S. Cl.
CPC ...... *G06F 3/04883* (2013.01); *G06F 3/04886* (2013.01); *G06F 3/16* (2013.01); *G06F 3/167* (2013.01); *G06F 21/32* (2013.01); *G10L 15/26* (2013.01); *E06B 2009/2464* (2013.01); *G06F 2203/0381* (2013.01); *G10L 2015/223* (2013.01)

(58) Field of Classification Search
CPC ... H04L 41/0853; H04L 41/122; H04L 41/16; H04L 41/22; H04L 41/40; H04L 65/1089; H04L 65/403; H04L 67/10; H04L 67/12; H04L 67/125; H04L 67/131; H04L 12/2814; H04L 12/282; H04L 12/2829; H04L 2012/285; G10L 15/22; G10L 15/26; G10L 2015/223; G10L 2021/02087; G10L 2021/02166; G10L 21/02; G10L 21/0232; G08C 17/02; G08C 2201/40; G08C 2201/93; G08C 23/04; H04Q 9/00; G06T 19/006; G06T 11/206; G06T 13/20; G06T 15/04; G06T 17/05; G06T 17/20; G06T 19/003; G06T 2207/10021; G06T 2207/10028; G06T 2207/20072; G06T 2207/30164; G06T 2207/30204; G06T 7/001; G06T 7/579; G06T 7/593; G06T 7/62; G06T 15/20; G06T 15/06; G06T 15/503; G06T 15/506; G06T 17/00; G06T 19/00; G06T 2210/04; G06T 2210/61; G06F 3/011; G06F 3/017; G06F 3/04847; G06F 3/04883; G06F 1/182; G06F 21/32; G06F 2203/0381; G06F 3/0481; G06F 3/04815; G06F 3/04817; G06F 3/0482; G06F 3/0488; G06F 3/04886; G06F 3/16; G06F 3/167; G06F 16/3347; G06F 16/345; G06F 8/20; E06B 2009/2464; E06B 3/6722; E06B 9/24; E06B 2003/6638; E06B 3/6612; E06B 3/66352; E06B 3/67; E06B 7/28; G05B 15/02; G05B 19/042; G05B 2219/23363; G05B 2219/2642; G05B 2219/2653; G05B 2219/32014; G05B 13/028; G05B 19/056; G05B 16/40937; G05B 19/41835; G05B 19/41885; G05B 2219/23293; G05B 2219/2614; G02F 1/163; G02F 1/13306; G02F 2203/01;
G02F 1/15; G02F 1/153; G02F 1/1533;
G02F 1/161; H04W 84/047; Y02B 10/10;
H04B 7/15507; C09K 9/00; C09K 9/02;
H02J 50/20; H02J 50/10; H02J 50/12;
H02J 50/30; H01Q 1/1271; H01Q 1/007;
H01Q 1/2225; H01Q 1/2291; H01Q 5/25;
H01Q 1/12; H01Q 1/1221; H01Q 1/246;
H01Q 1/38; H01Q 1/44; H01Q 21/061;
H01Q 21/24; H01Q 9/0407; H01Q 9/40;
G06N 20/00; G06Q 10/101; G06Q
50/205; G09B 19/24; G09B 5/065; G09B
5/10; G09B 9/00; H04R 1/406; H04R
2227/001; H04R 2227/009; H04R 27/00;
H04R 3/005; H04S 7/305; H04S 7/40

See application file for complete search history.

(56)          References Cited

U.S. PATENT DOCUMENTS

| | | | |
|---|---|---|---|
| 4,932,755 A | 6/1990 | Holdridge et al. | |
| 5,139,850 A | 8/1992 | Clarke et al. | |
| 5,147,694 A | 9/1992 | Clarke | |
| 5,959,586 A | 9/1999 | Benham et al. | |
| 6,089,721 A | 7/2000 | Schierbeek | |
| 6,104,513 A | 8/2000 | Bloom | |
| 6,128,471 A | 10/2000 | Quelch et al. | |
| 6,407,847 B1 | 6/2002 | Poll et al. | |
| 6,456,239 B1 | 9/2002 | Werb et al. | |
| 6,703,981 B2 | 3/2004 | Meitzler et al. | |
| 6,795,226 B2 | 9/2004 | Agrawal et al. | |
| 6,809,692 B2 | 10/2004 | Puente Baliarda et al. | |
| 7,722,948 B2 | 5/2010 | Dixon et al. | |
| 8,213,074 B1 | 7/2012 | Shrivastava et al. | |
| 8,614,848 B2 | 12/2013 | Ueda et al. | |
| 8,634,764 B2 | 1/2014 | Cruz et al. | |
| 8,780,432 B1 | 7/2014 | Nguyen | |
| 8,924,076 B2 | 12/2014 | Boote et al. | |
| 8,927,069 B1 | 1/2015 | Estinto et al. | |
| 8,975,789 B2 | 3/2015 | Snyker et al. | |
| 9,405,432 B2 * | 8/2016 | Vats | G06F 3/04815 |
| 9,454,055 B2 | 9/2016 | Brown et al. | |
| 9,664,976 B2 | 5/2017 | Rozbicki | |
| 9,898,912 B1 | 2/2018 | Jordan, II et al. | |
| 10,153,845 B2 | 12/2018 | Ashrafi | |
| 10,254,618 B2 | 4/2019 | Parker | |
| 10,299,101 B1 | 5/2019 | Lim et al. | |
| 10,673,121 B2 | 6/2020 | Hughes et al. | |
| 10,721,280 B1 * | 7/2020 | Heppner | H04L 65/403 |
| 10,797,373 B2 | 10/2020 | Hughes et al. | |
| 10,867,266 B1 | 12/2020 | Carlin et al. | |
| 11,054,711 B2 | 7/2021 | Shrivastava et al. | |
| 11,114,742 B2 | 9/2021 | Shrivastava et al. | |
| 11,205,926 B2 | 12/2021 | Shrivastava et al. | |
| 11,342,791 B2 | 5/2022 | Rozbicki et al. | |
| 11,462,814 B2 | 10/2022 | Hughes et al. | |
| 2002/0109634 A1 | 8/2002 | Aisenbrey | |
| 2002/0140611 A1 | 10/2002 | Ligander et al. | |
| 2003/0034926 A1 | 2/2003 | Veerasamy | |
| 2003/0098791 A1 | 5/2003 | Carlson et al. | |
| 2003/0227663 A1 | 12/2003 | Agrawal et al. | |
| 2003/0232181 A1 | 12/2003 | Simpson et al. | |
| 2004/0148057 A1 | 7/2004 | Breed et al. | |
| 2004/0150867 A1 | 8/2004 | Lee et al. | |
| 2004/0160324 A1 | 8/2004 | Stilp | |
| 2004/0160657 A1 | 8/2004 | Tonar et al. | |
| 2004/0196179 A1 | 10/2004 | Turnbull | |
| 2005/0082639 A1 | 4/2005 | Kikuta et al. | |
| 2005/0117193 A1 | 6/2005 | Poll et al. | |
| 2005/0157675 A1 | 7/2005 | Feder et al. | |
| 2005/0254442 A1 | 11/2005 | Proctor, Jr. et al. | |
| 2005/0260983 A1 | 11/2005 | DiPiazza | |
| 2006/0033663 A1 | 2/2006 | Saint Clair et al. | |
| 2007/0042819 A1 | 2/2007 | Li et al. | |
| 2007/0126637 A1 | 6/2007 | Habib et al. | |
| 2007/0182705 A1 | 8/2007 | Leyland et al. | |
| 2007/0292606 A1 | 12/2007 | Demiryont | |
| 2008/0018979 A1 | 1/2008 | Mahe et al. | |
| 2008/0177919 A1 | 7/2008 | Miyazawa | |
| 2009/0014693 A1 | 1/2009 | Zahn | |
| 2009/0047900 A1 | 2/2009 | Cruz et al. | |
| 2009/0054054 A1 | 2/2009 | Shao et al. | |
| 2009/0139052 A1 | 6/2009 | Boenisch | |
| 2009/0140219 A1 | 6/2009 | Zahn | |
| 2009/0224980 A1 | 9/2009 | Cruz et al. | |
| 2009/0284220 A1 | 11/2009 | Toncich et al. | |
| 2010/0027694 A1 | 2/2010 | Touboul et al. | |
| 2010/0052718 A1 | 3/2010 | Baker et al. | |
| 2010/0076615 A1 | 3/2010 | Daniel et al. | |
| 2010/0165436 A1 | 7/2010 | Voss et al. | |
| 2010/0171667 A1 | 7/2010 | Knudsen | |
| 2010/0210233 A1 | 8/2010 | Cook et al. | |
| 2010/0302624 A1 | 12/2010 | Moskowitz | |
| 2011/0031821 A1 | 2/2011 | Greene et al. | |
| 2011/0074342 A1 | 3/2011 | Maclaughlin | |
| 2011/0080630 A1 | 4/2011 | Valentin et al. | |
| 2011/0124313 A1 | 5/2011 | Jones | |
| 2011/0148218 A1 | 6/2011 | Rozbicki | |
| 2011/0159821 A1 | 6/2011 | Park | |
| 2011/0170170 A1 | 7/2011 | Boote | |
| 2011/0248901 A1 | 10/2011 | Alexopoulos et al. | |
| 2011/0260856 A1 | 10/2011 | Rossmann et al. | |
| 2012/0050325 A1 * | 3/2012 | Joo | A63F 13/79 |
| | | | 345/633 |
| 2012/0133213 A1 | 5/2012 | Borke et al. | |
| 2012/0133315 A1 | 5/2012 | Berman et al. | |
| 2012/0154241 A1 | 6/2012 | Tatarnikov et al. | |
| 2012/0188627 A1 | 7/2012 | Chen et al. | |
| 2012/0194895 A1 | 8/2012 | Podbelski et al. | |
| 2012/0212794 A1 | 8/2012 | Giron et al. | |
| 2012/0217346 A1 | 8/2012 | Eberle et al. | |
| 2012/0275008 A1 | 11/2012 | Pradhan et al. | |
| 2012/0287017 A1 | 11/2012 | Parsche | |
| 2012/0328849 A1 | 12/2012 | Neill et al. | |
| 2013/0054033 A1 | 2/2013 | Casilli | |
| 2013/0194141 A1 | 8/2013 | Okajima et al. | |
| 2013/0226353 A1 | 8/2013 | Park | |
| 2013/0243120 A1 | 9/2013 | Tsai et al. | |
| 2013/0271814 A1 | 10/2013 | Brown | |
| 2014/0008992 A1 | 1/2014 | Leabman | |
| 2014/0149416 A1 | 5/2014 | Wallace | |
| 2014/0240474 A1 | 8/2014 | Kondo | |
| 2014/0319116 A1 | 10/2014 | Fischer et al. | |
| 2014/0333485 A1 | 11/2014 | Stone et al. | |
| 2014/0368048 A1 | 12/2014 | Leabman et al. | |
| 2015/0155737 A1 | 6/2015 | Mayo | |
| 2015/0198640 A1 | 7/2015 | Lee | |
| 2015/0222126 A1 | 8/2015 | Leabman et al. | |
| 2015/0323287 A1 | 11/2015 | Durand | |
| 2016/0020647 A1 | 1/2016 | Leabman et al. | |
| 2016/0028162 A1 | 1/2016 | Ou et al. | |
| 2016/0124283 A1 | 5/2016 | Brown et al. | |
| 2016/0149635 A1 | 5/2016 | Hinman et al. | |
| 2016/0154290 A1 | 6/2016 | Brown et al. | |
| 2016/0181873 A1 | 6/2016 | Mitcheson et al. | |
| 2016/0183056 A1 | 6/2016 | Leabman | |
| 2016/0248270 A1 | 8/2016 | Zeine et al. | |
| 2017/0052753 A1 | 2/2017 | Paolini, Jr. et al. | |
| 2017/0104374 A1 | 4/2017 | Zeine et al. | |
| 2017/0117754 A1 | 4/2017 | Noori et al. | |
| 2017/0272145 A1 | 9/2017 | Lilja | |
| 2017/0272317 A1 | 9/2017 | Singla et al. | |
| 2017/0365908 A1 | 12/2017 | Hughes et al. | |
| 2018/0090992 A1 | 3/2018 | Shrivastava et al. | |
| 2018/0095337 A1 | 4/2018 | Rozbicki et al. | |
| 2018/0138576 A1 | 5/2018 | Cohen | |
| 2018/0239513 A1 * | 8/2018 | Ullrich | G06F 30/13 |
| 2018/0301783 A1 | 10/2018 | Bulja et al. | |
| 2019/0036209 A1 | 1/2019 | Au | |
| 2019/0044606 A1 | 2/2019 | Mansikkamaki | |
| 2019/0067826 A1 | 2/2019 | Achour et al. | |
| 2019/0097827 A1 | 3/2019 | Angle et al. | |
| 2019/0219881 A1 | 7/2019 | Shrivastava et al. | |

(56) References Cited

U.S. PATENT DOCUMENTS

| | | |
|---|---|---|
| 2019/0267840 A1 | 8/2019 | Rozbicki et al. |
| 2019/0294018 A1 | 9/2019 | Shrivastava et al. |
| 2019/0319335 A1 | 10/2019 | Hughes et al. |
| 2019/0324341 A1 | 10/2019 | Tonar et al. |
| 2019/0354071 A1 | 11/2019 | Turney et al. |
| 2020/0193155 A1 | 6/2020 | Keohane et al. |
| 2020/0259237 A1 | 8/2020 | Shrivastava et al. |
| 2020/0321682 A1 | 10/2020 | Hughes et al. |
| 2021/0040789 A1 | 2/2021 | Rozbicki et al. |
| 2021/0074062 A1* | 3/2021 | Madonna ............. G06T 15/503 |
| 2021/0096553 A1* | 4/2021 | Stump ............. G05B 19/41835 |
| 2021/0119318 A1 | 4/2021 | Hughes et al. |
| 2021/0376445 A1 | 12/2021 | Shrivastava et al. |
| 2021/0384764 A1 | 12/2021 | Shrivastava et al. |
| 2022/0019117 A1 | 1/2022 | Shrivastava et al. |
| 2022/0021099 A1 | 1/2022 | Shrivastava et al. |
| 2022/0231396 A1 | 7/2022 | Rozbicki et al. |
| 2022/0231399 A1 | 7/2022 | Brown et al. |
| 2022/0252952 A1 | 8/2022 | Rozbicki et al. |
| 2022/0255351 A1 | 8/2022 | Rozbicki et al. |
| 2023/0130245 A1* | 4/2023 | Sha .................... G10L 21/0232 704/226 |
| 2023/0196655 A1* | 6/2023 | Tytgat .................... G06T 15/20 345/427 |

FOREIGN PATENT DOCUMENTS

| | | |
|---|---|---|
| CN | 101401312 A | 4/2009 |
| CN | 101868346 A | 10/2010 |
| CN | 102255119 A | 11/2011 |
| CN | 104102060 A | 10/2014 |
| CN | 104321497 A | 1/2015 |
| CN | 104884248 A | 9/2015 |
| CN | 104730795 B | 5/2018 |
| EP | 0413580 A1 | 2/1991 |
| EP | 0588514 A1 | 3/1994 |
| EP | 1297380 B1 | 11/2008 |
| EP | 2733998 A1 | 5/2014 |
| EP | 2851993 A1 | 3/2015 |
| JP | S63271320 A | 11/1988 |
| JP | H10233612 A | 9/1998 |
| JP | 2001196826 A | 7/2001 |
| JP | 2005303348 A | 10/2005 |
| JP | 2006252886 A | 9/2006 |
| JP | 2013515457 A | 5/2013 |
| JP | 2014204550 A | 10/2014 |
| JP | 2015128349 A | 7/2015 |
| JP | 2015521459 A | 7/2015 |
| JP | 2016512677 A | 4/2016 |
| KR | 20110128213 A | 11/2011 |
| KR | 101346862 B1 | 1/2014 |
| KR | 20210032133 A | 3/2021 |
| KR | 20210039721 A | 4/2021 |
| TW | 201344874 A | 11/2013 |
| TW | 201423773 A | 6/2014 |
| TW | M519749 U | 4/2016 |
| WO | WO-0182410 A1 | 11/2001 |
| WO | WO-03037056 A1 | 5/2003 |
| WO | WO-2008073372 A2 | 6/2008 |
| WO | WO-2010014648 A1 | 2/2010 |
| WO | WO-2010079388 A1 | 7/2010 |
| WO | WO-2010106648 A1 | 9/2010 |
| WO | WO-2011082208 A2 | 7/2011 |
| WO | WO-2013121103 A1 | 8/2013 |
| WO | WO-2013155467 A1 | 10/2013 |
| WO | WO-2013158365 A1 | 10/2013 |
| WO | WO-2013158464 A1 | 10/2013 |
| WO | WO-2015013578 A1 | 1/2015 |
| WO | WO-2015075007 A1 | 5/2015 |
| WO | WO-2015077829 A1 | 6/2015 |
| WO | WO-2016072620 A1 | 5/2016 |
| WO | WO-2016085964 A1 | 6/2016 |
| WO | WO-2016174228 A1 | 11/2016 |
| WO | WO-2017062915 A1 | 4/2017 |
| WO | WO-2017129855 A1 | 8/2017 |
| WO | WO-2017192881 A1 | 11/2017 |
| WO | WO-2018039080 A1 | 3/2018 |
| WO | WO-2018063919 A1 | 4/2018 |
| WO | WO-2018094203 A1 | 5/2018 |
| WO | WO-2018200702 A1 | 11/2018 |
| WO | WO-2019022129 A1 | 1/2019 |
| WO | WO-2020227702 A2 | 11/2020 |
| WO | WO-2020243690 A1 | 12/2020 |
| WO | WO-2020227702 A3 | 1/2021 |

OTHER PUBLICATIONS

AU examination report dated Oct. 1, 2021, in application No. AU2020220165.

AU Office Action dated Aug. 30, 2022, in Application No. AU20210250838.

Australian Office Action dated Apr. 8, 2020 in AU Application No. 2015353606.

Australian Office Action dated Aug. 20, 2019 in AU Application No. 2015353606.

Australian Office Action dated Feb. 19, 2021 in AU Application No. 2017260101.

Australian Office Action dated Jun. 3, 2021 in AU Application No. AU 2020220165.

Australian Office Action dated Mar. 4, 2020 in AU Application No. 2015353606.

Australian Office Action dated May 10, 2019 in AU Application No. 2015353606.

Azini, A.S. et al., "Transparent Antenna Design for Wireless Access Point Application," PIERS Proceedings, Taipei, Mar. 25-28, 2013, pp. 910-913.

Balzano Q., et al., "RF Energy In Cars From Window-mounted Antennas", 36th IEEE Vehicular Technology Conference, 2006, pp. 32-39.

CA Office Action dated Dec. 22, 2021, in Application No. 2968665.

CA Office Action dated Nov. 15, 2022 in Application No. CA2968665.

CN Office Action dated Oct. 10, 2022, in Application No. CN201780057293.9, with English Translation.

CN Office Action dated Apr. 15, 2022 in CN Application No. 201780063202.2.

CN Office Action dated Apr. 27, 2022, in Application No. CN201780057293.9 with English translation.

CN Office Action dated Apr. 29, 2020 in CN Application No. 201780038353.2.

CN Office Action dated Apr. 6, 2021 in CN Application No. 201780038353.2.

CN Office Action dated Apr. 6, 2021 in CN Application No. 201911227990.1.

CN Office Action dated Aug. 2, 2021, in CN Application No. 201780038353.2.

CN Office Action dated Aug. 3, 2021 in CN Application No. 201780063202.2.

CN Office Action dated Aug. 6, 2019 in CN Application No. 201580070207.9.

CN Office Action dated Jul. 28, 2021 in CN Application No. 201780057293.9.

CN Office Action dated Mar. 5, 2019 in CN Application No. 201580070207.9.

CN Office Action dated Nov. 6, 2020 in CN Application No. 201780038353.2.

CN Office Action dated Oct. 22, 2020 in CN Application No. 201911227990.1.

CN Office Action dated Sep. 15, 2021, in application No. CN201911227990.1.

EP Extended Search Report dated Dec. 4, 2019 in EP Application No. 17793364.5.

EP Extended Search Report dated Feb. 25, 2020 in EP Application No. 17844188.7.

EP Extended Search Report dated Mar. 31, 2020 in EP Application No. 17857230.1.

EP Extended Search Report dated Sep. 6, 2018 in EP Application No. 15863433.7.

(56)            References Cited

OTHER PUBLICATIONS

EP Office Action dated Dec. 16, 2021, in Application No. EP17793364.5.
EP Office Action dated Jun. 3, 2022, in Application No. EP19713970.2.
EP Office Action dated Oct. 1, 2021, in application No. EP17857230.1.
EP Partial Supplementary Search Report dated May 23, 2018 in EP Application No. 15863433.7.
European Office Action dated Jul. 8, 2020 in EP Application No. 15863433.7.
European Office Action dated May 7, 2021 in EP Application No. 15863433.7.
European Office Action dated Oct. 17, 2019 in EP Application No. 15863433.7.
IN Office Action dated May 10, 2022, in Application No. IN202037043494.
IN Office Action dated Dec. 24, 2021, in Application No. IN202138004005.
Indian Office Action dated Mar. 24, 2021 in IN Application No. 201817042545.
Indian Office Action dated Sep. 25, 2020 in IN Application No. 201737018864.
International Preliminary Report on Patentability dated Oct. 27, 2022, in PCT Application No. PCT/US2021/027418.
International Search Report and Written Opinion dated Sep. 1, 2022 in Application No. PCT/US2022/028850.
International Preliminary Report on Patentability dated Apr. 11, 2019 in PCT/US2017/052798.
International Preliminary Report on Patentability dated Dec. 9, 2021, in PCT Application No. PCT/US2020/035485.
International Preliminary Report on Patentability dated Feb. 10, 2022 issued in Application No. PCT/US2020/044337.
International Preliminary Report on Patentability dated Jun. 8, 2017 in PCT Application No. PCT/US2015/062387.
International Preliminary Report on Patentability dated Mar. 7, 2019 in PCT/US2017/047664.
International Preliminary Report on Patentability dated Nov. 15, 2018 in PCT Application No. PCT/US2017/031106.
International Preliminary Report on Patentability dated Nov. 18, 2021, issued in PCT/US2020/032269.
International Preliminary Report on Patentability dated Sep. 24, 2020 in PCT/US2019/022129.
International Search Report and Written Opinion dated Aug. 8, 2022, in Application No. PCT/US2022/023605.
International Search Report and Written Opinion dated Aug. 5, 2021 in PCT Application No. PCT/US2021/027418.
International Search Report and Written Opinion (ISA/EP) dated Dec. 7, 2020 in PCT Application No. PCT/US2020/032269.
International Search Report and Written Opinion (ISA/EP) dated May 9, 2019 in PCT/US2019/022129.
International Search Report and Written Opinion (ISA/EP) dated Sep. 30, 2020 in PCT Application No. PCT/US2020/035485.
International Search Report and Written Opinion (ISA/KR) dated Aug. 22, 2017 in PCT Application No. PCT/US2017/031106.
International Search Report and Written Opinion (ISA/KR) dated Dec. 13, 2017 in PCT/US2017/047664.
International Search Report and Written Opinion (ISA/KR) dated Feb. 6, 2018 in PCT/US2017/052798.
International Search Report and Written Opinion (ISA/KR) dated Mar. 8, 2016 in PCT Application No. PCT/US2015/062387.
JP Office Action dated Jul. 5, 2022, in Application No. JP2021-119155.
JP Office Action dated Mar. 2, 2021 in JP Application No. 2018-557808.
JP Office Action dated Nov. 8, 2022 for JP Application No. 2021-119155 with English translation.
KR Office Action dated Apr. 16, 2021 in KR Application No. 10-2018-7035235.
KR Office Action dated Feb. 22, 2022, in Application No. KR1020177017285.
Pasternack Enterprises, Inc. Technical Data Sheet for MCX Jack Connector Solder Attachment Surface Mount PCB (PE4889), 2013, 2 pp.
Restriction requirement dated Oct. 18, 2021, for U.S. Appl. No. 16/849,540.
Rolith Inc., "NanoWeb: sub-micron transparent metal mesh conductors," [http://www.rolith.com/applications/transparent-conductive-electrodes] retrieved Jan. 29, 2016, 3 pp.
Saad, A. "Printed millimeter-wave MIMO-based slot antenna arrays for 5G networks," AEU—International Journal of Electronics and Communications, vol. 99, Feb. 2019, pp. 59-69.
Saberin, J. R., "Optically Transparent Antennas for Small Satellites," University of Utah, Dept. of Electrical and Computer Engineering, Masters Thesis, Aug. 2010, 55 pp.
SunPartner Technologies web page, "Li-Fi", [http://sunpartnertechnologies.com/li-fi/]; 3 pages; retrieved Jan. 24, 2018.
SunPartner Technologies web page, "Smart Building—Cameleon", [http://sunpartnertechnologies.com/vitrage-intelligent/]; 3 pages; retrieved Jan. 24, 2018.
SunPartner Technologies web page, "Smart Building—Design Glass", [http://sunpartnertechnologies.com/vitrage-intelligent/]; 3 pages; retrieved Jan. 24, 2018.
SunPartner Technologies web page, "Smart Building—Vision Glass", [http://sunpartnertechnologies.com/vitrage-intelligent/]; 3 pages; retrieved Jan. 24, 2018.
SunPartner Technologies White Paper, "Wysips Connect, the first solution for the indoor/outdoor VLC lighting saturation problematics," Feb. 26, 2015, 6 pages, [http://sunpartnertechnologies.com/wp-content/uploads/2012/08/White_Paper_LiFi_26_02_2015.pdf].
Taiwan Office Action dated Dec. 31, 2020 issued in TW Application No. 106133563.
Taiwan Office Action dated Jan. 25, 2021 issued in TW Application No. 106128249.
Taiwanese First Office Action dated May 21, 2021 in TW 109134283.
Taiwanese Office Action dated Mar. 16, 2020 in TW Application No. 104139297.
Taiwanese Office Action dated Oct. 1, 2019 in TW Application No. 104139297.
"That's right, 5G could depend on Corning glass in your antenna," by Robert Triggs, Android Authority, Mar. 2, 2018, 5 pp.. [https://www.androidauthority.com/corning-glass-5g-antenna-842341/] downloaded Nov. 13, 2018.
TW Office Action dated Apr. 26, 2022 in Application No. TW110144841 with English translation.
TW Office Action dated Mar. 13, 2022, in Application No. TW106114947 with English translation.
TW Office Action dated May 31, 2021 in TW Application No. TW106114947.
TW Office Action dated Nov. 29, 2021, in Application No. TW109134283 with English translation.
U.S. Non-Final office Action dated Sep. 8, 2022 in U.S. Appl. No. 17/406,301.
U.S. Corrected Notice of Allowance dated Sep. 6, 2022 in U.S. Appl. No. 16/849,540.
U.S. Corrected Notice of Allowability dated Jan. 10, 2022, in U.S. Appl. No. 16/334,716.
U.S. Corrected Notice of Allowability for U.S. Appl. No. 16/327,789 dated Mar. 1, 2021.
U.S Corrected Notice of Allowance dated Apr. 26, 2022 in U.S. Appl. No. 16/334,716.
U.S. Corrected Notice of Allowance dated Jun. 3, 2022 In U.S. Appl. No. 16/849,540.
US Final Office Action dated Feb. 6, 2020 in U.S. Appl. No. 16/451,784.
US Final Office Action dated May 11, 2021 in U.S. Appl. No. 16/334,716.
U.S. Non Final Office Action dated Jan. 31, 2022 in U.S. Appl. No. 16/849,540.
U.S. Non-Final Office Action dated Dec. 2, 2022 in U.S. Appl. No. 16/980,305.

(56) References Cited

OTHER PUBLICATIONS

U.S. Non-Final Office Action dated Nov. 18, 2022, in U.S. Appl. No. 17/307,848.
U.S. Non-Final office Action dated Sep. 29, 2022 in U.S. Appl. No. 16/949,978.
US Notice of Allowance dated Apr. 19, 2021 in U.S. Appl. No. 16/099,424.
U.S Notice of Allowance dated Dec. 22, 2021 in U.S. Appl. No. 16/334,716.
US Notice of Allowance dated May 25, 2021 in U.S. Appl. No. 15/709,339.
US Notice of Allowance dated May 26, 2020 in U.S. Appl. No. 16/451,784.
U.S. Notice of Allowance dated May 26, 2022, in U.S. Appl. No. 16/849,540.
US Notice of Allowance dated Sep. 10, 2021, in the U.S. Appl. No. 15/709,339.
U.S. Notice of Allowance for U.S. Appl. No. 16/327,789 dated Feb. 4, 2021.
US Office Action dated Jan. 16, 2020 in U.S. Appl. No. 15/529,677.
US Office Action dated Jan. 21, 2021 in U.S. Appl. No. 15/709,339.
US Office Action dated Jul. 25, 2019 in U.S. Appl. No. 15/529,677.
US Office Action dated Nov. 12, 2020 in U.S. Appl. No. 16/334,716.
US Office Action dated Sep. 23, 2019 in U.S. Appl. No. 16/451,784.
U.S. Office Action for U.S. Appl. No. 16/327,789 dated Sep. 28, 2020.
U.S. Appl. No. 62/102,515, inventors Nagar et al., filed Jan. 12, 2015.
U.S. Appl. No. 62/102,516, inventors Nagar et al., filed Jan. 12, 2015.
U.S. Appl. No. 63/146,365, inventors Brown et al., filed Feb. 5, 2021.
U.S. Appl. No. 63/171,871, inventors Gomez-Martinez et al., filed Apr. 7, 2021.
U.S. Appl. No. 63/187,632, inventors Hur et al., filed May 12, 2021.
U.S. Appl. No. 63/226,127, inventors Lee et al., filed Jul. 21, 2021.
U.S. Pat. Appl. No. PCT/US2021/017946, filed on Feb. 12, 2021.
U.S. Pat. Appl. No. PCT/US2021/027418, inventors Makker et al., filed on Apr. 15, 2021.
U.S. Appl. No. 17/904,156, inventors Brown et al., filed Aug. 12, 2022.
U.S. Appl. No. 63/080,899, inventor Makker et al., filed Sep. 21, 2020.
WeBoost Connect 3G Cell Phone Booster 472205 [https://store.weboost.com/products/connect-3g-directional] retrieved Apr. 1, 2016, 12 pp.
Yasin, T. et al., "A study on the efficiency of transparent patch antennas designed from conductive oxide films," IEEE International Symposium on Antennas and Propagation (APSURSI), Spokane, WA, Jul. 3-8, 2011, pp. 3085-3087.
Yasin, T., "Transparent antennas for solar cell integration," Utah State University, Dept. of Electrical Engineering, Doctoral Thesis, 2013, 98 pp.

* cited by examiner

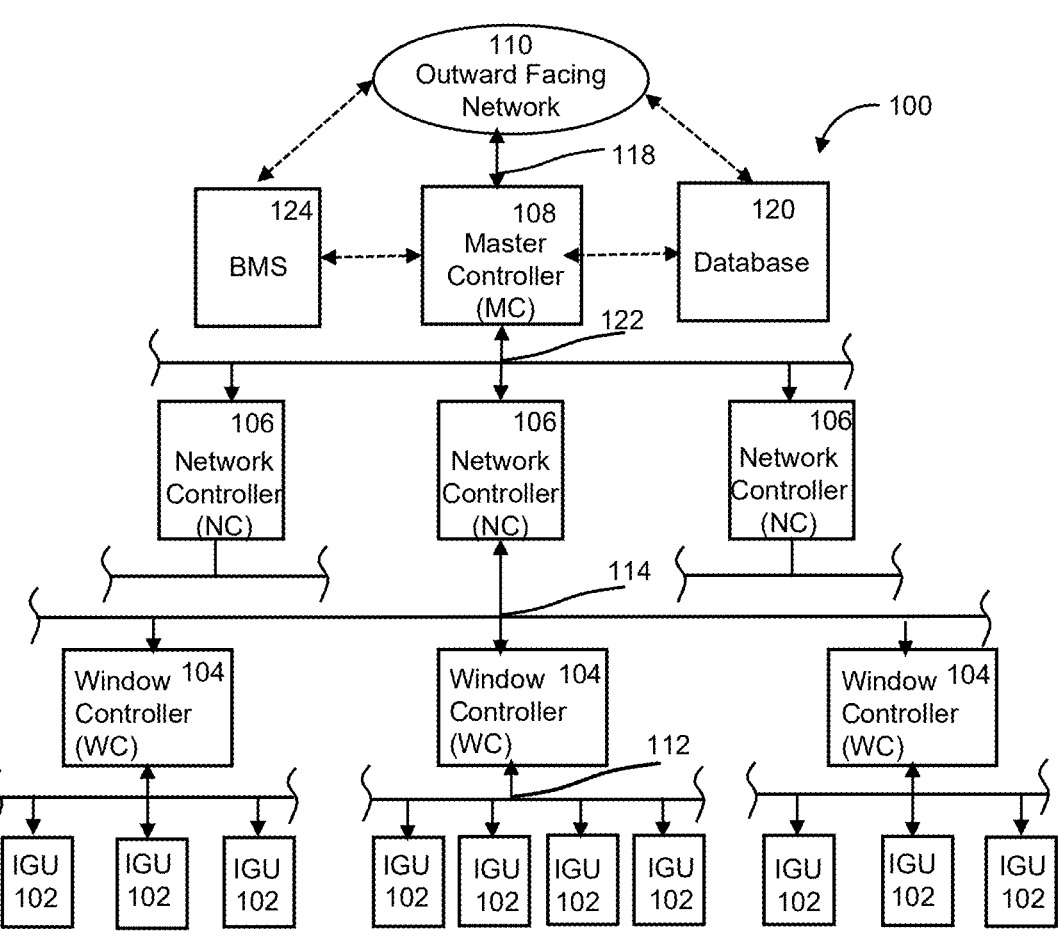
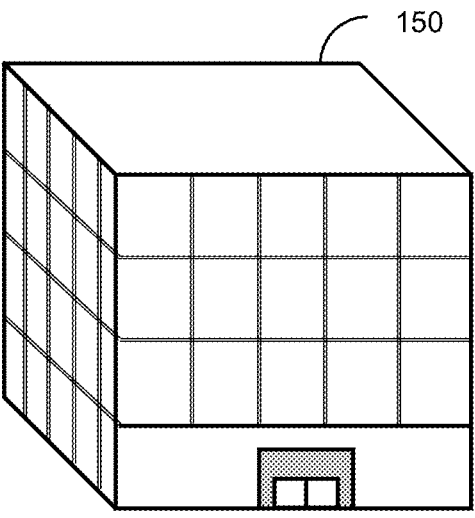
Figure 1

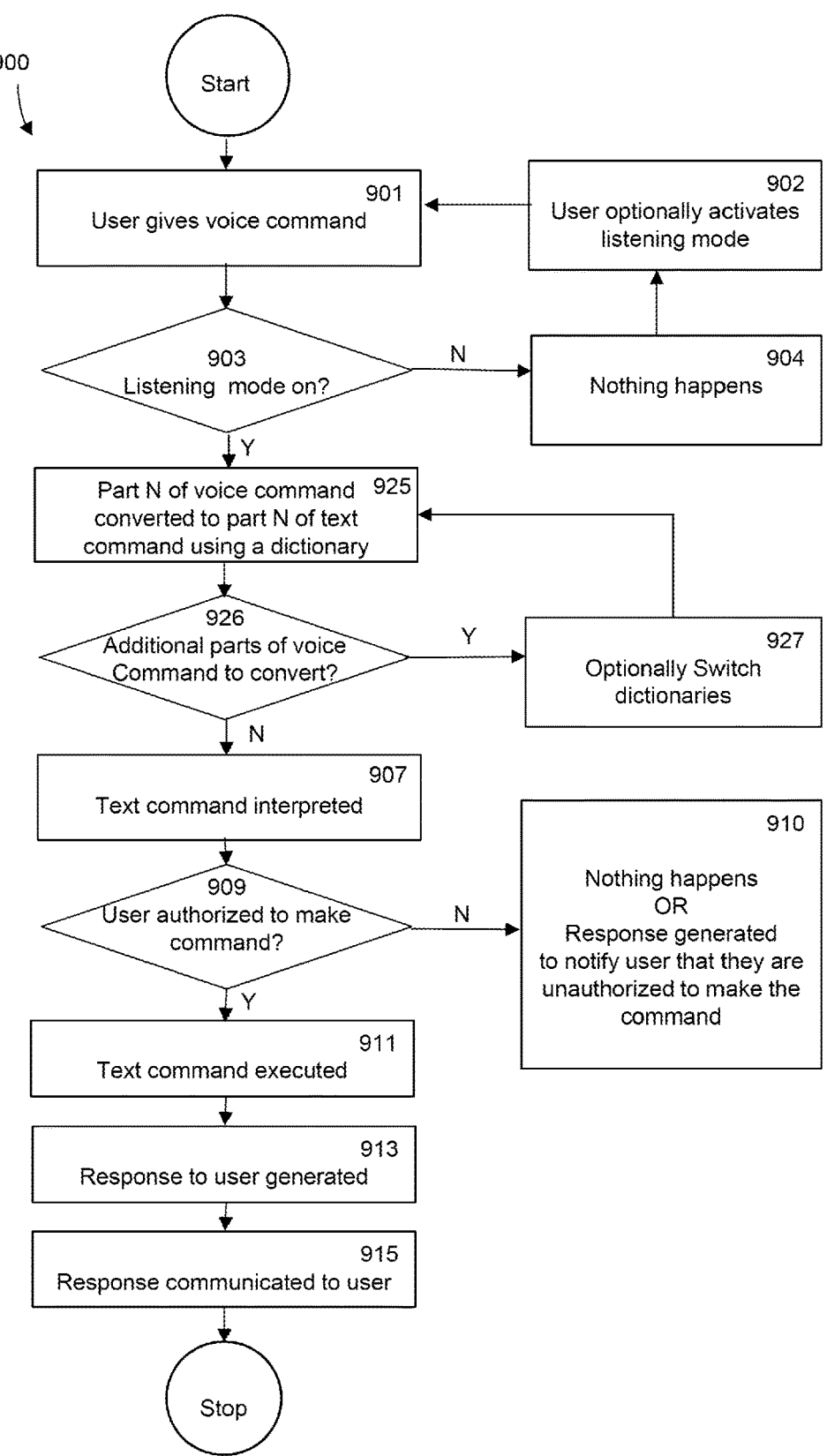

900

Start

| | 901 |
|---|---|
| | User gives voice command |

| | 902 |
|---|---|
| | User optionally activates listening mode |

903
Listening mode on?

N

| | 904 |
|---|---|
| | Nothing happens |

Y

| Part N of voice command | 925 |
|---|---|
| converted to part N of text command using a dictionary | |

926
Additional parts of voice Command to convert?

Y

| | 927 |
|---|---|
| | Optionally Switch dictionaries |

N

| | 907 |
|---|---|
| | Text command interpreted |

909
User authorized to make command?

N

| | 910 |
|---|---|
| | Nothing happens OR Response generated to notify user that they are unauthorized to make the command |

Y

| | 911 |
|---|---|
| | Text command executed |

| | 913 |
|---|---|
| | Response to user generated |

| | 915 |
|---|---|
| | Response communicated to user |

Stop

1600
Point a tracked remote controller to a target disposed in an enclosure to form an intersection 1601
Map intersection to digital twin 1602
Associated event at Intersection 1603
No action taken 1604
Send event command to processor 1605
Trigger event in the target disposed in the enclosure

INTERACTION BETWEEN AN ENCLOSURE AND ONE OR MORE OCCUPANTS

RELATED APPLICATIONS

An Application Data Sheet is filed concurrently with this specification as part of the present application. Each application that the present application claims benefit of or priority to as identified in the concurrently filed Application Data Sheet is incorporated herein by reference in its entirety and for all purposes.

BACKGROUND

This disclosure relates generally to user interaction (e.g., control) with one or more interactive targets in an enclosure. The interactive targets can comprise an optically switchable device (e.g., tintable window in a building), projected media, environmental appliance, sensor, or any other apparatus that is communicatively coupled to a communication network in an enclosure.

The ability to control the environmental conditions is gaining increased popularity, as well as deployment and manipulation of related apparatuses such as seniors, emitters, and/or devices that affect the environment. Controlling the environment may be with the aim to increase comfort of occupant(s) and/or to reduce power consumption and improving the efficiency of systems controlling the environment of the enclosure (e.g., heater, cooler, vent, and/or lighting).

Included in these devices are optically switchable windows. The development and deployment of optically switchable windows for enclosures (e.g., buildings and other facilities) have increased as considerations of energy efficiency and system integration gain momentum. Electrochromic windows are a promising class of optically switchable windows. Electrochromism is a phenomenon in which a material exhibits a reversible electrochemically-mediated change in one or more optical properties when stimulated to a different electronic state. Electrochromic materials and the devices made from them may be incorporated into, for example, windows for home, commercial, or other use. The color, tint, transmittance, absorbance, or reflectance of electrochromic windows can be changed by inducing a change in the electrochromic material, for example, by applying a voltage across the electrochromic material. Such capabilities can allow for control over the intensities of various wavelengths of light that may pass through the window. One area of interest is control systems for driving optical transitions in optically switchable windows to provide requested lighting conditions, e.g., while reducing the power consumption of such devices and improving the efficiency of systems with which they are integrated.

At least one user (e.g., building occupant and/or a person located remotely) of a facility may want to manipulate (e.g., control) various network-connected devices (e.g., tintable windows) and/or media content in the facility. For convenience, such personal or social interaction should be as intuitive as possible. For example, the user(s) may want to control various aspects of the facility environment (e.g., using HVAC, sensors, emitters, and/or tintable windows) via a gaming controller (e.g., a virtual reality or VR controller). The user may also want to control media content projected in the facility (e.g., projected using an electrochromic window or shown on a wall using a projector). Control of any newly added targets (e.g., devices) to the facility should preferably be seamless as possible and require minimal manual labor for configuration of the devices and remote control systems.

SUMMARY

Various aspects disclosed herein alleviate as least part of the shortcomings and/or aspirations related to remote control of interactive target(s). Various embodiments herein relate to methods, systems, software and networks for manipulating (e.g., controlling) targets (e.g., devices) that are communicatively coupled to a network, e.g., by manipulating a digital twin (e.g., representative virtual model) of a facility. The target(s) may comprise an optically switchable device. The target may be controlled using a remote controller (e.g., a pointing device) and/or a virtual reality (VR) user interface. Various embodiments disclosed herein relate to conditioning an enclosure and/or target apparatus according to preference and/or expectations of one or more users and/or occupants. The conditioning may utilize predictions of a learning module (e.g., using machine learning) as to the preferences and/or expectations. The conditioning may facilitate seamless coupling and/or interaction between an enclosure (e.g., a facility comprising a building) and its user and/or occupant. The conditioning may facilitate seamless coupling and/or interaction between a control system of the enclosure, its controlled target device(s), and its user and/or occupant. Such conditioning may increase the efficiency of activities taking place in the enclosure (e.g., work, health, safety, and/or leisure related activities).

In another aspect, a method for controlling an interactive target of a facility, the method comprises: (A) monitoring a location of a mobile circuitry relative to a digital twin that comprises a virtual three dimensional representation of a structural feature of the facility having a real interactive target, which mobile circuitry (I) is movable by a user, (II) has a known location relative to at least a portion of the structural feature, and (III) is coupled to a virtual representation of the real interactive target in the digital twin; (B) relating a gesture imparted on the mobile circuitry to the digital twin and generate a result, which gesture (i) is imparted by the user, (ii) is made with an intent to remotely cause an alteration of the real interactive target, and (iii) is during coupling with the real interactive target; and (C) using the result to alter a current state of the real interactive target in the facility.

In some embodiments, the method further comprises configuring the digital twin according to a building information modeling data file according to which the facility was or is constructed. In some embodiments, the building information modeling data file comprises an architectural detail of the facility, an annotation, or an information from a model database of the facility. In some embodiments, the building information modeling data file is utilized for planning and/or tracking various stages in a lifecycle of the facility including concept, construction, maintenance and/or demolition, of the facility. In some embodiments, the building information modeling data file comprises a three dimensional structural model annotated with two-dimensional drafting elements in a database. In some embodiments, the three dimensional structural model comprises parametric elements providing geometric parameters of the structural feature. In some embodiments, the facility includes a digital network. In some embodiments, the digital network is used at least in part for monitoring the location of the mobile circuitry. In some embodiments, the facility includes a digital network that is communicatively coupled to the real interactive target. In some embodiments, the facility comprises a control network that is communicatively coupled to the real interactive target to support (a) monitoring location of the mobile circuitry, and/or (b) altering the current state of the real interactive target. In some embodiments, the control network is a hierarchical network comprising a plurality of controllers. In some embodiments, the mobile circuitry is included in a handheld pointing device. In some embodiments, the mobile circuitry is included in a mobile phone. In some embodiments, the mobile circuitry is included in a handheld gaming controller having a motion function and a clicking/select function. In some embodiments, the mobile circuitry includes, or is coupled to, a motion sensor. In some embodiments, the mobile circuitry is not using an electromagnetic beam or a sonic beam. In some embodiments, the mobile circuitry is included in a virtual reality (VR) interface that comprises a display headset, a handheld controller with a motion function, or a select function. In some embodiments, the mobile circuitry is included in a laptop computer. In some embodiments, the mobile circuitry is included in a tablet computer. In some embodiments, the gesture comprises movement. In some embodiments, the location relative to the structural feature of the facility is established at a first time, and the relative location is maintained as the mobile circuitry moves (i) locally in the facility or (ii) remotely from the facility. In some embodiments, the relative location is maintained in real time. In some embodiments, the digital twin comprises a virtual three dimensional representation of a plurality of structural features of the facility comprising a wall, a floor, a window, a door, or a table, of the facility. In some embodiments, the digital twin comprises a virtual three dimensional representation of a plurality of structural features of the facility comprising fixtures or non-fixtures of the facility. In some embodiments, the coupling of the mobile circuitry to the virtual representation of the real interactive target in the digital twin is comprised of (i) a spatial relationship between the mobile circuitry and the at least the portion of the structural feature identified in at least two dimensions and (ii) a relative pointing direction of the mobile circuitry to the real interactive target. In some embodiments, the coupling of the mobile circuitry to the virtual representation of the real interactive target in the digital twin is comprised of a virtual digital ray that extends from the location of the mobile circuitry to the target. In some embodiments, the gesture imparted by the user is comprised of a gesture executed with the mobile circuitry to specify a direction of the virtual digital ray. In some embodiments, the gesture comprises a pointing, movement, or clicking action. In some embodiments, the real interactive target comprises a media display. In some embodiments, coupling of the mobile circuitry to the virtual representation of the real interactive target in the digital twin includes a selection of an active media element in the media display. In some embodiments, the active media element is a pulldown menu selection. In some embodiments, the selection of the active media element comprises a pointing motion, a movement motion, or a clicking action. In some embodiments, the altering the function of the real interactive target is commensurate with the intent of the gesture. In some embodiments, the gesture imparted by the user couples to the real interactive target as a result of the mobile circuitry pointing to the real interactive target. In some embodiments, the current state being altered comprises a change in a signal to an optically tin table window. In some embodiments, the optically tintable window comprises an electrochromic window. In some embodiments, the current state being altered comprises a tint of an optically tintable window. In some embodiments, the optically tintable window comprises an electrochromic window. In some embodiments, the current state being altered comprises a menu-controlled parameter of a media content display. In some embodiments, the current state being altered comprises a parameter of sensor and/or emitter. In some embodiments, the current state being altered comprises a command setting of an environmental control unit. In some embodiments, the environmental control unit controls an environment of the facility. In some embodiments, the command setting comprises (i) a tint density of a tintable window, (ii) a temperature setting of an HVAC unit, (iii) a fan setting of an HVAC unit, or (iv) an on/off setting of a lighting unit. In some embodiments, the digital twin represents a plurality of structural features. In some embodiments, the structural features include static elements and/or dynamic elements. In some embodiments, the dynamic elements include the virtual representation of the real interactive target. In some embodiments, the dynamic elements include the current state of the real interactive target. In some embodiments, the facility includes a control network that is communicatively coupled (i) to the real interactive target and (ii) to the digital twin. In some embodiments, the method comprises updating the current state of the virtual representation of the real interactive target in the digital twin over the control network when the current state changes. In some embodiments, the facility includes a controller network that is communicatively coupled to the real interactive target. In some embodiments, the method further comprises transmitting one or more data messages from the controller network to the digital twin to update the digital twin. In some embodiments, the digital twin is updated according to a change in the current state of the real interactive target. In some embodiments, the method further comprises exchanging one or more messages between the digital twin and the mobile circuitry to (i) provide an analysis to the mobile circuitry corresponding to an initial virtual location, and (ii) navigate virtually in the digital twin to interact with the virtual representation of the real interactive target in the digital twin. In some embodiments, the initial virtual location is the known location. In some embodiments, the initial virtual location is different from the known location. In some embodiments, the mobile circuitry is disposed distant from the known location. In some embodiments, the initial virtual location is aligned to a virtual representation of the known location in the digital twin. In some embodiments, the user manipulating the mobile circuitry is located distant from the known location. In some embodiments, the initial virtual location is aligned to a virtual representation of the known location in the digital twin. In some embodiments, the user is outside of the facility. In some embodiments, the user is in the facility. In some embodiments, the initial virtual location is a default location. In some embodiments, the method further comprises transmitting a location message from the mobile circuitry to the digital twin to specify the initial virtual location. In some embodiments, the method further comprises (a) transmitting at least one control action message from the mobile circuitry to the digital twin in response to at least one gesture executed with the mobile circuitry; (b) validating the at least one gesture against predetermined control actions in the digital twin; and (c) transmitting at least one command message to the real interactive target when the gesture is validated. In some embodiments, the digital twin comprises virtual three dimensional representations of a plurality of structural features of the facility including a plurality of real interactive targets. In some embodiments, the virtual three dimensional representations are modified in response to addition and/or subtraction of the real interactive targets in the facility.

In another aspect, an apparatus for controlling an interactive target of a facility, the apparatus comprises one or more controllers comprising circuitry, which one or more controllers are configured to: (A) communicatively couple to (a) a digital twin that comprises a virtual three dimensional representation of a structural feature of the facility having a real interactive target, and (b) to a mobile circuitry that (I) is movable by a user, (II) has a known location relative to at least a portion of the structural feature, and (III) is coupled to a virtual representation of the real interactive target in the digital twin; (B) monitor, or direct monitoring of, a location of the mobile circuitry relative to the digital twin; (C) relate, or direct relating, a gesture imparted on the mobile circuitry to the digital twin and generate a result, which gesture (i) is imparted by the user, (ii) is made with an intent to remotely cause an alteration of the real interactive target, and (iii) is during user coupling with the real interactive target; and (D) use the result to alter, or direct alteration of, a current state of the real interactive target in the facility.

In some embodiments, the one or more controllers comprise, or is communicatively coupled to, a building management system. In some embodiments, the one or more controllers are part of a hierarchal control system. The control system can include one or more controllers. At least one controller of the control system can be in the facility. At least one controller can be remote from the facility (e.g., located externally to the facility, e.g., in the cloud). At least one controller can be located in the enclosure in which the target apparatus is disposed. At least one controller can be located in the room in which the target apparatus is disposed. At least one controller can be located in the floor in which the target apparatus is disposed. At least one controller can be located in the facility in which the target apparatus is disposed. At least one controller can be located in a different room from the one in which the target apparatus is disposed. At least one controller can be located in a different enclosure from the one in which the target apparatus is disposed. At least one controller can be located in a different floor from the one in which the target apparatus is disposed. At least one controller can be located in a different building from the one in which the target apparatus is disposed. In some embodiments, the one or more controllers comprise a control scheme comprising a feedback, a feed forward, a closed loop, or an open loop control scheme. In some embodiments, the one or more controllers are interconnected in a network disposed in the facility. In some embodiments, the network comprises a cable that includes a twisted cable, coaxial cable, and/or optical cable. In some embodiments, the network is disposed at least in part in an envelope of the facility, in an electrical shaft, communication shaft, elevator shaft, and/or in an electrical room. In some embodiments, the one or more controllers are configured to alter, or direct alteration of, the digital twin according to a building information modeling data file according to which the facility was or is constructed. In some embodiments, the building information modeling data includes an architectural detail of the facility, an annotation, and/or an information from a model In some embodiments, the building information modeling data file is utilized for planning and/or tracking various stages in a lifecycle of the facility including concept, construction, maintenance and/or demolition, of the facility. In some embodiments, the building information modeling data file comprises a three dimensional structural model annotated with two-dimensional drafting elements in a database. In some embodiments, the three dimensional structural model comprises parametric elements providing geometric parameters of the structural feature. In some embodiments, the apparatus further comprises a digital network. In some embodiments, the digital network is used for monitoring the location of the mobile circuitry. In some embodiments, the relative location is maintained in real time. In some embodiments, the apparatus further comprises a digital network that is communicatively coupled to the real interactive target. In some embodiments, the digital network supports at least a fourth generation (4G) communication interface. In some embodiments, the digital network supports at least a fifth generation (5G) communication interface. In some embodiments, the apparatus further comprises a control network at least a portion of which is disposed in the facility, which control network is communicatively coupled to the real interactive target to facilitate (a) monitoring location of the mobile circuitry, and/or (b) altering the current state of the real interactive target. In some embodiments, the control network is a hierarchical network comprising a plurality of controllers. In some embodiments, the mobile circuitry is included in a handheld pointing device. In some embodiments, the mobile circuitry is included in a mobile phone. In some embodiments, the mobile circuitry is included in a handheld gaming controller having a motion function and a clicking/select function. In some embodiments, the mobile circuitry includes, or is coupled to, a motion sensor. In some embodiments, the mobile circuitry is not using an electromagnetic beam or a sonic beam. In some embodiments, the mobile circuitry is included in a virtual reality (VR) interface that comprises a display headset, a handheld controller with a motion function, or a select function. In some embodiments, the mobile circuitry is included in a laptop computer. In some embodiments, the mobile circuitry is included in a tablet computer. In some embodiments, the gesture comprises movement. In some embodiments, the location relative to the structural feature of the facility is established at a first time. In some embodiments, the one or more controllers are configured to maintain, or direct maintenance of, the relative location as the mobile circuitry moves (i) locally in the facility or (ii) remotely from the facility. In some embodiments, the one or more controllers are configured to maintain, or direct maintenance of, the relative location in real time. In some embodiments, the digital twin comprises a virtual three dimensional representation of a plurality of structural features of the facility comprising a wall, a floor, a window, a door, or a table, of the facility. In some embodiments, the digital twin comprises a virtual three dimensional representation of a plurality of structural features of the facility comprising fixtures or non-fixtures of the facility. In some embodiments, the digital twin is configured (a) to identify a spatial relationship between the known location and the virtual representation of the real interactive target in at least two dimensions, and/or (b) to identify a relative pointing direction to the real interactive target. In some embodiments, the initial virtual location is the known location. In some embodiments, the initial virtual location is different from the known location. In some embodiments, the mobile circuitry is disposed distant from the known location. In some embodiments, the one or more controllers are configured to align, or direct alignment of, the initial virtual location with a virtual representation of the known location in the digital twin. In some embodiments, the user manipulating the mobile circuitry is located distant from the known location. In some embodiments, the one or more controllers are configured to align, or direct alignment of, the initial virtual location with a virtual representation of the known location in the digital twin. In some embodiments, the user is outside of the facility. In some embodiments, the user is in the facility. In some embodiments, the digital twin is configured to identify a digital ray projecting from the location of the mobile circuitry to the real interactive target. In some embodiments, the mobile circuitry is configured to execute at least one gesture to specify a direction of the digital ray. In some embodiments, the at least one gesture comprises a pointing, a movement, or a clicking action. In some embodiments, the real interactive target comprises a media display. In some embodiments, the digital twin is configured to identify a selection of an active media element in the media display. In some embodiments, the active media element is a pulldown menu selection. In some embodiments, the selection of the active media element comprises a pointing motion, a movement motion, or a clicking action. In some embodiments, the one or more controllers are configured to alter the current state of the real interactive target commensurate with the intent of the gesture. In some embodiments, the one or more controllers are configured to use the gesture imparted by the user to couple the mobile circuitry to the real interactive target as a result of the mobile circuitry pointing a side to the real interactive target. In some embodiments, the side is a front of a remote controller in which the mobile circuitry is embedded. In some embodiments, the one or more controllers are configured to generate a change in an electrical signal to an optically tintable window to alter a tint of the optically tintable window. In some embodiments, the optically tintable window comprises an electrochromic window. In some embodiments, the one or more controllers are configured to alter the current state of a tint of an optically tintable window. In some embodiments, the optically tintable window comprises an electrochromic window. In some embodiments, the one or more controllers are configured to alter the current state of a menu-controller parameter of a media content display. In some embodiments, the one or more controllers are configured to alter the current state of a parameter of a sensor and/or emitter. In some embodiments, the one or more controllers are configured to alter the current state of a command setting of an environmental control unit. In some embodiments, the environmental control unit is configured to control an environment of the facility. In some embodiments, the command setting is configured to include (i) a tint density of a tintable window, (ii) a temperature setting of an HVAC unit, (iii) a fan setting of an HVAC unit, and/or (iv) an on/off setting of a lighting unit. In some embodiments, the digital twin is configured to represent a plurality of structural features. In some embodiments, the structural features include static elements and dynamic elements. In some embodiments, the dynamic elements are configured to include the virtual representation of the real interactive target. In some embodiments, the dynamic elements are configured to include the current state of the real interactive target. In some embodiments, the one or more controllers are configured to update the current state of the virtual representation of the real interactive target in the digital twin over a control network when the current state of the real interactive target changes. In some embodiments, at least two of operations (A), (B), (C), and (D) are configured to be performed by the same controller of the one or more controllers. In some embodiments, at least two of operations (A), (B), (C), and (D) are configured to be performed by different controllers of the one or more controllers.

In another aspect, a non-transitory computer program product for controlling an interactive target of a facility, which non-transitory computer program product contains instructions inscribed thereon that, when executed by one or more processors, cause the one or more processors to execute operations comprises: (A) monitoring a location of a mobile circuitry relative to a digital twin that comprises a virtual three dimensional representation of a structural feature of the facility having a real interactive target, which mobile circuitry (I) is movable by a user, (II) has a known location relative to at least a portion of the structural feature, and (III) is coupled to a virtual representation of the real interactive target in the digital twin; (B) relating a gesture imparted on the mobile circuitry to the digital twin and generate a result, which gesture (i) is imparted by the user, (ii) is made with an intent to remotely cause an alteration of the real interactive target, and (iii) is during coupling with the real interactive target; and (C) using the result to alter a current state of the real interactive target in the facility.

In some embodiments, the operations comprise configuring the digital twin according to a building information modeling data file according to which the facility was or is constructed. In some embodiments, the building information modeling data file comprises an architectural detail of the facility, an annotation, or an information from a model database of the facility. In some embodiments, the building information modeling data file is utilized for planning and/or tracking various stages in a lifecycle of the facility including concept, construction, maintenance and/or demolition, of the facility. In some embodiments, the building information modeling data file comprises a three dimensional structural model annotated with two-dimensional drafting elements in a database. In some embodiments, the three dimensional structural model comprises parametric elements providing geometric parameters of the structural feature. In some embodiments, the operations are adapted for the facility to include a digital network. In some embodiments, the digital network is used at least in part for monitoring the location of the mobile circuitry and/or a gesture imparted on the mobile circuitry. In some embodiments, the operations are adapted for the facility to include a digital network that is communicatively coupled to the real interactive target. In some embodiments, the operations are adapted for the facility that comprises a control network communicatively coupled to the real interactive target to support (a) monitoring the gesture imparted on the mobile circuitry, and/or (b) altering the current state of the real interactive target. In some embodiments, the operations are adapted for the control network that is a hierarchical network comprising a plurality of controllers. In some embodiments, the operations are adapted for the mobile circuitry to include in a handheld pointing device. In some embodiments, the operations are adapted for the mobile circuitry to include in a mobile phone. In some embodiments, the operations are adapted for the mobile circuitry to include in a handheld gaming controller having a motion function, a clicking function and/or a select function. In some embodiments, the operations are adapted for the mobile circuitry to include, or be coupled to, a motion sensor. In some embodiments, the operations are adapted for the mobile circuitry to exclude utilization of an electromagnetic beam or a sonic beam. In some embodiments, the operations are adapted for the mobile circuitry to be comprised in a virtual reality (VR) interface that includes a display headset, a handheld controller with a motion function, and/or a select function. In some embodiments, the operations are adapted for the mobile circuitry to be included in a laptop computer. In some embodiments, the operations are adapted for the mobile circuitry to be included in a tablet computer. In some embodiments, the location relative to the structural feature of the facility is established at a first time, and the relative location is maintained as the mobile circuitry moves (i) locally in the facility or (ii) remotely from the facility. In some embodiments, the relative location is maintained in real time. In some embodiments, the digital twin comprises a virtual three dimensional representation of a plurality of structural features of the facility comprising a wall, a floor, a window, a door, or a table, of the facility. In some embodiments, the digital twin comprises a virtual three dimensional representation of a plurality of structural features of the facility comprising fixtures or non-fixtures of the facility. In some embodiments, the coupling of the mobile circuitry to the virtual representation of the real interactive target in the digital twin is comprised of (i) a spatial relationship between the mobile circuitry and the at least the portion of the structural feature identified in at least two dimensions and (ii) a relative pointing direction of the mobile circuitry to the real interactive target. In some embodiments, the coupling of the mobile circuitry to the virtual representation of the real interactive target in the digital twin is comprised of a virtual digital ray that extends from the location of the mobile circuitry to the target. In some embodiments, the gesture is executed with the mobile circuitry to specify a direction of the virtual digital ray. In some embodiments, the gesture comprises a pointing, movement, or clicking action. In some embodiments, the real interactive target comprises a media display. In some embodiments, coupling of the mobile circuitry to the virtual representation of the real interactive target in the digital twin includes a selection of an active media element in the media display. In some embodiments, the active media element is a pulldown menu selection. In some embodiments, the selection of the active media element comprises a pointing motion, a movement motion, or a clicking action. In some embodiments, the altering the function of the real interactive target is commensurate with the intent of the gesture. In some embodiments, the gesture imparted by the user couples to the real interactive target as a result of the mobile circuitry pointing to the real interactive target. In some embodiments, the current state being altered comprises a change in a signal to an optically tintable window. In some embodiments, the optically tintable window comprises an electrochromic window. In some embodiments, the current state being altered comprises a menu-controlled parameter of a media content display. In some embodiments, the current state being altered comprises a parameter of sensor and/or emitter. In some embodiments, the current state being altered comprises a command setting of an environmental control unit. In some embodiments, the environmental control unit controls an environment of the facility. In some embodiments, the command setting comprises (i) a tint density of a tintable window, (ii) a temperature setting of an HVAC unit, (iii) a fan setting of an HVAC unit, or (iv) an on/off setting of a lighting unit. In some embodiments, the digital twin represents a plurality of structural features. In some embodiments, the structural features include static elements and/or dynamic elements. In some embodiments, the dynamic elements include the virtual representation of the real interactive target. In some embodiments, the dynamic elements include the current state of the real interactive target. In some embodiments, the facility includes a control network that is communicatively coupled (i) to the real interactive target and (ii) to the digital twin. In some embodiments, the operations comprise updating the current state of the virtual representation of the real interactive target in the digital twin over the control network when the current state of the real interactive target changes. In some embodiments, the operations are adapted for the facility to include a controller network that is communicatively coupled to the real interactive target. In some embodiments, the operations further comprise transmitting one or more data messages from the controller network to the digital twin for updating the digital twin. In some embodiments, the digital twin is updated according to a change in the current state of the real interactive target. In some embodiments, the operations further comprise exchanging messages between the digital twin and the mobile circuitry to (i) provide an analysis to the mobile circuitry corresponding to an initial virtual location, and (ii) navigate virtually in the digital twin to interact with the virtual representation of the real interactive target in the digital twin. In some embodiments, the initial virtual location is the known location. In some embodiments, the initial virtual location is different from the known location. In some embodiments, the mobile circuitry is disposed distant from the known location. In some embodiments, the operations comprise aligning the initial virtual location with a virtual representation of the known location in the digital twin. In some embodiments, the user manipulating the mobile circuitry is located distant from the known location. In some embodiments, the operations comprise aligning the initial virtual location with a virtual representation of the known location in the digital twin. In some embodiments, the user is outside of the facility. In some embodiments, the user is in the facility. In some embodiments, the initial virtual location is a default location. In some embodiments, the operations further comprise transmitting a location message from the mobile circuitry to the digital twin to specify the initial virtual location. In some embodiments, the operations further comprises (a) transmitting a control action message from the mobile circuitry to the digital twin in response to the gesture imparted on the mobile circuitry; (b) validating the gesture against predetermined control actions in the digital twin; and (c) transmitting a command message to the real interactive target when the gesture is validated. In some embodiments, the digital twin comprises virtual three dimensional representations of a plurality of structural features of the facility including a plurality of real interactive targets. In some embodiments, the virtual three dimensional representations are modified in response to addition and/or subtraction of one or more real interactive targets in the facility. In some embodiments, at least two of operations (A), (B), and (C), are performed by the same processor of the one or more processors. In some embodiments, at least two of operations (A), (B), and (C), are performed by different processors of the one or more processors.

In another aspect, a method for controlling a service device of a facility, the method comprises: (a) identifying the service device by a control system configured to control the service device, which service device is proximate to a user disposed in the facility; (b) registering in the control system a location of the user in the facility; (c) offering the service device from a plurality of devices, which service device is offered based at least in part on the location of the user; and (d) directing the service device to execute the service selected by the user.

In some embodiments, the method further comprises offering to the user a selection comprising a service provided by the service device. In some embodiments, the location of the user is sensed by a sensor communicatively coupled to the control system. In some embodiments, the method further comprises operatively coupling the service device to the control system by utilizing a network authentication protocol. In some embodiments, the method further comprises utilizing a security protocol when controlling the service device. In some embodiments, the method further comprises utilizing a building automation and control protocol when controlling the service device. In some embodiments, proximate to a user is at least about fifteen (15) meters, twenty (20), thirty (30) meters, or more. In some embodiments, a mobile circuitry of the user is indirectly coupled to the service device. In some embodiments, the service device has a range, and wherein proximate to the user is when the user is in the range of the service device. In some embodiments, the service device has a first range, wherein the user has a second range, and wherein proximate to the user comprises an intersection between the first range of the service device and the second range of the user. In some embodiments, the first range and/or the second range is adjustable. In some embodiments, the first range is particular to the service device, service device type, and/or location of the service device. In some embodiments, the first range differs amongst service devices, service devices of different types, and/or service devices of different locations. In some embodiments, the control system the control system that is configured to control at least one other device affixed to the facility. In some embodiments, the method further comprises using the mobile circuitry and the control system to control the at least one other device of the facility. In some embodiments, the at least one other device comprises an electrochromic device. In some embodiments, the at least one other device comprises a media display, a lighting, a sensor, an emitter, an antenna, a heating ventilation and air conditioning (HVAC) system. In some embodiments, the location of the user is sensed by a sensor communicatively coupled to the control system. In some embodiments, the method further comprises determining the location of the user. In some embodiments, determination of the location of the user is by utilizing ultrawide radio waves. In some embodiments, determination of the location of the user is at an accuracy of at least about twenty (20) meters or to a higher degree of accuracy. In some embodiments, the location of the user is determined using ultrawide radio waves. In some embodiments, offering the service device is through an application installed in a mobile circuitry held by the user. In some embodiments, offering the selection of the service is through an application installed in a mobile circuitry held by the user. In some embodiments, the service is selected by the user is without contacting the service device. In some embodiments, the service of the service device is depicted on the service device. In some embodiments, the user selects the service by pointing a mobile circuitry towards a depiction of the service on the service device without contacting the service device. In some embodiments, the mobile circuitry comprises a cellular phone, tablet, or laptop computer. In some embodiments, the method further comprises depicting a virtual representation of at least a portion of the facility in which the service device is disposed, which depiction is by the mobile circuitry. In some embodiments, the method further comprises depicting a virtual representation of the service device by the mobile circuitry. In some embodiments, the method further comprises depicting a virtual representation of the service provide by the service device, which depiction is by the mobile circuitry. In some embodiments, the method further comprises depicting a virtual representation of a service execution by the service device, which depiction is by the mobile circuitry. In some embodiments, the method further comprises using the control system to update in real time the virtual representation of the service execution by the service device, as the service is executed.

In another aspect, a non-transitory computer program product for controlling a service device of a facility, which non-transitory computer program product contains instructions inscribed thereon that, when executed by one or more processors, cause the one or more processors to execute operations comprises: (a) identifying the service device by a control system configured to control the service device which service device is proximate to a user disposed in the facility; (b) registering in the control system a location of the user in the facility; (c) offering the service device from a plurality of devices, which service device is offered based at least in part on the location of the user; and (d) directing the service device to execute the service selected by the user.

In some embodiments, the operations comprise comprising offering to the user a selection comprising a service provided by the service device. In some embodiments, the location of the user is sensed by a sensor communicatively coupled to the control system. In some embodiments, the operations comprise operatively coupling the service device to the control system by utilizing a network authentication protocol. In some embodiments, the operations comprise identifying the service device by the control system configured to control the service device by utilizing a security protocol. In some embodiments, the operations comprise identifying the service device by the control system configured to control the service device by a building automation and control protocol. In some embodiments, the operations further comprise identifying the service device by the control system that is further configured to control at least one other device affixed to the facility. In some embodiments, the operations further comprise controlling the at least one other device of the facility by using the control system and the mobile circuitry. In some embodiments, the at least one other device comprises an electrochromic device. In some embodiments, the at least one other device comprises a media display, a lighting, a sensor, an emitter, an antenna, a heating ventilation and air conditioning (HVAC) system. In some embodiments, the service device has a range, and wherein proximate to the user is when the user is in the range of the service device. In some embodiments, the service device has a first range, wherein the user has a second range, and wherein proximate to the user comprises an intersection between the first range of the service device and the second range of the user. In some embodiments, the first range and/or the second range is adjustable. In some embodiments, the first range is particular to the service device, service device type, and/or location of the service device. In some embodiments, the first range differs amongst service devices, service devices of different types, and/or service devices of different locations. In some embodiments, the operations further comprise determining the location of the user. In some embodiments, the operations further comprise determining the location of the user by using ultrawide radio waves. In some embodiments, the operations further comprise determining the location of the user at an accuracy of at least about twenty (20) meters or to a higher degree of accuracy. In some embodiments, offering the service device is through an application installed in a mobile circuitry held by the user. In some embodiments, offering the selection of the service is through an application installed in a mobile circuitry held by the user. In some embodiments, the service is selected by the user is without contacting the service device. In some embodiments, the service of the service device is depicted on the service device. In some embodiments, the operations further comprise facilitating selection of the service by detecting a pointing target of a mobile circuitry towards a depiction of the service on the service device, which pointing target is pointed to by a user without contacting the service device. In some embodiments, the mobile circuitry comprises a cellular phone, tablet, or laptop computer. In some embodiments, the operations further comprise facilitating usage of the mobile circuitry to depict a virtual representation of at least a portion of the facility in which the service device is disposed. In some embodiments, the operations further comprise depicting a virtual representation of the service device on the mobile circuitry. In some embodiments, the operations further comprise depicting a virtual representation of the service provide by the service device on the mobile circuitry. In some embodiments, the operations further comprise depicting a virtual representation of a service execution by the service device on the mobile circuitry. In some embodiments, the operations further comprise using the control system to update in real time the virtual representation of the service execution by the service device, as the service is executed. In some embodiments, one processor is configured to execute at least two of operations (a) (b), (c), and (d). In some embodiments, at least two of operations (a) (b), (c), and (d) are executed by different processors.

In another aspect, an apparatus for controlling a service device of a facility, the apparatus comprises at least one controller comprising circuitry, which at least one controller is configured to: (a) operatively couple to, and control or direct control of, the service device; (b) identify, or direct identification of, the service device that is disposed proximate to a user disposed in the facility; (c) register, or direct registration of, a location of the user in the facility; (d) offer, or direct offering of, the service device from a plurality of devices, which service device is offered based at least in part on the location of the user; and (e) directing the service device to execute the service selected by the user.

In some embodiments, the at least one controller is configured to offer, or direct offering of, a selection comprising a service provided by the service device. In some embodiments, the at least one controller is configured to operatively coupled to a sensor that is configured to sense a location of the user. In some embodiments, the at least one controller is configured to operatively couple the service device to the control system by utilizing, or by directing utilization of, a network authentication protocol. In some embodiments, the at least one controller is configured to control or direct control of, the service device by using a security protocol. In some embodiments, the at least one controller is configured to control or direct control of, the service device by using a building automation and control protocol. In some embodiments, the at least one controller is configured to operatively couple to, and control or direct control of, at least one other device affixed to the facility. In some embodiments, the at least one controller is configured to control, or direct control of, the at least one other device of the facility by using the mobile circuitry. In some embodiments, the at least one other device comprises an electrochromic device. In some embodiments, the at least one other device comprises a media display, a lighting, a sensor, an emitter, an antenna, a heating ventilation and air conditioning (HVAC) system. In some embodiments, the service device has a range, and wherein proximate to the user is when the user is in the range of the service device. In some embodiments, the service device has a first range, wherein the user has a second range, and wherein proximate to the user comprises an intersection between the first range of the service device and the second range of the user. In some embodiments, the first range and/or the second range is adjustable. In some embodiments, the first range is particular to the service device, service device type, and/or location of the service device. In some embodiments, first range differs amongst service devices, service devices of different types, and/or service devices of different locations. In some embodiments, the at least one controller is configured to determine, or direct determination of, the location of the user. In some embodiments, the at least one controller is configured to determine, or direct determination of, the location of the user by using ultrawide radio waves. In some embodiments, the at least one controller is configured to determine, or direct determination of, the location of the user at an accuracy of at least about twenty (20) meters or to a higher degree of accuracy. In some embodiments, the at least one controller is configured to offer, or direct offering of, the service device through an application installed in a mobile circuitry held by the user. In some embodiments, the at least one controller is configured to offer, or direct offering of, the selection of the service through an application installed in a mobile circuitry held by the user. In some embodiments, the service of the service device is depicted on the service device. In some embodiments, the at least one controller is configured to facilitate, or direct facilitation of, selecting the service by detecting, or directing detection of, a pointing target of a mobile circuitry towards a depiction of the service on the service device, which pointing target is pointed to by a user without contacting the service device. In some embodiments, the mobile circuitry comprises a cellular phone, tablet, or laptop computer. In some embodiments, the at least one controller is configured to facilitate, or direct facilitation of, usage of the mobile circuitry to depict a virtual representation of at least a portion of the facility in which the service device is disposed. In some embodiments, the at least one controller is configured to depict, or direct depiction of, a virtual representation of the service device on the mobile circuitry. In some embodiments, the at least one controller is configured to depict, or direct depiction of, a virtual representation of the service provided by the service device on the mobile circuitry. In some embodiments, the at least one controller is configured to depict, or direct depiction of, a virtual representation of a service execution by the service device on the mobile circuitry. In some embodiments, the at least one controller is configured to update in real time, or direct real time update of, the virtual representation of the service execution by the service device, as the service is executed. In some embodiments, one controller is configured to perform at least two of operations (b), (c), (d), and (e). In some embodiments, at least two of operations (b), (c), (d), and (e) are performed by different controllers.

In another aspect, a method of controlling a facility, the method comprises: (a) identifying an identity of a user by a control system; (b) tracking location of the user in the facility by using one or more sensors disposed in the facility, which one or more sensors are communicatively coupled to the control system; (c) using an input related to the user; and (d) using the control system to automatically control (e.g., alter) one or more devices in the facility by using the input and location information of the user, which one or more devices are communicatively coupled to the control system.

In some embodiments, the location is a present location of the user or a past location of the user. In some embodiments, identifying the identity of the user comprises receiving an identification card reading, or performing image recognition on a captured image of the user in the facility. In some embodiments, the one or more sensors comprise a camera or a geolocation sensor. In some embodiments, the geolocation sensor comprises an ultrawide bandwidth sensor. In some embodiments, the geolocation sensor can locate the user with a resolution of at least twenty (20) centimeters or a higher resolution. In some embodiments, the input related to the user comprises a service request made by, on behalf of, or for, the user. In some embodiments, the input related to the user relates to activity of the user in an enclosure in which the user is located. In some embodiments, the input related to the user comprises an electronic file. In some embodiments, the input related to the user comprises a gesture and/or voice command made by the user. In some embodiments, the input related to the user relates to preference of the user. In some embodiments, the preference of the user is provided by machine learning that considers past activities of the user. In some embodiments, the preference of the user is input by the user. In some embodiments, the one or more devices comprises a lighting, a ventilation system, and air conditioning system, a heating system, a sound system, or a smell conditioning system. In some embodiments, the one or more devices is configured to affect an atmosphere of an enclosure in which the user is disposed. In some embodiments, the one or more devices comprises a service, office and/or factory apparatus. In some embodiments, the one or more devices are disposed out of an enclosure of the facility in which the user is located. In some embodiments, the one or more devices are disposed in an enclosure of the facility in which the user is located. In some embodiments, the one or more devices comprise a media projecting device. In some embodiments, the one or more devices comprise a tintable window. In some embodiments, the one or more devices comprise an electrochromic window. A non-transitory computer readable medium for controlling a facility, the non-transitory computer readable medium, when read by one or more processors, is configured to execute operations comprising the any of the above method operations.

In another aspect, an apparatus for controlling a facility, the apparatus comprising at least one controller having circuitry, which at least one controller is configured to: (a) operatively couple to one or more sensors disposed in the facility, and to one or more devices disposed in the facility; (b) identify, or direct identification of, a user; (c) track, or direct tracking of, location of the user in the facility by using the one or more sensors; (d) receive an input related to the user; and (e) automatically control (e.g., alter), or direct automatic control (e.g., alteration) of, one or more devices in the facility by using the input and location information of the user.

In some embodiments, at least one controller is configured to utilize location of the user that is a present location of the user or a past location of the user. In some embodiments, the at least one controller is configured to identify, or direct identification of, the user at least in part by (I) receiving an identification card reading, or (II) performing image recognition on a captured image of the user in the facility. In some embodiments, the one or more sensors comprise a camera or a geolocation sensor. In some embodiments, the geolocation sensor comprises an ultrawide bandwidth sensor. In some embodiments, the geolocation sensor can locate the user with a resolution of at least twenty (20) centimeters or higher. In some embodiments, the input related to the user comprises a service request made by, on behalf of, or for, the user. In some embodiments, the input related to the user relates to activity of the user in an enclosure of the facility in which the user is located. In some embodiments, the input related to the user comprises an electronic file. In some embodiments, the input related to the user comprises a gesture and/or voice command made by the user. In some embodiments, the input related to the user relates to preference of the user. In some embodiments, the preference of the user is provided by a machine learning module that considers past activities of the user, wherein the at least one controller is operatively coupled to the machine learning module. In some embodiments, the preference of the user is input by the user. In some embodiments, the one or more devices comprises a lighting, a ventilation system, and air conditioning system, a heating system, a sound system, or a smell conditioning system. In some embodiments, the one or more devices is configured to affect an atmosphere of an enclosure of the facility in which the user is disposed. In some embodiments, the one or more devices comprises a service, office and/or factory apparatus. In some embodiments, the one or more devices are disposed out of an enclosure of the facility in which the user is located. In some embodiments, the one or more devices are disposed in an enclosure of the facility in which the user is located. In some embodiments, the one or more devices comprise a media projecting device. In some embodiments, the one or more devices comprise a tintable window. In some embodiments, the one or more devices comprise an electrochromic window. A non-transitory computer readable medium for controlling a facility, the non-transitory computer readable medium, when read by one or more processors, is configured to execute operations comprising operations of any of the above one or more controllers.

In another aspect, the present disclosure provides systems, apparatuses (e.g., controllers), and/or non-transitory computer-readable medium (e.g., software) that implement any of the methods disclosed herein.

In another aspect, the present disclosure provides methods that use any of the systems and/or apparatuses disclosed herein, e.g., for their intended purpose.

In another aspect, an apparatus comprises at least one controller that is programmed to direct a mechanism used to implement (e.g., effectuate) any of the method disclosed herein, wherein the at least one controller is operatively coupled to the mechanism.

In another aspect, an apparatus comprises at least one controller that is configured (e.g., programmed) to implement (e.g., effectuate) the method disclosed herein. The at least one controller may implement any of the methods disclosed herein.

In another aspect, a system comprises at least one controller that is programmed to direct operation of at least one another apparatus (or component thereof), and the apparatus (or component thereof), wherein the at least one controller is operatively coupled to the apparatus (or to the component thereof). The apparatus (or component thereof) may include any apparatus (or component thereof) disclosed herein. The at least one controller may direct any apparatus (or component thereof) disclosed herein.

In another aspect, a computer software product, comprising a non-transitory computer-readable medium in which program instructions are stored, which instructions, when read by a computer, cause the computer to direct a mechanism disclosed herein to implement (e.g., effectuate) any of the method disclosed herein, wherein the non-transitory computer-readable medium is operatively coupled to the mechanism. The mechanism can comprise any apparatus (or any component thereof) disclosed herein.

In another aspect, the present disclosure provides a non-transitory computer-readable medium comprising machine-executable code that, upon execution by one or more computer processors, implements any of the methods disclosed herein.

In another aspect, the present disclosure provides a non-transitory computer-readable medium comprising machine-executable code that, upon execution by one or more computer processors, effectuates directions of the controller(s) (e.g., as disclosed herein).

In another aspect, the present disclosure provides a computer system comprising one or more computer processors and a non-transitory computer-readable medium coupled thereto. The non-transitory computer-readable medium comprises machine-executable code that, upon execution by the one or more computer processors, implements any of the methods disclosed herein and/or effectuates directions of the controller(s) disclosed herein.

The content of this summary section is provided as a simplified introduction to the disclosure and is not intended to be used to limit the scope of any invention disclosed herein or the scope of the appended claims.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

These and other features and embodiments will be described in more detail with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig." and "Figs." herein), of which:

FIG. 1 shows a perspective view of an enclosure (e.g., a building) and a control system;

FIG. 9 is a flowchart of a control method;

Figure 2:
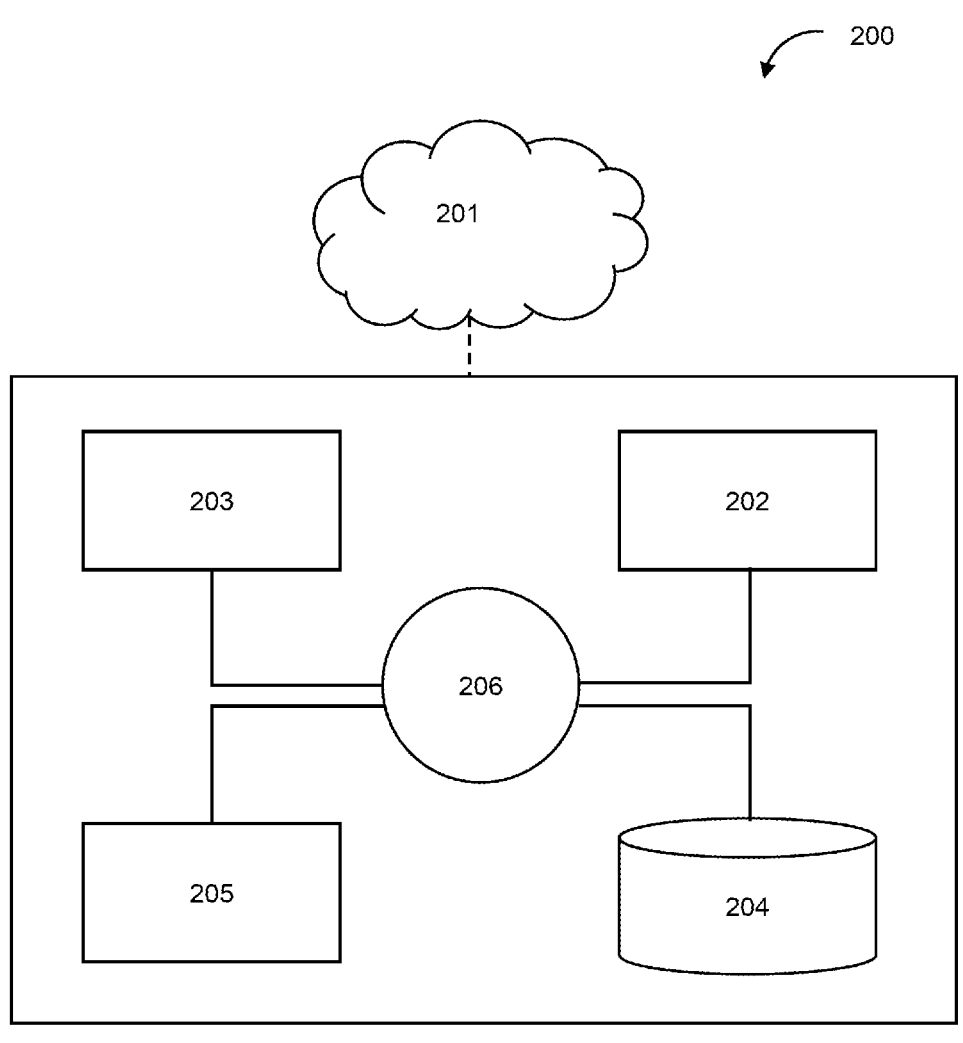
FIG. 2 schematically depicts a processing system.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an," and "the" are not intended to refer to only a singular entity but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

The term "operatively coupled" or "operatively connected" refers to a first element (e.g., mechanism) that is coupled (e.g., connected) to a second element, to allow the intended operation of the second and/or first element. The coupling may comprise physical or non-physical coupling. The non-physical coupling may comprise signal-induced coupling (e.g., wireless coupling). Coupled can include physical coupling (e.g., physically connected), or non-physical coupling (e.g., via wireless communication). Additionally, in the following description, the phrases "operable to," "adapted to," "configured to," "designed to," "programmed to," or "capable of" may be used interchangeably where appropriate.

An element (e.g., mechanism) that is "configured to" perform a function includes a structural feature that causes the element to perform this function. A structural feature may include an electrical feature, such as a circuitry or a circuit element. A structural feature may include a circuitry (e.g., comprising electrical or optical circuitry). Electrical circuitry may comprise one or more wires. Optical circuitry may comprise at least one optical element (e.g., beam splitter, mirror, lens and/or optical fiber). A structural feature may include a mechanical feature. A mechanical feature may comprise a latch, a spring, a closure, a hinge, a chassis, a support, a fastener, or a cantilever, and so forth. Performing the function may comprise utilizing a logical feature. A logical feature may include programming instructions. Programming instructions may be executable by at least one processor. Programming instructions may be stored or encoded on a medium accessible by one or more processors.

The following detailed description is directed to specific example implementations for purposes of disclosing the subject matter. Although the disclosed implementations are described in sufficient detail to enable those of ordinary skill in the art to practice the disclosed subject matter, this disclosure is not limited to particular features of the specific example implementations described herein. On the contrary, the concepts and teachings disclosed herein can be implemented and applied in a multitude of different forms and ways without departing from their spirit and scope. For example, while the disclosed implementations focus on electrochromic windows (also referred to as smart windows), some of the systems, devices and methods disclosed herein can be made, applied or used without undue experimentation to incorporate, or while incorporating, other types of optically switchable devices that are actively switched/controlled, rather than passive coatings such as thermochromic coatings or photochromic coatings that tint passively in response to the sun's rays. Some other types of actively controlled optically switchable devices include liquid crystal devices, suspended particle devices, and micro-blinds, among others. For example, some or all of such other optically switchable devices can be powered, driven or otherwise controlled or integrated with one or more of the disclosed implementations of controllers described herein.

In some embodiments, an enclosure comprises an area defined by at least one structure (e.g., fixture). The at least one structure may comprise at least one wall. An enclosure may comprise and/or enclose one or more sub-enclosures. The at least one wall may comprise metal (e.g., steel), clay, stone, plastic, glass, plaster (e.g., gypsum), polymer (e.g., polyurethane, styrene, or vinyl), asbestos, fiber-glass, concrete (e.g., reinforced concrete), wood, paper, or a ceramic. The at least one wall may comprise wire, bricks, blocks (e.g., cinder blocks), tile, drywall, or frame (e.g., steel frame and/or wooden frame).

In some embodiments, the enclosure comprises one or more openings. The one or more openings may be reversibly closable. The one or more openings may be permanently open. A fundamental length scale of the one or more openings may be smaller relative to the fundamental length scale of the wall(s) that define the enclosure. A fundamental length scale may comprise a diameter of a bounding circle, a length, a width, or a height. The fundamental length scale may be abbreviated herein as "FLS." A surface of the one or more openings may be smaller relative to the surface the wall(s) that define the enclosure. The opening surface may be a percentage of the total surface of the wall(s). For example, the opening surface can measure about 30%, 20%, 10%, 5%, or 1% of the walls(s). The wall(s) may comprise a floor, a ceiling or a side wall. The closable opening may be closed by at least one window or door. The enclosure may be at least a portion of a facility. The facility may comprise a building. The enclosure may comprise at least a portion of a building. The building may be a private building and/or a commercial building. The building may comprise one or more floors. The building (e.g., floor thereof) may include at least one of: a room, hall, foyer, attic, basement, balcony (e.g., inner or outer balcony), stairwell, corridor, elevator shaft, façade, mezzanine, penthouse, garage, porch (e.g., enclosed porch), terrace (e.g., enclosed terrace), cafeteria, and/or duct. In some embodiments, an enclosure may be stationary and/or movable (e.g., a train, a plane, a ship, a vehicle, or a rocket).

In some embodiments, the enclosure encloses an atmosphere. The atmosphere may comprise one or more gases. The gases may include inert gases (e.g., argon or nitrogen) and/or non-inert gases (e.g., oxygen or carbon dioxide). The enclosure atmosphere may resemble an atmosphere external to the enclosure (e.g., ambient atmosphere) in at least one external atmosphere characteristic that includes: temperature, relative gas content, gas type (e.g., humidity, and/or oxygen level), debris (e.g., dust and/or pollen), and/or gas velocity. The enclosure atmosphere may be different from the atmosphere external to the enclosure in at least one external atmosphere characteristic that includes: temperature, relative gas content, gas type (e.g., humidity, and/or oxygen level), debris (e.g., dust and/or pollen), and/or gas velocity. For example, the enclosure atmosphere may be less humid (e.g., drier) than the external (e.g., ambient) atmosphere. For example, the enclosure atmosphere may contain the same (e.g., or a substantially similar) oxygen-to-nitrogen ratio as the atmosphere external to the enclosure. The velocity and/or content of the gas in the enclosure may be (e.g., substantially) similar throughout the enclosure. The velocity and/or content of the gas in the enclosure may be different in different portions of the enclosure (e.g., by flowing gas through to a vent that is coupled with the enclosure). The gas content may comprise relative gas ratio.

In some embodiments, a network infrastructure is provided in the enclosure (e.g., a facility such as a building). The network infrastructure is available for various purposes such as for providing communication and/or power services. The communication services may comprise high bandwidth (e.g., wireless and/or wired) communications services. The communication services can be to occupants of a facility and/or users outside the facility (e.g., building). The network infrastructure may work in concert with, or as a partial replacement of, the infrastructure of one or more cellular carriers. The network may comprise one or more levels of encryption. The network may be communicatively coupled to the cloud and/or to one or more servers external to the facility. The network may support at least a fourth generation wireless (4G), or a fifth-generation wireless (5G) communication. The network may support cellular signals external and/or internal to the facility. The downlink communication network speeds may have a peak data rate of at least about 5 Gigabits per second (Gb/s), 10 Gb/s, or 20 Gb/s. The uplink communication network speeds may have a peak data rate of at least about 2 Gb/s, 5 Gb/s, or 10 Gb/s. The network infrastructure can be provided in a facility that includes electrically switchable windows. Examples of components of the network infrastructure include a high speed backhaul. The network infrastructure may include at least one cable, switch, (e.g., physical) antenna, transceivers, sensor, transmitter, receiver, radio, processor and/or controller (that may comprise a processor). The network infrastructure may be operatively coupled to, and/or include, a wireless network. The network infrastructure may comprise wiring (e.g., comprising an optical fiber, twisted cable, or coaxial cable). One or more devices (e.g., sensors and/or emitters) can be deployed (e.g., installed) in an environment, e.g., as part of installing the network infrastructure and/or after installing the network infrastructure. The device(s) may be communicatively coupled to the network. The network may comprise a power and/or communication network. The device can be self-discovered on the network, e.g., once it couples (e.g., on its attempt to couple) to the network. The network structure may comprise peer to peer network structure, or client-server network structure. The network may or may not have a central coordination entity (e.g., server(s) or another stable host).

In some embodiments, a building management system (BMS) is a computer-based control system. The BMS can be installed in a facility to monitor and otherwise control (e.g., regulate, manipulate, restrict, direct, monitor, adjust, modulate, vary, alter, restrain, check, guide, or manage) the facility. For example, the BMS may control one or more devices communicatively coupled to the network. The one or more devices may include mechanical and/or electrical equipment such as ventilation, lighting, power systems, elevators, fire systems, and/or security systems. Controllers (e.g., nodes and/or processors) may be suited for integration with a BMS. A BMS may include hardware. The hardware may include interconnections by communication channels to one or more processors (e.g., and associated software), e.g., for maintaining one or more conditions in the facility. The one or more conditions in the facility may be according to preference(s) set by a user (e.g., an occupant, a facility owner, and/or a facility manager). For example, a BMS may be implemented using a local area network, such as Ethernet. The software can utilize, e.g., internet protocols and/or open standards. One example is software from Tridium, Inc. (of Richmond, Va.). One communication protocol that can be used with a BMS is BACnet (building automation and control networks). A node can be any addressable circuitry. For example, a node can be a circuitry that has an Internet Protocol (IP) address.

In some embodiments, a BMS may be implemented in a facility, e.g., a multi-story building. The BMS may function (e.g., also) to control one or more characteristics of an environment of the facility. The one or more characteristics may comprise: temperature, carbon dioxide levels, gas flow, various volatile organic compounds (VOCs), and/or humidity in a building. There may be mechanical devices that are controlled by a BMS such as one or more heaters, air conditioners, blowers, and/or vents. To control the facility environment, a BMS may turn these various devices on and/or off under defined conditions. A core function of a BMS may be to maintain a comfortable environment for occupants of the environment, e.g., while minimizing heating and cooling costs and/or demand. A BMS can be used to control one or more of the various systems. A BMS may be used to optimize the synergy between various systems. For example, the BMS may be used to conserve energy and lower building operation costs.

In some embodiments, the facility comprises a multi-story building. The multi-story building may have at least 2, 8, 10, 25, 50, 80, 100, 120, 140, or 160 floors, e.g., that are controlled by the control system and/or comprise the network infrastructure. The number of floors controlled by the control system and/or comprising the network infrastructure may be any number between the aforementioned numbers (e.g., from 2 to 50, from 25 to 100, or from 80 to 160). The floor may be of an area of at least about 150 m², 250 m², 500 m², 1000 m², 1500 m², or 2000 square meters (m²). The floor may have an area between any of the aforementioned floor area values (e.g., from about 150 m² to about 2000 m², from about 150 m² to about 500 m² from about 250 m² to about 1000 m², or from about 1000 m² to about 2000 m²).

In some embodiments, a window controller is integrated with a BMS. For example, the window controller can be configured to control one or more tintable windows (e.g., electrochromic windows). In one embodiment, the one or more electrochromic windows include at least one all solid state and inorganic electrochromic device, but may include more than one electrochromic device, e.g. where each lite or pane of an IGU is tintable. In one embodiment, the one or more electrochromic windows include only all solid state and inorganic electrochromic devices. In one embodiment, the electrochromic windows are multistate electrochromic windows. Examples of tintable windows can be found in, in U.S. patent application Ser. No. 12/851,514, filed on Aug. 5, 2010, and titled "Multipane Electrochromic Windows," which is incorporated herein by reference in its entirety.

In some embodiments, one or more devices such as sensors, emitters, and/or actuators, are operatively coupled to at least one controller and/or processor. Sensor readings may be obtained by one or more processors and/or controllers. A controller may comprise a processing unit (e.g., CPU or GPU). A controller may receive an input (e.g., from at least one device or projected media). The controller may comprise circuitry, electrical wiring, optical wiring, socket, and/or outlet. A controller may receive an input and/or deliver an output. A controller may comprise multiple (e.g., sub-) controllers. An operation (e.g., as disclosed herein) may be performed by a single controller or by a plurality of controllers. At least two operations may be each preconformed by a different controller. At least two operations may be preconformed by the same controller. A device and/or media may be controlled by a single controller or by a plurality of controllers. At least two devices and/or media may be controlled by a different controller. At least two devices and/or media may be controlled by the same controller. The controller may be a part of a control system. The control system may comprise a master controller, floor (e.g., comprising network controller) controller, or a local controller. The local controller may be a target controller. For example, the local controller may be a window controller (e.g., controlling an optically switchable window), enclosure controller, or component controller. The controller may be a part of a hierarchal control system. They hierarchal control system may comprise a main controller that directs one or more controllers, e.g., floor controllers, local controllers (e.g., window controllers), enclosure controllers, and/or component controllers. The target may comprise a device or a media. The device may comprise an electrochromic window, a sensor, an emitter, an antenna, a receiver, a transceiver, or an actuator.

In some embodiments, the network infrastructure is operatively coupled to one or more controllers. In some embodiments, a physical location of the controller type in the hierarchal control system changes. A controller may control one or more devices (e.g., be directly coupled to the devices). A controller may be disposed proximal to the one or more devices it is controlling. For example, a controller may control an optically switchable device (e.g., IGU), an antenna, a sensor, and/or an output device (e.g., a light source, sounds source, smell source, gas source, HVAC outlet, or heater). In one embodiment, a floor controller may direct one or more window controllers, one or more enclosure controllers, one or more component controllers, or any combination thereof. The floor controller may comprise a floor controller. For example, the floor (e.g., comprising network) controller may control a plurality of local (e.g., comprising window) controllers. A plurality of local controllers may be disposed in a portion of a facility (e.g., in a portion of a building). The portion of the facility may be a floor of a facility. For example, a floor controller may be assigned to a floor. In some embodiments, a floor may comprise a plurality of floor controllers, e.g., depending on the floor size and/or the number of local controllers coupled to the floor controller. For example, a floor controller may be assigned to a portion of a floor. For example, a floor controller may be assigned to a portion of the local controllers disposed in the facility. For example, a floor controller may be assigned to a portion of the floors of a facility. A master controller may be coupled to one or more floor controllers. The floor controller may be disposed in the facility. The master controller may be disposed in the facility, or external to the facility. The master controller may be disposed in the cloud. A controller may be a part of, or be operatively coupled to, a building management system. A controller may receive one or more inputs. A controller may generate one or more outputs. The controller may be a single input single output controller (SISO) or a multiple input multiple output controller (MIMO). A controller may interpret an input signal received. A controller may acquire data from the one or more components (e.g., sensors). Acquire may comprise receive or extract. The data may comprise measurement, estimation, determination, generation, or any combination thereof. A controller may comprise feedback control. A controller may comprise feed-forward control. Control may comprise on-off control, proportional control, proportional-integral (PI) control, or proportional-integral-derivative (PID) control. Control may comprise open loop control, or closed loop control. A controller may comprise closed loop control. A controller may comprise open loop control. A controller may comprise a user interface. A user interface may comprise (or operatively coupled to) a keyboard, keypad, mouse, touch screen, microphone, speech recognition package, camera, imaging system, or any combination thereof. Outputs may include a display (e.g., screen), speaker, or printer. In some embodiments, a local controller controls one or more devices and/or media (e.g., media projection). For example, a local controller can control one or more IGUs, one or more sensors, one or more output devices (e.g., one or more emitters), one or more media, or any combination thereof.

In some embodiments, a BMS includes a multipurpose controller. By incorporating feedback (e.g., of the controller), a BMS can provide, for example, enhanced: 1) environmental control, 2) energy savings, 3) security, 4) flexibility in control options, 5) improved reliability and usable life of other systems (e.g., due to decreased reliance thereon and/or reduced maintenance thereof), 6) information availability and/or diagnostics, 7) higher productivity from personnel in the building (e.g., staff), and various combinations thereof. These enhancements may derive automatically controlling any of the devices. In some embodiments, a BMS may not be present. In some embodiments, a BMS may be present without communicating with a master network controller. In some embodiments, a BMS may communicate with a portion of the levels in the hierarchy of controllers. For example, the BMS may communicate (e.g., at a high level) with a master network controller. In some embodiments, a BMS may not communicate with a portion of the levels in the hierarchy of controllers of the control system. For example, the BMS may not communicate with the local controller and/or intermediate controller. In certain embodiments, maintenance on the BMS would not interrupt control of the devices communicatively coupled to the control system. In some embodiments, the BMS comprises at least one controller that may or may not be part of the hierarchical control system.

FIG. 1 shows an example of a control system architecture 100 disposed at least partly in an enclosure (e.g., building) 150. Control system architecture 100 comprises a master controller 108 that controls floor controllers 106, that in turn control local controllers 104. In the example shown in FIG. 1, a master controller 108 is operatively coupled (e.g., wirelessly and/or wired) to a building management system (BMS) 124 and to a database 120. Arrows in FIG. 1 represents communication pathways. A controller may be operatively coupled (e.g., directly/indirectly and/or wired and/wirelessly) to an external source 110. Master controller 108 may control floor controllers that include network controllers 106, that may in turn control local controllers such as window controllers 104. Floor controllers 106 may also be include network controllers (NC). In some embodiments, the local controllers (e.g., 106) control one or more targets such as IGUs 102, one or more sensors, one or more output devices (e.g., one or more emitters), media, or any combination thereof. The external source may comprise a network. The external source may comprise one or more sensor or output device. The external source may comprise a cloud-based application and/or database. The communication may be wired and/or wireless. The external source may be disposed external to the facility. For example, the external source may comprise one or more sensors and/or antennas disposed, e.g., on a wall or on a ceiling of the facility. The communication may be monodirectional or bidirectional. In the example shown in FIG. 1, the communication all communication arrows are meant to be bidirectional (e.g., 118, 122, 114, and 112).

The methods, systems and/or the apparatus described herein may comprise a control system. The control system can be in communication with any of the apparatuses (e.g., sensors) described herein. The sensors may be of the same type or of different types, e.g., as described herein. For example, the control system may be in communication with the first sensor and/or with the second sensor. A plurality of devices (e.g., sensors and/or emitters) may be disposed in a container and may constitute an ensemble (e.g., a digital architectural element). The ensemble may comprise at least two devices of the same type. The ensemble may comprise at least two devices of a different type. The devices in the ensemble may be operatively coupled to the same electrical board. The electrical board may comprise circuitry. The electrical board may comprise, or be operatively coupled to a controller (e.g., a local controller). The control system may control the one or more devices (e.g., sensors). The control system may control one or more components of a building management system (e.g., lightening, security, and/or air conditioning system). The controller may regulate at least one (e.g., environmental) characteristic of the enclosure. The control system may regulate the enclosure environment using any component of the building management system. For example, the control system may regulate the energy supplied by a heating element and/or by a cooling element. For example, the control system may regulate velocity of an air flowing through a vent to and/or from the enclosure. The control system may comprise a processor. The processor may be a processing unit. The controller may comprise a processing unit. The processing unit may be central. The processing unit may comprise a central processing unit (abbreviated herein as "CPU"). The processing unit may be a graphic processing unit (abbreviated herein as "GPU"). The controller(s) or control mechanisms (e.g., comprising a computer system) may be programmed to implement one or more methods of the disclosure. The processor may be programmed to implement methods of the disclosure. The controller may control at least one component of the forming systems and/or apparatuses disclosed herein. Examples of a digital architectural element can be found in PCT patent application serial number PCT/US20/70123 that is incorporated herein by reference in its entirety.

FIG. 2 shows a schematic example of a computer system 200 that is programmed or otherwise configured to one or more operations of any of the methods provided herein. The computer system can control (e.g., direct, monitor, and/or regulate) various features of the methods, apparatuses and systems of the present disclosure, such as, for example, control heating, cooling, lightening, and/or venting of an enclosure, or any combination thereof. The computer system can be part of, or be in communication with, any sensor or sensor ensemble disclosed herein. The computer may be coupled to one or more mechanisms disclosed herein, and/or any parts thereof. For example, the computer may be coupled to one or more sensors, valves, switches, lights, windows (e.g., IGUs), motors, pumps, optical components, or any combination thereof.

The computer system can include a processing unit (e.g., 206) (also "processor," "computer" and "computer processor" used herein). The computer system may include memory or memory location (e.g., 202) (e.g., random-access memory, read-only memory, flash memory), electronic storage unit (e.g., 204) (e.g., hard disk), communication interface (e.g., 203) (e.g., network adapter) for communicating with one or more other systems, and peripheral devices (e.g., 205), such as cache, other memory, data storage and/or electronic display adapters. In the example shown in FIG. 2, the memory 202, storage unit 204, interface 203, and peripheral devices 205 are in communication with the processing unit 206 through a communication bus (solid lines), such as a motherboard. The storage unit can be a data storage unit (or data repository) for storing data. The computer system can be operatively coupled to a computer network ("network") (e.g., 201) with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 202. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 200 can be included in the circuit.

The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 202 or electronic storage unit 204. The machine executable or machine-readable code can be provided in the form of software. During use, the processor 206 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code or can be compiled during runtime. The code can be supplied in a programming language that can be selected to enable the code to execute in a pre-compiled or as-compiled fashion. In some embodiments, the processor comprises a code. The code can be program instructions. The program instructions may cause the at least one processor (e.g., computer) to direct a feed forward and/or feedback control loop. In some embodiments, the program instructions cause the at least one processor to direct a closed loop and/or open loop control scheme. The control may be based at least in part on one or more sensor readings (e.g., sensor data). One controller may direct a plurality of operations. At least two operations may be directed by different controllers. In some embodiments, a different controller may direct at least two of operations (a), (b) and (c). In some embodiments, different controllers may direct at least two of operations (a), (b) and (c). In some embodiments, a non-transitory computer-readable medium cause each a different computer to direct at least two of operations (a), (b) and (c). In some embodiments, different non-transitory computer-readable mediums cause each a different computer to direct at least two of operations (a), (b) and (c). The controller and/or computer readable media may direct any of the apparatuses or components thereof disclosed herein. The controller and/or computer readable media may direct any operations of the methods disclosed herein. The controller may be operatively (communicatively) coupled to control logic (e.g., code embedded in a software) in which its operation(s) are embodied.

In some embodiments, optically switchable windows forms or occupies substantial portions of a building envelope. For example, the optically switchable windows can form substantial portions of the walls, facades and even roofs of a corporate office building, other commercial building or a residential building. A distributed network of controllers can be used to control the optically switchable windows. For example, a network system may be operable to control a plurality of IGUs. One primary function of the network system is controlling the optical states of electrochromic devices (ECDs) (or other optically switchable devices) within the IGUs. In some implementations, one or more windows can be multi-zoned windows, for example, where each window includes two or more independently controllable ECDs or zones. In some embodiments, the network system 300 (of FIG. 3) is operable to control the electrical characteristics of the power signals provided to the IGUs. For example, the network system can generate and communicate tinting instructions (also referred to herein as "tint commands") which control voltages applied to the ECDs within the IGUs.

In some embodiments, another function of the network system is to acquire status information from the IGUs (hereinafter "information" is used interchangeably with "data"). For example, the status information for a given IGU can include an identification of, or information about, a current tint state of the ECD(s) within the IGU. The network system also can be operable to acquire data from various sensors, such as temperature sensors, photosensors (also referred to herein as light sensors), humidity sensors, air flow sensors, or occupancy sensors, whether integrated on or within the IGUs or located at various other positions in, on or around the building.

The network system can include any suitable number of distributed controllers having various capabilities or functions. In some implementations, the functions and arrangements of the various controllers are defined hierarchically. For example, the network system can include a plurality of distributed window controllers (WCs), a plurality of network controllers (NCs), and a master controller (MC). The network controllers may be included in the floor controllers. In some implementations, the MC can communicate with and control tens or hundreds of NCs. In various implementations, the MC issues high level instructions to the NCs over one or more wired and/or wireless links. The instructions can include, for example, tint commands for causing transitions in the optical states of the IGUs controlled by the respective NCs. Each NC can, in turn, communicate with and control a number of WCs over one or more wired and/or wireless links. For example, each NC can control tens or hundreds of the WCs. Each WC can, in turn, communicate with, drive or otherwise control one or more respective IGUs over one or more wired and/or wireless links.

In some embodiments, the MC issues communications including tint commands, status request commands, data (for example, sensor data) request commands or other instructions. The MC 308 may issue such communications periodically, at certain predefined times of day (which may change based at least in part on the day of week or year), or based at least in part on the detection of particular events, conditions or combinations of events or conditions (for example, as determined by acquired sensor data or based at least in part on the receipt of a request initiated by a user or by an application or a combination of such sensor data and such a request). In some embodiments, when the MC determines to cause a tint state change in a set of one or more IGUs, the MC generates or selects a tint value corresponding to the desired tint state. In some embodiments, the set of IGUs is associated with a first protocol identifier (ID) (for example, a BACnet ID). The MC then generates and transmits a communication—referred to herein as a "primary tint command"—including the tint value and the first protocol ID over the link via a first communication protocol (for example, a BACnet compatible protocol). The MC may address the primary tint command to the particular NC that controls the particular one or more WCs that, in turn, control the set of IGUs to be transitioned.

In some embodiments, the NC receives the primary tint command including the tint value and the first protocol ID and maps the first protocol ID to one or more second protocol IDs. Each of the second protocol IDs may identify a corresponding one of the WCs. The NC may subsequently transmit a secondary tint command including the tint value to each of the identified WCs over the link via a second communication protocol. For example, each of the WCs that receives the secondary tint command can then select a voltage or current profile from an internal memory based at least in part on the tint value to drive its respectively connected IGUs to a tint state consistent with the tint value. Each of the WCs may then generate and provide voltage or current signals over the link to its respectively connected IGUs to apply the voltage or current profile, for example.

In some embodiments, the various targets (e.g., IGUs) are (e.g., advantageously) grouped into zones of targets (e.g., of EC windows). At least one zone (e.g., each of which zones) can include a subset of the targets (e.g., IGUs). For example, at least one (e.g., each) zone of targets (e.g., IGUs) may be controlled by one or more respective floor controllers (e.g., NCs) and one or more respective local controllers (e.g., WCs) controlled by these floor controllers (e.g., NCs). In some examples, at least one (e.g., each) zone can be controlled by a single floor controller (e.g., NC) and two or more local controllers (e.g., WCs) controlled by the single floor controller (e.g., NC). For example, a zone can represent a logical grouping of the targets (e.g., IGUs). Each zone may correspond to a set of targets (e.g., IGUs) in a specific location or area of the building that are driven together based at least in part on their location. For example, a building may have four faces or sides (a North face, a South face, an East Face and a West Face) and ten floors. In such a didactic example, each zone may correspond to the set of electrochromic windows on a particular floor and on a particular one of the four faces. At least one (e.g., each) zone may correspond to a set of targets (e.g., IGUs) that share one or more physical characteristics (for example, device parameters such as size or age). In some embodiments, a zone of targets (e.g., IGUs) is grouped based at least in part on one or more non-physical characteristics such as, for example, a security designation or a business hierarchy (for example, IGUs bounding managers' offices can be grouped in one or more zones while IGUs bounding non-managers' offices can be grouped in one or more different zones).

In some embodiments, at least one (e.g., each) floor controller (e.g., NC) is able to address all of the targets (e.g., IGUs) in at least one (e.g., each) of one or more respective zones. For example, the MC can issue a primary tint command to the floor controller (e.g., NC) that controls a target zone. The primary tint command can include an (e.g., abstract) identification of the target zone (hereinafter also referred to as a "zone ID"). For example, the zone ID can be a first protocol ID such as that just described in the example above. In such cases, the floor controller (e.g., NC) receives the primary tint command including the tint value and the zone ID and maps the zone ID to the second protocol IDs associated with the local controllers (e.g., WCs) within the zone. In some embodiments, the zone ID is a higher level abstraction than the first protocol IDs. In such cases, the floor controller (e.g., NC) can first map the zone ID to one or more first protocol IDs, and subsequently map the first protocol IDs to the second protocol IDs.

In some embodiments, the MC is coupled to one or more outward-facing networks via one or more wired and/or wireless links. For example, the MC can communicate acquired status information or sensor data to remote computers, mobile devices, servers, databases in or accessible by the outward-facing network. In some embodiments, various applications, including third party applications or cloud-based applications, executing within such remote devices are able to access data from or provide data to the MC. In some embodiments, authorized users or applications communicate requests to modify the tint states of various IGUs to the MC via the network. For example, the MC can first determine whether to grant the request (for example, based at least in part on power considerations or based at least in part on whether the user has the appropriate authorization) prior to issuing a tint command. The MC may then calculate, determine, select or otherwise generate a tint value and transmit the tint value in a primary tint command to cause the tint state transitions in the associated IGUs.

In some embodiments, a user submits such a request from a computing device, such as a desktop computer, laptop computer, tablet computer or mobile device (for example, a smartphone). The user's computing device may execute a client-side application that is capable of communicating with the MC, and in some examples, with a master controller application executing within the MC. In some embodiments, the client-side application may communicate with a separate application, in the same or a different physical device or system as the MC, which then communicates with the master controller application to affect the desired tint state modifications. For example, the master controller application or other separate application can be used to authenticate the user to authorize requests submitted by the user. The user may select a target to be manipulated (e.g., the IGUs to be tinted), and directly or indirectly inform the MC of the selections, e.g., by entering an enclosure ID (e.g., room number) via the client-side application.

In some embodiments, a mobile circuitry of a user (e.g., mobile electronic device or other computing device) can communicate, e.g., wirelessly with various local controllers (e.g., WCs). For example, a client-side application executing within a mobile circuitry of a user (e.g., mobile device) can transmit wireless communications including control signals related to a target to the local controller to control the target, which target is communicatively coupled to the local controller (e.g., via the network). For example, a user may initiate directing a tint state control signals to a WC to control the tint states of the respective IGUs connected to the WC. For example, the user can use the client-side application to control (e.g., maintain or modify) the tint states of the IGUs adjoining a room occupied by the user (or to be occupied by the user or others at a future time). For example, a user may initiate directing a sensor frequency change control signals to a local controller to control the data sampling rate of a sensor communicatively coupled to the local controller. For example, the user can use the client-side application to control (e.g., maintain or modify) the data sampling rate of the sensor adjoining a room occupied by the user (or to be occupied by the user or others at a future time). For example, a user may initiate directing a light intensity change control signals to a local controller to control the light of a lamp communicatively coupled to the local controller. For example, the user can use the client-side application to control (e.g., maintain or modify) the light intensity of the light adjoining a room occupied by the user (or to be occupied by the user or others at a future time). For example, a user may initiate directing a media projection change control signals to a local controller to control the media projected by a projector communicatively coupled to the local controller. For example, the user can use the client-side application to control (e.g., maintain or modify) the media projected by a projector in a room occupied by the user (or to be occupied by the user or others at a future time). The wireless communications can be generated, formatted and/or transmitted using various wireless network topologies and protocols, for example.

In some embodiments, the control signals sent to the local controller (e.g., WC) from a mobile circuitry (e.g., device) of a user (or other computing device) override a previously sent signal (e.g., a tint value previously received by the WC from the respective NC). The previously sent signal may be automatically generated, e.g., by the control system. In other words, the local controller (e.g., WC) may provide the applied voltages to the target (e.g., IGUs) based at least in part on the control signals from the mobile circuitry of the user (e.g., user's computing device), e.g., rather than based at least in part on the predetermined signal (e.g., the tint value). For example, a control algorithm or rule set stored in and executed by the local controller (e.g., WC) may dictate that one or more control signals from a mobile device of a user (e.g., an authorized user's computing device) that will take precedence over a respective signal received from the control system (e.g., a tint value received from the NC). In some embodiments, such as in high demand cases, control signals (such as a tint value from the NC) take precedence over any control signals received by the local controller (e.g., WC) from a mobile circuitry of a user (e.g., a user's computing device). A control algorithm or rule set may dictate that control signal (e.g., relating to tint) overrides from only certain users (or groups or classes of users) may take precedence based at least in part on permissions granted to such users. In some instances, other factors including time of day or the location of the target (e.g., IGUs) may influence the permission to override a predetermined signal of the control system.

In some embodiments, based at least in part on the receipt of a control signal from a mobile circuitry of a user (e.g., an authorized user's computing device), the MC uses information about a combination of known parameters to calculate, determine, select and/or otherwise generate a command signal (e.g., relating to a tint value) that provides (e.g., lighting) conditions requested by a (e.g., typical) user, e.g., while in some instances also using power efficiently. For example, the MC may determine a state of a target based at least in part on preset preferences defined by or for the particular user that requested the target status change via the mobile circuitry (e.g., via the computing device). For example, the MC may determine the tint value based at least in part on preset preferences defined by or for the particular user that requested the tint state change via the computing device. For example, the user may be required to enter a password or otherwise login or obtain authorization to request a change in a state of a target (e.g., tint state change). The MC may determine the identity of the user based at least in part on a password, a security token and/or an identifier of the particular mobile circuitry (e.g., mobile device or other computing device). After determining the identity of the user, the MC may then retrieve preset preferences for the user, and use the preset preferences alone or in combination with other parameters (such as power considerations and/or information from various sensors) to generate and transmit a status change of the target (e.g., tint value for use in tinting the respective IGUs).

In some embodiments, the network system includes wall switches, dimmers, or other (e.g., tint-state) controlling devices. A wall switch generally refers to an electromechanical interface connected to a local controller (e.g., WC). The wall switch can convey a target status change (e.g., tint) command to the local controller (e.g., WC), which can then convey the target status change (e.g., tint) command to an upper level controller such as a local controller (e.g., NC). Such control devices can be collectively referred to as "wall devices," although such devices need not be limited to wall-mounted implementations (for example, such devices also can be located on a ceiling or floor or integrated on or within a desk or a conference table). For example, some or all of the offices, conference rooms, or other rooms of the building can include such a wall device for use in controlling the state of a target (e.g., tint states of the adjoining IGUs, or light state of a light bulb). For example, the IGUs adjoining a particular room can be grouped into a zone. Each of the wall devices can be operated by an end user (for example, an occupant of the respective room) to control the state of grouped targets (e.g., to control tint state or other functions or parameters of the IGUs that adjoin the room). For example, at certain times of the day, the adjoining IGUs may be tinted to a dark state to reduce the amount of light energy entering the room from the outside (for example, to reduce AC cooling requirements). For example, at certain times of the day, the adjoining heaters may be turned on to a warmer temperature to facilitate occupant comfort. In some embodiments, when a user requests to use a room then the user can operate the wall device to communicate one or more control signals to cause a (e.g., tint state) transition from one state of a target to another state (e.g., from the dark state to a lighter tint state of an IGU).

In some embodiments, each wall device includes one or more switches, buttons, dimmers, dials, or other physical user interface controls enabling the user to select a particular tint state or to increase or decrease a current tinting level of the IGUs adjoining the room. The wall device may include a display having a touchscreen interface enabling the user to select a particular tint state (for example, by selecting a virtual button, selecting from a dropdown menu or by entering a tint level or tinting percentage) or to modify the tint state (for example, by selecting a "darken" virtual button, a "lighten" virtual button, or by turning a virtual dial or sliding a virtual bar). In some embodiments, the wall device includes a docking interface enabling a user to physically and communicatively dock a mobile circuitry (e.g., portable device such as a smartphone, multimedia device, remote controller, virtual reality device, tablet computer, or other portable computing device (for example, an (PHONE, IPOD or IPAD produced by Apple, Inc. of Cupertino, CA)). The mobile circuitry may be embedded in a vehicle (e.g., car, motorcycle, drone, airplane). The mobile circuitry may be embedded in a robot. A circuitry may be embedded in (e.g., be part of) a virtual assistant AI technology, speaker, (e.g., smart speaker such as Google Nest, or Amazon Echo Dot). Coupling of the mobile circuitry to the network may be initiated by a user's presence in the enclosure, or by a user's coupling (e.g., weather remote or local) to the network. Coupling of the user to the network may be security (e.g., having one or more security layers, and/or require one or more security tokens (e.g., keys)). The presence of the user in the enclosure may be sensed (e.g., automatically) by using the sensor(s) that are coupled to the network. The minimum distance from the sensor at which the user is coupled to the network may be predetermined and/or adjusted. A user may override its coupling to the network. The user may be a manager, executive, owner, lessor, administrator of the network and/or facility. The user may be the user of the mobile circuitry. The ability to couple the mobile circuitry to the network may or may not be overridden by the user. The ability to alter the minimum coupling distance between the mobile circuitry and the network may or may not be overridden by the user. There may be a hierarchy of overriding permissions. The hierarchy may depended on the type of user and/or type of mobile circuitry. For example, a factory employee user may not be allowed to alter coupling of a production machinery to the network. For example, an employee may be allowed to alter the coupling distance of his/her company laptop computer to the network. For example, an employee may be permitted to allow or prevent coupling of her/his personal cellular phone and/or car to the network. For example, a visitor may be prevented from having the visitor's mobile circuitry connected to the network. The coupling to the network may be automatic and seamless (e.g., after the initial preference have been set). Seamless coupling may be without requiring input from the user.

In such an example, the user can control the tinting levels via input to the mobile circuitry (e.g., portable device), which is then received by the wall device through the docking interface and subsequently communicated to the control system (e.g., to the MC, NC, or WC). The mobile circuitry (e.g., portable device) may include an application for communicating with an API presented by the wall device.

In some embodiments, the wall device can transmit a request for a status change of a target (e.g., a tint state change) to the control system (e.g., to the MC). The control system (e.g., MC) might first determine whether to grant the request (for example, based at least in part on power considerations and/or based at least in part on whether the user has the appropriate authorizations or permissions). The control system (e.g., MC) could calculate, determine, select, and/or otherwise generate a status change (e.g., tint) value and transmit the status change (e.g., tint) value in a primary status change (e.g., tint) command to cause the target to change (e.g., cause the tint state transitions in the adjoining IGUs). For example, each wall device may be connected with the control system (e.g., the MC therein) via one or more wired links (for example, over communication lines such as CAN or Ethernet compliant lines and/or over power lines using power line communication techniques). For example, each wall device could be connected with the control system (e.g., the MC therein) via one or more wireless links. The wall device may be connected (via one or more wired and/or wireless connections) with an outward-facing network, which may communicate with the control system (e.g., the MC therein) via the link.

In some embodiments, the control system identifies the target (e.g., target device) associated with the wall device based at least in part on previously programmed or discovered information associating the wall device with the target. For example, the MC identifies the IGUs associated with the wall device based at least in part on previously programmed or discovered information associating the wall device with the IGUs. A control algorithm or rule set can be stored in and executed by the control system (e.g., the MC therein) to dictate that one or more control signals from a wall device take precedence over a tint value previously generated by the control system (e.g., the MC therein), for example. In times of high demand (for example, high power demand), a control algorithm or rule set stored in and executed by the control system (e.g., the MC therein) may be used to dictate that the tint value previously generated by the control system (e.g., the MC therein) takes precedence over any control signals received from a wall device.

In some embodiments, based at least in part on the receipt of a request or control signal to change to a state of a target (e.g., tint-state-change request or control signal) from a wall device, the control system (e.g., the MC therein) uses information about a combination of known parameters to generate a state change (e.g., tint) value that provides lighting conditions desirable for a typical user. Accordingly, the control system (e.g., the MC therein) may use power more efficiently. In some embodiments, the control system (e.g., the MC therein) can generate the state change (e.g., tint) value based at least in part on preset preferences defined by or for the particular user that requested the (e.g., tint) state change of the target via the wall device. For example, the user may be required to enter a password into the wall device or to use a security token or security fob such as the BUTTON or other 1-Wire device to gain access to the wall device. The control system (e.g., the MC therein) may then determine the identity of the user, based at least in part on the password, security token and/or security fob. The control system (e.g., the MC therein) may retrieve preset preferences for the user. The control system (e.g., the MC therein) may use the preset preferences alone or in combination with other parameters (such as power considerations or information from various sensors, historical data, and/or user preference) to calculate, determine, select and/or otherwise generate a tint value for the respective IGUs.

In some embodiments, the wall device transmits a tint state change request to the appropriate control system (e.g., to the NC therein). A lower level of the control system (e.g., to the NC therein) may communicate the request, or a communication based at least in part on the request, to a higher level of the control system (e.g., to the MC). For example, each wall device can be connected with a corresponding NC via one or more wired links. In some embodiments, the wall device transmits a request to the appropriate NC, which then itself determines whether to override a primary tint command previously received from the MC or a primary or secondary tint command previously generated by the NC. As described below, the NC may generate tint commands without first receiving a tint command from an MC. In some embodiments, the wall device communicates requests or control signals directly to the WC that controls the adjoining IGUs. For example, each wall device can be connected with a corresponding WC via one or more wired links such as those just described for the MC or via a wireless link.

In some embodiments, the NC or the MC determines whether the control signals from the wall device should take priority over a tint value previously generated by the NC or the MC. As described above, the wall device is able to communicate directly with the NC. However, in some examples, the wall device can communicate requests directly to the MC or directly to a WC, which then communicates the request to the NC. In some embodiments, the wall device is able to communicate requests to a customer-facing network (such as a network managed by the owners or operators of the building), which then passes the requests (or requests based therefrom) to the NC either directly or indirectly by way of the MC. For example, a control algorithm or rule set stored in and executed by the NC or the MC can dictate that one or more control signals from a wall device take precedence over a tint value previously generated by the NC or the MC. In some embodiments (e.g., such as in times of high demand), a control algorithm or rule set stored in and executed by the NC or the MC dictates that the tint value previously generated by the NC or the MC takes precedence over any control signals received from a wall device.

In some embodiments, based at least in part on the receipt of a tint-state-change request or control signal from a wall device, the NC can use information about a combination of known parameters to generate a tint value that provides lighting conditions desirable for a typical user. In some embodiments, the NC or the MC generates the tint value based at least in part on preset preferences defined by or for the particular user that requested the tint state change via the wall device. For example, the user may be required to enter a password into the wall device or to use a security token or security fob such as the IBUTTON or other 1-Wire device to gain access to the wall device. In this example, the NC can communicate with the MC to determine the identity of the user, or the MC can alone determine the identity of the user, based at least in part on the password, security token or security fob. The MC may then retrieve preset preferences for the user, and use the preset preferences alone or in combination with other parameters (such as power considerations or information from various sensors) to calculate, determine, select, or otherwise generate a tint value for the respective IGUs.

In some embodiments, the control system (e.g., the MC therein) is coupled to an external database (or "data store" or "data warehouse"). The database can be a local database coupled with the control system (e.g., the MC therein) via a wired hardware link, for example. In some embodiments, the database is a remote database or a cloud-based database accessible by the control system (e.g., the MC therein) via an internal private network or over the outward-facing network. Other computing devices, systems, or servers also can have access to read the data stored in the database, for example, over the outward-facing network. One or more control applications or third party applications could also have access to read the data stored in the database via the outward-facing network. In some embodiments, the control system (e.g., the MC therein) stores in the database a record of all tint commands including the corresponding tint values issued by the control system (e.g., the MC therein). The control system (e.g., the MC therein) may also collect status and sensor data and store it in the database (which may constitute historical data). The local controllers (e.g., WCs) may collect the sensor data and/or status data from the enclosure and/or from other devices (e.g., IGUs) or media disposed in the enclosure, and communicate the sensor data and/or status data to the respective higher level controller (e.g., NCs) over the communication link. The data may move up the control chain, e.g., to the MC. For example, the controllers (e.g., NCs or the MC) may themselves be communicatively coupled (e.g., connected) to various sensors (such as light, temperature, or occupancy sensors) within the building, as well as (e.g., light and/or temperature) sensors positioned on, around, or otherwise external to the building (for example, on a roof of the building). In some embodiments, the control system (e.g., the NCs or the WCs) may also transmit status and/or sensor data (e.g., directly) to the database for storage.

In some embodiments, the network system is suited for integration with a smart thermostat service, alert service (for example, fire detection), security service and/or other appliance automation service. On example of a home automation service is NEST®, made by Nest Labs of Palo Alto, California, (NEST® is a registered trademark of Google, Inc. of Mountain View, California). As used herein, references to a BMS can in some implementations also encompass, or be replaced with, such other automation services.

In some embodiments, the e control system (e.g., the MC therein) and a separate automation service, such as a BMS, can communicate via an application programming interface (API). For example, the API can execute in conjunction with a (e.g., master) controller application (or platform) within the controller (e.g., MC), and/or in conjunction with a building management application (or platform) within the BMS. The controller (e.g., MC) and the BMS can communicate over one or more wired links and/or via the outward-facing network. For example, the BMS may communicate instructions for controlling the IGUs to the controller (e.g., MC), which then generate and transmit primary status (e.g., tint) commands of the target to the appropriate lower level controller(s) (e.g., to the NCs). The lower hierarchical level controllers (e.g., the NCs or the WCs) could communicate directly with the BMS (e.g., through a wired/hardware link and/or wirelessly through a wireless data link). In some embodiments, the BMS also receives data, such as sensor data, status data, and associated timestamp data, collected by one or more of the controllers in the control system (e.g., by the MC, the NCs, and/or the WCs). For example, the controller (e.g., MC) can publish such data over the network. In some embodiments in which such data is stored in a database, the BMS can have access to some or all of the data stored in the database.

In some embodiments, the controller (e.g., "the MC") collectively refers to any suitable combination of hardware, firmware and software for implementing the functions, operations, processes, or capabilities described. For example, the MC can refer to a computer that implements a master controller application (also referred to herein as a "program" or a "task"). For example, the controller (e.g., MC) may include one or more processors. The processor(s) can be or can include a central processing unit (CPU), such as a single core or a multi-core processor. The processor can additionally include a digital signal processor (DSP) or a network processor in some examples. The processor could also include one or more application-specific integrated circuits (ASICs). The processor is coupled with a primary memory, a secondary memory, an inward-facing network interface, and an outward-facing network interface. The primary memory can include one or more high-speed memory devices such as, for example, one or more random-access memory (RAM) devices including dynamic-RAM (DRAM) devices. Such DRAM devices can include, for example, synchronous DRAM (SDRAM) devices and double data rate SDRAM (DDR SDRAM) devices (including DDR2 SDRAM, DDR3 SDRAM, and DDR4 SDRAM), thyristor RAM (T-RAM), and zero-capacitor (Z-RAM®), among other suitable memory devices.

In some embodiments, the secondary memory can include one or more hard disk drives (HDDs) or one or more solid-state drives (SSDs). In some embodiments, the memory can store processor-executable code (or "programming instructions") for implementing a multi-tasking operating system such as, for example, an operating system based at least in part on a Linux® kernel. The operating system can be a UNIX®- or Unix-like-based operating system, a Microsoft Windows®-based operating system, or another suitable operating system. The memory may also store code executable by the processor to implement the master controller application described above, as well as code for implementing other applications or programs. The memory may also store status information, sensor data, or other data collected from network controllers, window controllers and various sensors.

In some embodiments, the controller (e.g., MC) is a "headless" system; that is, a computer that does not include a display monitor or other user input device. For example, an administrator or other authorized user can log in to or otherwise access the controller (e.g., MC) from a remote computer or mobile computing device over a network to access and retrieve information stored in the controller (e.g., MC), to write or otherwise store data in the controller (e.g., MC), and/or to control various: functions, operations, processes and/or parameters implemented or used by the controller (e.g., MC). The controller (e.g., MC) can include a display monitor and a direct user input device (for example, a mouse, a keyboard and/or a touchscreen).

In some embodiments, the inward-facing network interface enables one controller (e.g., MC) of the control system to communicate with various distributed controllers and/or various targets (e.g., sensors). The inward-facing network interface can collectively refer to one or more wired network interfaces and/or one or more wireless network interfaces (including one or more radio transceivers). For example, the inward-facing network interface can enable communication with downstream controllers (e.g., NCs) over the link. Downstream may refer to a lower level of control in the control hierarchy.

In some embodiments, the outward-facing network interface enables the controller (e.g., MC) to communicate with various computers, mobile circuitry (e.g., mobile devices), servers, databases, and/or cloud-based database systems, over one or more networks. The outward-facing network interface can collectively refer to one or more wired network interfaces and/or one or more wireless network interfaces (including one or more radio transceivers). In some embodiments, the various applications, including third party applications and/or cloud-based applications, executing within such remote devices can access data from or provide data to the controller (e.g., MC) or to the database via the controller (e.g., MC). For example, the controller (e.g., MC) may include one or more application programming interfaces (APIs) for facilitating communication between the controller (e.g., MC) and various third party applications. Some examples of APIs that controller(s) (e.g., MC) can enable can be found in PCT Patent Application No. PCT/US15/64555 filed Dec. 8, 2015, and titled MULTIPLE INTERACTING SYSTEMS AT A SITE, which is incorporated herein by reference in its entirety. For example, third-party applications can include various monitoring services including thermostat services, alert services (e.g., fire detection), security services, and/or other appliance automation services. Additional examples of monitoring services and systems can be found in PCT Patent Application No. PCT/US2015/019031 filed Mar. 5, 2015 and titled MONITORING SITES CONTAINING SWITCHABLE OPTICAL DEVICES AND CONTROLLERS, which is incorporated herein by reference in its entirety.

In some embodiments, one or both of the inward-facing network interface and the outward-facing network interface can include a Building Automation and Control network (BACnet) compatible interface. BACnet is a communications protocol typically used in building automation and control networks and defined by the ASHRAE/ANSI 135 and ISO 16484-5 standards. The BACnet protocol broadly provides mechanisms for computerized building automation systems and devices to exchange information, e.g., regardless of the particular services they perform. For example, BACnet can be used to enable communication among (i) heating, ventilating, and air-conditioning control (HVAC) systems, (ii) lighting control systems, (iii) access and/or security control systems, (iv) fire detection systems, or (v) any combination thereof, as well as their associated equipment. In some examples, one or both of the inward-facing network interface and the outward-facing network interface can include an oBIX (Open Building Information Exchange) compatible interface or another RESTful Web Services-based interface.

In some embodiments, the controller (e.g., MC) can calculate, determine, select and/or otherwise generate a preferred state for the target (e.g., a tint value for one or more IGUs) based at least in part on a combination of parameters. For example, the combination of parameters can include time and/or calendar information such as the time of day, day of year or time of season. The combination of parameters may include solar calendar information such as, for example, the direction of the sun relative to the facility and/or target (e.g., IGUs). The direction of the sun relative to the facility and/or target (e.g., IGUs) may be determined by the controller (e.g., MC) based at least in part on time and/or calendar information, e.g., together with information known about the geographical location of the facility (e.g., building) on Earth and the direction that the target (e.g., IGUs) faces (e.g., in a North-East-Down coordinate system). The combination of parameters also can include exterior and/or interior environmental conditions. For example, the outside temperature (external to the building), the inside temperature (within a room adjoining the target IGUs), or the temperature within the interior volume of the IGUs. The combination of parameters may include information about the weather (for example, whether it is clear, sunny, overcast, cloudy, raining or snowing). Parameters such as the time of day, day of year, and/or direction of the sun can be programmed into and tracked by the control system (e.g., the MC therein). Parameters (such as the outside temperature, inside temperature, and/or IGU temperature) can be obtained from sensors in, on or around the building or sensors integrated with the target (e.g., on or within the IGUs). At times the target can comprise a sensor. Examples of algorithms, routines, modules, or other means for generating IGU tint values are described in U.S. patent application Ser. No. 13/772,969, filed Feb. 21, 2013 and titled CONTROL METHOD FOR TINTABLE WINDOWS, and in PCT Patent Application No. PCT/US15/029675, filed May 7, 2015 and titled CONTROL METHOD FOR TINTABLE WINDOWS, each of which is hereby incorporated by reference in its entirety.

In some embodiments, at least one (e.g., each) device (e.g., ECD) within each IGU is capable of being tinted, e.g., responsive to a suitable driving voltage applied across the EC stack. The tint may be to (e.g., virtually) any tint state within a continuous tint spectrum defined by the material properties of the EC stack. However, the control system (e.g., the MC therein) may be programmed to select a tint value from a finite number of discrete tint values (e.g., tint values specified as integer values). In some such implementations, the number of available discrete tint values can be at least 2, 4, 8, 16, 32, 64, 128 or 256, or more. For example, a 2-bit binary number can be used to specify any one of four possible integer tint values, a 3-bit binary number can be used to specify any one of eight possible integer tint values, a 4-bit binary number can be used to specify any one of sixteen possible integer tint values, a 5-bit binary number can be used to specify any one of thirty-two possible integer tint values, and so on. At least one (e.g., each) tint value can be associated with a target tint level (e.g., expressed as a percentage of maximum tint, maximum safe tint, and/or maximum desired or available tint). For didactic purposes, consider an example in which the MC selects from among four available tint values: 0, 5, 10 and 15 (using a 4-bit or higher binary number). The tint values 0, 5, 10 and 15 can be respectively associated with target tint levels of 60%, 40%, 20% and 4%, or 60%, 30%, 10% and 1%, or another desired, advantageous, or suitable set of target tint levels.

Figure 3:
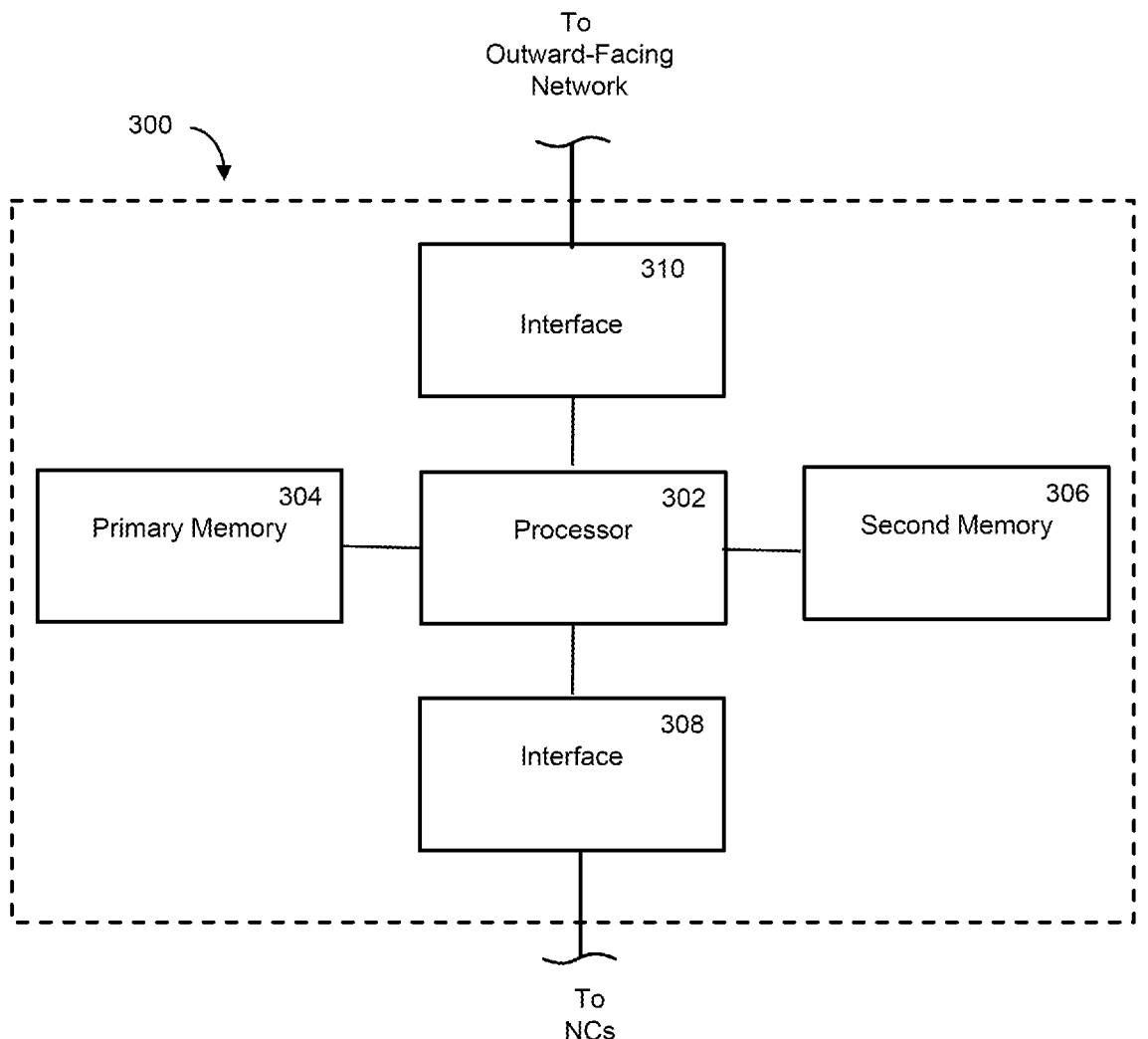
FIG. 3 shows a block diagram of an example master controller (MC)

FIG. 3 shows a block diagram of an example master controller (MC) 300. The MC 300 can be implemented in or as one or more computers, computing devices or computer systems (herein used interchangeably where appropriate unless otherwise indicated). For example, the MC 300 includes one or more processors 302 (also collectively referred to hereinafter as "the processor 302"). Processor 302 can be or can include a central processing unit (CPU), such as a single core or a multi-core processor. The processor 302 can additionally include a digital signal processor (DSP) or a network processor in some examples. The processor 302 could also include one or more application-specific integrated circuits (ASICs). The processor 302 is coupled with a primary memory 304, a secondary memory 306, an inward-facing network interface 308 and an outward-facing network interface 310. The primary memory 304 can include one or more high-speed memory devices such as, for example, one or more random-access memory (RAM) devices including dynamic-RAM (DRAM) devices. Such DRAM devices can include, for example, synchronous DRAM (SDRAM) devices and double data rate SDRAM (DDR SDRAM) devices (including DDR2 SDRAM, DDR3 SDRAM, and DDR4 SDRAM), thyristor RAM (T-RAM), and zero-capacitor (Z-RAM®), among other suitable memory devices.

In some embodiments, in some implementations the MC and the NC are implemented as a master controller application and a network controller application, respectively, executing within respective physical computers or other hardware devices. For example, each of the master controller application and the network controller application can be implemented within the same physical hardware. Each of the master controller application and the network controller application can be implemented as a separate task executing within a single computer device that includes a multi-tasking operating system such as, for example, an operating system based at least in part on a Linux® kernel or another suitable operating system.

In some embodiments, the master controller application and the network controller application can communicate via an application programming interface (API). In some embodiments, the master controller and network controller applications communicate over a loopback interface. By way of reference, a loopback interface is a virtual network interface, implemented through an operating system, which enables communication between applications executing within the same device. A loopback interface is typically identified by an IP address (often in the 127.0.0.0/8 address block in IPv4, or the 0:0:0:0:0:0:0:1 address (also expressed as: 1) in IPv6). For example, the master controller application and the network controller application can each be programmed to send communications targeted to one another to the IP address of the loopback interface. In this way, when the master controller application sends a communication to the network controller application, or vice versa, the communication does not need to leave the computer.

In some embodiments wherein the MC and the NC are implemented as master controller and network controller applications, respectively, there are generally no restrictions limiting the available protocols suitable for use in communication between the two applications. This generally holds true regardless of whether the master controller application and the network controller application are executing as tasks within the same or different physical computers. For example, there is no need to use a broadcast communication protocol, such as BACnet, which limits communication to one network segment as defined by a switch or router boundary. For example, the oBIX communication protocol can be used in some implementations for communication between the MC and the NCs.

In some embodiments, each of the NCs is implemented as an instance of a network controller application executing as a task within a respective physical computer. In some embodiments, at least one of the computers executing an instance of the network controller application also executes an instance of a master controller application to implement the MC. For example, while only one instance of the master controller application may be actively executing in the network system at any given time, two or more of the computers that execute instances of network controller application can have an instance of the master controller application installed. In this way, redundancy is added such that the computer currently executing the master controller application is no longer a single point of failure of the entire system. For example, if the computer executing the master controller application fails or if that particular instance of the master controller application otherwise stops functioning, another one of the computers having an instance of the master network application installed can begin executing the master controller application to take over for the other failed instance. In some embodiments, more than one instance of the master controller application may execute concurrently. For example, the functions, processes, or operations of the master controller application can be distributed to two (or more) instances of the master controller application.

Figure 4:
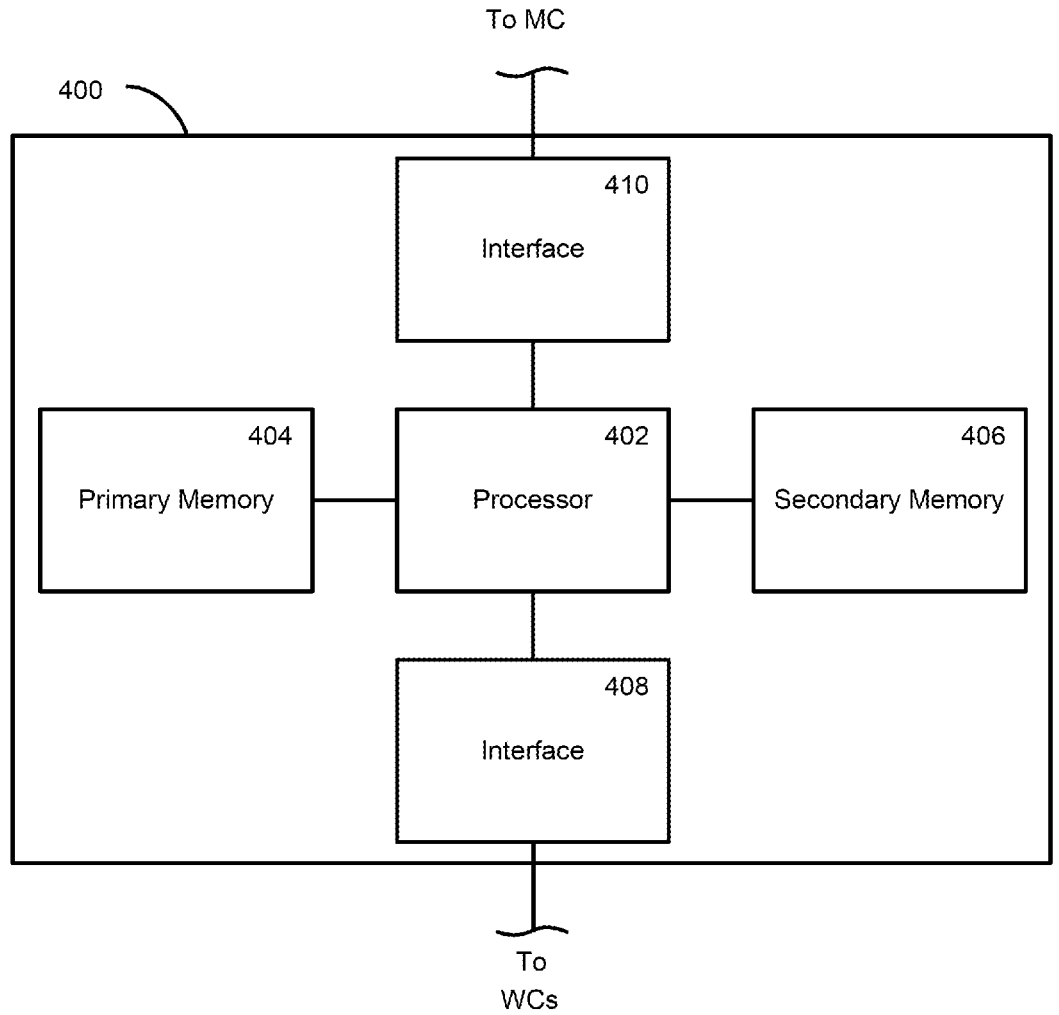
FIG. 4 shows a block diagram of an example network controller (NC)

FIG. 4 shows a block diagram of an example network controller (NC) 400, which can be implemented in or as one or more network components, networking devices, computers, computing devices, or computer systems (herein used interchangeably where appropriate unless otherwise indicated). Reference to "the NC 400" collectively refers to any suitable combination of hardware, firmware, and software for implementing the functions, operations, processes or capabilities described. For example, the NC 400 can refer to a computer that implements a network controller application (also referred to herein as a "program" or a "task"). NC 400 includes one or more processors 402 (also collectively referred to hereinafter as "the processor 402"). In some embodiments, the processor 402 is implemented as a microcontroller or as one or more logic devices including one or more application-specific integrated circuits (ASICs) or programmable logic devices (PLDs), such as field-programmable gate arrays (FPGAs) or complex programmable logic devices (CPLDs). When implemented in a PLD, the processor can be programmed into the PLD as an intellectual property (IP) block or permanently formed in the PLD as an embedded processor core. The processor 402 may be or may include a central processing unit (CPU), such as a single core or a multi-core processor. The processor 402 is coupled with a primary memory 404, a secondary memory 406, a downstream network interface 408, and an upstream network interface 410. In some embodiments, the primary memory 404 can be integrated with the processor 402, for example, as a system-on-chip (SOC) package, or in an embedded memory within a PLD itself. The NC 400 may include one or more high-speed memory devices such as, for example, one or more RAM devices. In some embodiments, the secondary memory 406 can include one or more solid-state drives (SSDs) storing one or more lookup tables or arrays of values. The secondary memory 406 may store a lookup table that maps first protocol IDs (for example, BACnet IDs) received from the MC to second protocol IDs (for example, CAN IDs) each identifying a respective one of the WCs, and vice versa. In some embodiments, the secondary memory 406 stores one or more arrays or tables. The downstream network interface 408 enables the NC 400 to communicate with distributed WCs and/or various sensors. The upstream network interface 410 enables the NC 400 to communicate with the MC and/or various other computers, servers, or databases.

In some embodiments, when the MC determines to tint one or more IGUs, the MC writes a specific tint value to the AV in the NC associated with the one or more respective WCs that control the target IGUs. For example, the MC may generate a primary tint command communication including a BACnet ID associated with the WCs that control the target IGUs. The primary tint command also can include a tint value for the target IGUs. The MC may direct the transmission of the primary tint command to the NC using a network address such as, for example, an IP address or a MAC address. Responsive to receiving such a primary tint command from the MC through the upstream interface, the NC may unpackage the communication, map the BACnet ID (or other first protocol ID) in the primary tint command to one or more CAN IDs (or other second protocol IDs), and write the tint value from the primary tint command to a first one of the respective AVs associated with each of the CAN IDs.

In some embodiments, the NC then generates a secondary tint command for each of the WCs identified by the CAN IDs. Each secondary tint command may be addressed to a respective one of the WCs by way of the respective CAN ID. For example, each secondary tint command also can include the tint value extracted from the primary tint command. The NC may transmit the secondary tint commands to the target WCs through the downstream interface via a second communication protocol (for example, via the CANOpen protocol). In some embodiments, when a WC receives such a secondary tint command, the WC transmits a status value back to the NC indicating a status of the WC. For example, the tint status value can represent a "tinting status" or "transition status" indicating that the WC is in the process of tinting the target IGUs, an "active" or "completed" status indicating that the target IGUs are at the target tint state or that the transition has been finished, or an "error status" indicating an error. After the status value has been stored in the NC, the NC may publish the status information or otherwise make the status information accessible to the MC or to various other authorized computers or applications. In some embodiments, the MC requests status information for a particular WC from the NC based at least in part on intelligence, a scheduling policy, or a user override. For example, the intelligence can be within the MC or within a BMS. A scheduling policy can be stored in the MC, another storage location within the network system, or within a cloud-based system.

In some embodiments, the NC handles some of the functions, processes, or operations that are described above as being responsibilities of the MC. In some embodiments, the NC can include additional functionalities or capabilities not described with reference to the MC. For example, the NC may also include a data logging module (or "data logger") for recording data associated with the IGUs controlled by the NC. In some embodiments, the data logger records the status information included in each of some or all of the responses to the status requests. For example, the status information that the WC communicates to the NC responsive to each status request can include a tint status value (S) for the IGUs, a value indicating a particular stage in a tinting transition (for example, a particular stage of a voltage control profile), a value indicating whether the WC is in a sleep mode, a tint value (C), a set point voltage set by the WC based at least in part on the tint value (for example, the value of the effective applied voltage $V_{Eff}$), an actual voltage level $V_{Act}$ measured, detected or otherwise determined across the ECDs within the IGUs, an actual current level $I_{Act}$ measured, detected or otherwise determined through the ECDs within the IGUs, and various sensor data, for example, collected from photosensors or temperature sensors integrated on or within the IGUs. The NC 500 may collect and queue status information in a messaging queue like RabbitMC, ActiveMQ or Kafka and stream the status information to the MC for subsequent processing such as data reduction/compression, event detection, etc., as further described herein.

In some embodiments, the data logger within the NC collects and stores the various information received from the WCs in the form of a log file such as a comma-separated values (CSV) file or via another table-structured file format. For example, each row of the CSV file can be associated with a respective status request, and can include the values of C, S, $V_{Eff}$, $V_{Act}$ and $I_{Act}$ as well as sensor data (or other data) received in response to the status request. In some implementations, each row is identified by a timestamp corresponding to the respective status request (for example, when the status request was sent by the NC, when the data was collected by the WC, when the response including the data was transmitted by the WC, or when the response was received by the NC). In some embodiments, each row also includes the CAN ID or other ID associated with the respective WC.

In some embodiments, each row of the CSV file includes the requested data for all of the WCs controlled by the NC. The NC may sequentially loop through all of the WCs it controls during each round of status requests. In some embodiments, each row of the CSV file is identified by a timestamp (for example, in a first column), but the timestamp can be associated with a start of each round of status requests, rather than each individual request. In one specific example, columns 2-6 can respectively include the values C, S, $V_{Eff}$, $V_{Act}$ and $I_{Act}$ for a first one of the WCs controlled by the NC, columns 7-11 can respectively include the values C, S, $V_{Eff}$, $V_{Act}$ and $I_{Act}$ for a second one of the WCs, columns 12-16 can respectively include the values C, S, $V_{Eff}$, $V_{Act}$ and $I_{Act}$ for a third one of the WCs, and so on and so forth through all of the WCs controlled by the NC. The subsequent row in the CSV file may include the respective values for the next round of status requests. In some embodiments, each row also includes sensor data obtained from photosensors, temperature sensors, or other sensors integrated with the respective IGUs controlled by each WC. For example, such sensor data values can be entered into respective columns between the values of C, S, $V_{Eff}$, $V_{Act}$ and $I_{Act}$ for a first one of the WCs but before the values of C, S, $V_{Eff}$, $V_{Act}$ and $I_{Act}$ for the next one of the WCs in the row. Each row can include sensor data values from one or more external sensors, for example, positioned on one or more facades or on a rooftop of the building. The NC may send a status request to the external sensors at the end of each round of status requests.

In some embodiments, the NC translates between various upstream and downstream protocols, for example, to enable the distribution of information between WCs and the MC or between the WCs and the outward-facing network. For example, the NC may include a protocol conversion module responsible for such translation or conversion services. The protocol conversion module may be programmed to perform translation between any of a number of upstream protocols and any of a number of downstream protocols. For example, such upstream protocols can include UDP protocols such as BACnet, TCP protocols such as oBix, other protocols built over these protocols as well as various wireless protocols. Downstream protocols can include, for example, CANopen, other CAN-compatible protocol, and various wireless protocols including, for example, protocols based at least in part on the IEEE 802.11 standard (for example, WiFi), protocols based at least in part on the IEEE 802.15.4 standard (for example, ZigBee, 6LoWPAN, ISA100.11a, WirelessHART or MiWi), protocols based at least in part on the Bluetooth standard (including the Classic Bluetooth, Bluetooth high speed and Bluetooth low energy protocols and including the Bluetooth v4.0, v4.1 and v4.2 versions), or protocols based at least in part on the EnOcean standard (ISO/IEC 14543-3-10).

In some embodiments, the NC uploads the information logged by the data logger (for example, as a CSV file) to the MC on a periodic basis, for example, every 24 hours. For example, the NC can transmit a CSV file to the MC via the File Transfer Protocol (FTP) or another suitable protocol over an Ethernet data link 316. The status information may be stored in a database or made accessible to applications over the outward-facing network.

In some embodiments, the NC includes functionality to analyze the information logged by the data logger. For example, an analytics module can be provided in the NC to receive and/or analyze the raw information logged by the data logger (e.g., in real time). In real time may include within at most 15 seconds (sec.), 30 sec., 45 sec., 1 minute (min), 2 min., 3 min. 4 min., 5 min, 10 min., 15 min. or 30 min from receipt of the logged information by the data logger, and/or from initiation of the operation (e.g., from receipt and/or from start of analysis). In some embodiments, the analytics module is programmed to make decisions based at least in part on the raw information from the data logger. In some embodiments, the analytics module communicates with the database to analyze the status information logged by the data logger after it is stored in the database. For example, the analytics module can compare raw values of electrical characteristics such as $V_{Eff}$, $V_{Act}$ and $I_{Act}$ with expected values or expected ranges of values and flag special conditions based at least in part on the comparison. For example, such flagged conditions can include power spikes indicating a failure such as a short, an error, or damage to an ECD. The analytics module may communicate such data to a tint determination module or to a power management module in the NC.

In some embodiments, the analytics module filters the raw data received from the data logger to more intelligently or efficiently store information in the database. For example, the analytics module can be programmed to pass only "interesting" information to a database manager for storage in the database. For example, interesting information can include anomalous values, values that otherwise deviate from expected values (such as based at least in part on empirical or historical values), or for specific periods when transitions are happening. Examples of data manipulation (e.g., filtering, parsing, temporarily storing, and efficiently storing long term in a database) can be found in PCT Patent Application No. PCT/US15/029675 filed May 7, 2015 and titled CONTROL METHOD FOR TINTABLE WINDOWS that is hereby incorporated by reference in its entirety.

In some embodiments, a database manager module (or "database manager") in the control system (e.g., in the NC) is configured to store information logged by the data logger to a database on a periodic basis, for example, at least every hour, every few hours, or every 24 hours. The database can be an external database such as the database described above. In some embodiments, the database can be internal to the controller (e.g., the NC). For example, the database can be implemented as a time-series database such as a Graphite database within the secondary memory of the controller (e.g., of the NC) or within another long term memory within the controller (e.g., the NC). For example, the database manager can be implemented as a Graphite Daemon executing as a background process, task, sub-task or application within a multi-tasking operating system of the controller (e.g., the NC). A time-series database can be advantageous over a relational database such as SQL because a time-series database is more efficient for data analyzed over time.

In some embodiments, the database can collectively refer to two or more databases, each of which can store some or all of the information obtained by some or all of the NCs in the network system. For example, it can be desirable to store copies of the information in multiple databases for redundancy purposes. The database can collectively refer to a multitude of databases, each of which is internal to a respective controller (e.g., NC), e.g., such as a Graphite or other times-series database. It can be beneficial to store copies of the information in multiple databases such that requests for information from applications including third party applications can be distributed among the databases and handled more efficiently. For example, the databases can be periodically or otherwise synchronized, e.g., to maintain consistency.

In some embodiments, the database manager filters data received from the analytics module to more intelligently and/or efficiently store information, e.g., in an internal and/or external database. For example, the database manager can be programmed to store (e.g., only) "interesting" information to a database. Interesting information can include anomalous values, values that otherwise deviate from expected values (such as based at least in part on empirical or historical values), and/or for specific periods when transitions are happening. More detailed examples of how data manipulation (e.g., how raw data can be filtered, parsed, temporarily stored, and efficiently stored long term in a database) can be found in PCT Patent Application No. PCT/US15/029675 filed May 7, 2015 and titled CONTROL METHOD FOR TINTABLE WINDOWS that is hereby incorporated by reference herein in its entirety.

In some embodiments, a status determination module of a target is included in the controller (e.g., the NC, the MC, or the WC), e.g., for calculating, determining, selecting, or otherwise generating status values for the target. For example, a tint determination module can be included in the controller (e.g., the NC, the MC, or the WC) for calculating, determining, selecting, or otherwise generating tint values for the IGUs. For example, the status (e.g., tint) determination module can execute various algorithms, tasks, or sub-tasks to generate tint values based at least in part on a combination of parameters. The combination of parameters can include, for example, the status information collected and stored by the data logger. The combination of parameters also can include time or calendar information such as the time of day, day of year or time of season. The combination of parameters can include solar calendar information such as, for example, the direction of the sun relative to the target (e.g., IGUs). The combination of parameters can include one or more characteristics of the enclosure environment that comprise gaseous concentration (e.g., VOC, humidity, carbon dioxide, or oxygen), debris, gas type, gas flow velocity, gas flow direction, gas (e.g., atmosphere) temperature, noise level, or light level (e.g., brightness). The combination of parameters can include the outside parameters (e.g., temperature) external to the enclosure (e.g., building), the inside parameter (e.g., temperature) within the enclosure (e.g., a room adjoining the target IGUs), and/or the temperature within the interior volume of the IGUs. The combination of parameters can include information about the weather (for example, whether it is clear, sunny, overcast, cloudy, raining or snowing). Parameters such as the time of day, day of year, and/or direction of the sun, can be programmed into and tracked by the control system (e.g., that includes the NC). Parameters such as the outside temperature, inside temperature, and/or IGU temperature, can be obtained from sensors in, on or around the building or sensors integrated on or within the IGUs, for example. In some embodiments, various parameters are provided by, or determined based at least in part on, information provided by various applications including third party applications that can communicate with the controller(s) (e.g., NC) via an API. For example, the network controller application, or the operating system in which it runs, can be programmed to provide the API.

In some embodiments, the target status (e.g., tint) determination module determines status (e.g., tint) value(s) of the target based at least in part on user overrides, e.g., received via various mobile circuitry (e.g., device) applications, wall devices and/or other devices. In some embodiments, the status (e.g., tint) determination module determines status (e.g., tint) values based at least in part on command(s) or instruction(s) received by various applications, e.g., including third party applications and/or cloud-based applications. For example, such third party applications can include various monitoring services including thermostat services, alert services (e.g., fire detection), security services and/or other appliance automation services. Additional examples of monitoring services and systems can be found in PCT/US2015/019031 filed 5 Mar. 2015 and titled MONITORING SITES CONTAINING SWITCHABLE OPTICAL DEVICES AND CONTROLLERS that is incorporated herein by reference in its entirety. Such applications can communicate with the status (e.g., tint) determination module and/or other modules within the controller(s) (e.g., NC) via one or more APIs. Some examples of APIs that the controller(s) (e.g., NC) can enable are described in PCT Patent Application No. MULTIPLE INTERFACING SYSTEMS AT A SITE, that is incorporated herein by reference in its entirety.

In some embodiments, the analytics module compares values of $V_{Eff}$, $V_{Act}$ and $I_{Act}$ as well as sensor data obtained in real time and/or previously stored within the database with expected values or expected ranges of values and flag special conditions based at least in part on the comparison. For example, the analytics module can pass such flagged data, flagged conditions or related information to a power management module. For example, such flagged conditions can include power spikes indicating a short, an error, or damage to a smart window (e.g., an ECD). In some embodiments, the power management module modifies operations based at least in part on the flagged data or conditions. For example, the power management module can delay status (e.g., tint) commands of a target until power demand has dropped, stop commands to troubled controller(s) (e.g., local controller such as WC) (and put them in idle state), start staggering commands to controllers (e.g., lower hierarchy controllers such as WCs), manage peak power, and/or signal for help.

Figure 5:
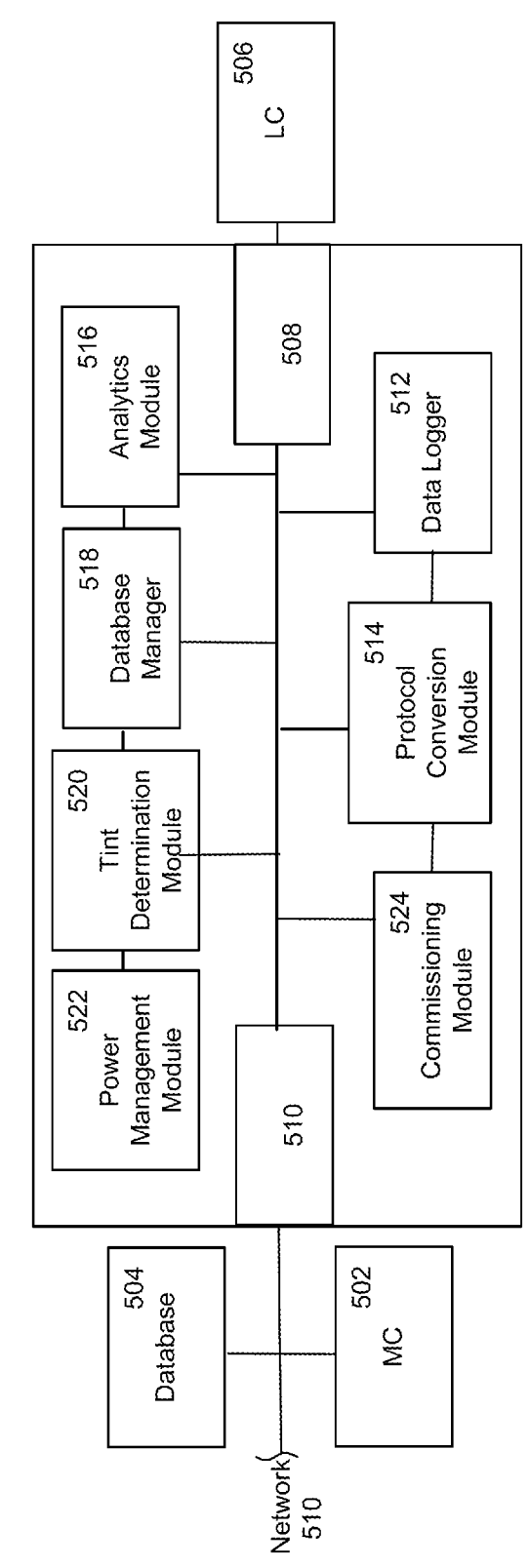
FIG. 5 illustrates an example control.

FIG. 5 shows an example network controller (NC) 500 including a plurality of modules. NC 500 is coupled to an MC 502 and a database 504 by an interface 510, and to a WC 506 by an interface 508. In the example, internal modules of NC 500 include data logger 512, protocol conversion module 514, analytics module 516, database manager 518, tint determination module 520, power management module 522, and commissioning module 524.

In some embodiments, a controller (e.g., WC) or other network device includes a sensor or sensor ensemble. For example, a plurality of sensors or a sensor ensemble may be organized into a sensor module. A sensor ensemble may comprise a circuit board, such as a printed circuit board, e.g., in which a number of sensors are adhered or affixed to the circuit board. Sensor(s) can be removed from a sensor module. For example, a sensor may be plugged into and/or unplugged out of, the circuit board. Sensor(s) may be individually activated and/or deactivated (e.g., using a switch). The circuit board may comprise a polymer. The circuit board may be transparent or non-transparent. The circuit board may comprise metal (e.g., elemental metal and/or metal alloy). The circuit board may comprise a conductor. The circuit board may comprise an insulator. The circuit board may comprise any geometric shape (e.g., rectangle or ellipse). The circuit board may be configured (e.g., may be of a shape) to allow the ensemble to be disposed in frame portion such as a mullion (e.g., of a window). The circuit board may be configured (e.g., may be of a shape) to allow the ensemble to be disposed in a frame (e.g., door frame and/or window frame). The frame may comprise one or more holes, e.g., to allow the sensor(s) to obtain (e.g., accurate) readings. The circuit board may be enclosed in a wrapping. The wrapping may comprise flexible or rigid portions. The wrapping may be flexible. The wrapping may be rigid (e.g., be composed of a hardened polymer, from glass, or from a metal (e.g., comprising elemental metal or metal alloy). The wrapping may comprise a composite material. The wrapping may comprise carbon fibers, glass fibers, and/or polymeric fibers. The wrapping may have one or more holes, e.g., to allow the sensor(s) to obtain (e.g., accurate) readings. The circuit board may include an electrical connectivity port (e.g., socket). The circuit board may be connected to a power source (e.g., to electricity). The power source may comprise renewable and/or non-renewable power source.

Figure 6:
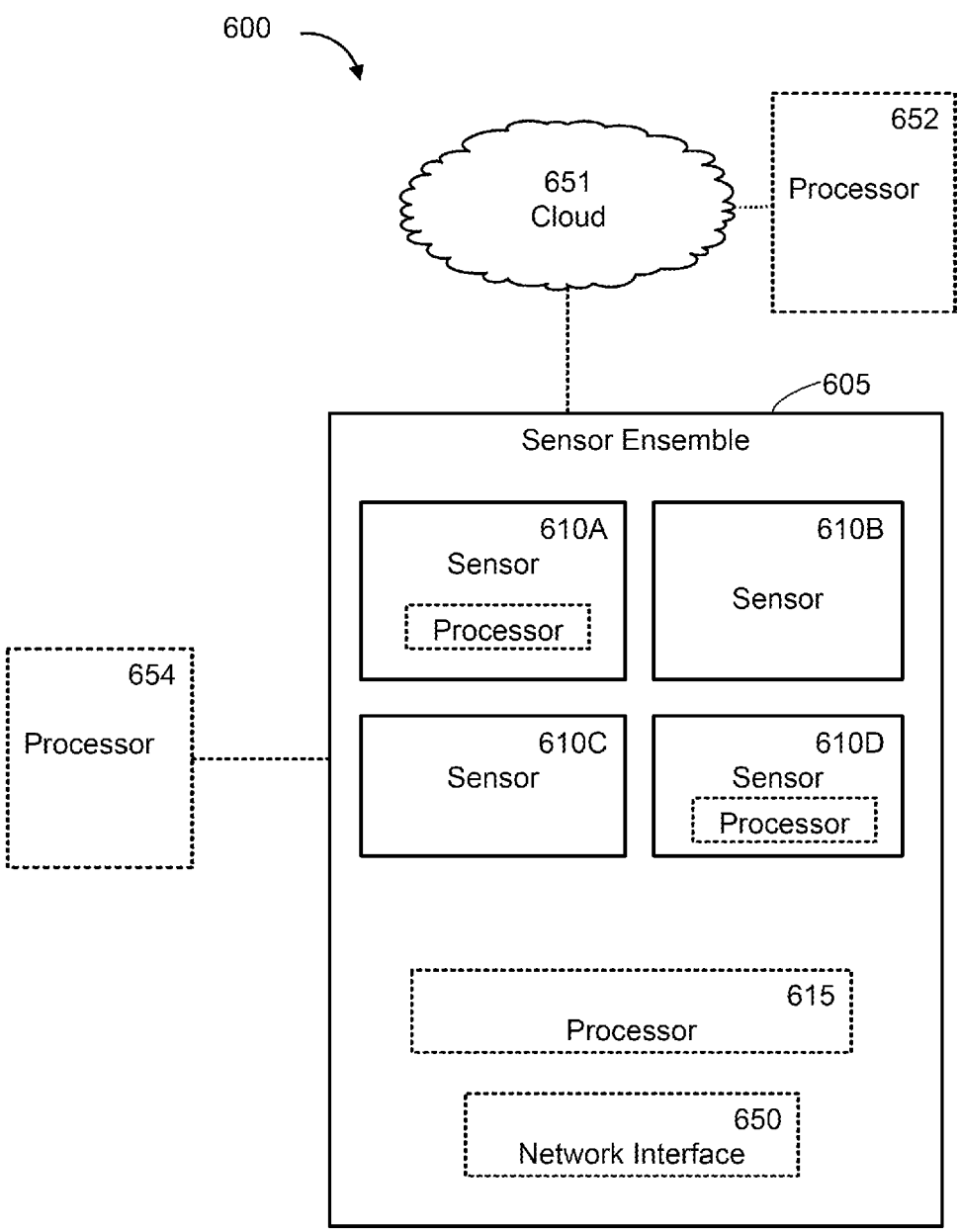
FIG. 6 shows an apparatus including a sensor ensemble and its components and connectivity options.

FIG. 6 shows diagram 600 having an example of an ensemble of sensors organized into a sensor module. Sensors 610A, 610B, 610C, and 610D are shown as included in sensor ensemble 605. An ensemble of sensors organized into a sensor module may include at least 1, 2, 4, 5, 8, 10, 20, 50, or 500 sensors. The sensor module may include a number of sensors in a range between any of the aforementioned values (e.g., from about 1 to about 1000, from about 1 to about 500, or from about 500 to about 1000). Sensors of a sensor module may comprise sensors configured and/or designed for sensing a parameter comprising: temperature, humidity, carbon dioxide, particulate matter (e.g., between 2.5 μm and 10 μm), total volatile organic compounds (e.g., via a change in a voltage potential brought about by surface adsorption of volatile organic compound), ambient light, audio noise level, pressure (e.g. gas, and/or liquid), acceleration, time, radar, lidar, radio signals (e.g., ultra-wideband radio signals), passive infrared, glass breakage, or movement detectors. The sensor ensemble (e.g., 605) may comprise nonsensor devices, such as buzzers and light emitting diodes. Examples of sensor ensembles and their uses can be found in U.S. patent application Ser. No. 16/447,169 filed Jun. 20, 2019, titled "SENSING AND COMMUNICATIONS UNIT FOR OPTICALLY SWITCHABLE WINDOW SYSTEMS" that is incorporated herein by reference in its entirety.

In some embodiments, an increase in the number and/or types of sensors may be used to increase a probability that one or more measured property is accurate and/or that a particular event measured by one or more sensor has occurred. In some embodiments, sensors of sensor ensemble may cooperate with one another. In an example, a radar sensor of sensor ensemble may determine presence of a number of individuals in an enclosure. A processor (e.g., processor 615) may determine that detection of presence of a number of individuals in an enclosure is positively correlated with an increase in carbon dioxide concentration. In an example, the processor-accessible memory may determine that an increase in detected infrared energy is positively correlated with an increase in temperature as detected by a temperature sensor. In some embodiments, network interface (e.g., 650) may communicate with other sensor ensembles similar to sensor ensemble. The network interface may additionally communicate with a controller.

Individual sensors (e.g., sensor 610A, sensor 610D, etc.) of a sensor ensemble may comprise and/or utilize at least one dedicated processor. A sensor ensemble may utilize a remote processor (e.g., 654) utilizing a wireless and/or wired communications link. A sensor ensemble may utilize at least one processor (e.g., processor 652), which may represent a cloud-based processor coupled to a sensor ensemble via the cloud (e.g., 650). Processors (e.g., 652 and/or 654) may be located in the same building, in a different building, in a building owned by the same or different entity, a facility owned by the manufacturer of the window/controller/sensor ensemble, or at any other location. In various embodiments, as indicated by the dotted lines of FIG. 6, sensor ensemble 605 is not required to comprise a separate processor and network interface. These entities may be separate entities and may be operatively coupled to ensemble 605. The dotted lines in FIG. 6 designate optional features. In some embodiments, onboard processing and/or memory of one or more ensemble of sensors may be used to support other functions (e.g., via allocation of ensembles(s) memory and/or processing power to the network infrastructure of a building).

In some embodiments, sensor data is exchanged among various network devices and controllers. The sensor data may also be accessible to remote users (e.g., inside or outside the same building) for retrieval using personal electronic devices, for example. Applications executing on remote devices to access sensor data may also provide commands for controllable functions such as tint commands for a window controller. An example window controller(s) is described in PCT Patent Application No. PCT/US16/58872, titled CONTROLLERS FOR OPTICALLY-SWITCHABLE DEVICES, filed Oct. 26, 2016, and in U.S. patent application Ser. No. 15/334,832, titled CONTROLLERS FOR OPTICALLY-SWITCHABLE DEVICES, filed Oct. 26, 2016, each of which is herein incorporate by reference in its entirety.

In some embodiments, the controller (e.g., NC) periodically requests status information from lower hierarchy controller(s) (e.g., from the WCs it controls). For example, the controller (e.g., NC) can communicate a status request to at least one (e.g., each) of the lower hierarchy controller(s) (e.g., from the WCs it controls) at a frequency of at least every few seconds, every few tens of seconds, every minute, every few minutes, or after any requested period of time. In some embodiments, at least one (e.g., each) status request is directed to a respective one of the lower hierarchy controllers (e.g., WCs) using the CAN ID or other identifier of the respective lower hierarchy controller(s) (e.g., WCs). In some embodiments, the controller (e.g., NC) proceeds sequentially through all of the lower hierarchy controllers (e.g., WCs) it controls during at least one (e.g., each) round of status acquisition. The controller (e.g., NC) can loop through at least two (e.g., all) of the lower hierarchy controllers (e.g., WCs) it controls such that a status request is sent to these lower hierarchy controllers (e.g., WCs) sequentially in the round of status acquisition. After a status request has been sent to a given lower hierarchy controller (e.g., WC), the upper hierarchy level controller (e.g., NC) may waits to receive the status information from one lower hierarchy controller (e.g., WC), e.g., before sending a status request to the next one of the lower hierarchy controller (e.g., WC) in the round of status acquisition.

In some embodiments, after status information has been received from all of the lower hierarchy controllers (e.g., WCs) that the upper hierarchy controller (e.g., NC) controls, the upper hierarchy controller (e.g., NC) performs a round of status change (e.g., tint) command distribution to the target (e.g., to the IGU). For example, in some implementations, at least one (e.g., each) round of status acquisition is followed by a round of tint command distribution, which is then followed by a next round of status acquisition and a next round of tint command distribution, and so on. In some embodiments, during a round of status (e.g., tint) command distribution to the controller of the target, the controller (e.g., NC) proceeds to send a tint command to the lower hierarchy controller (e.g., WC) that the higher hierarchy controller (e.g., NC) controls. In some embodiments, the hierarchy controller (e.g., NC) proceeds sequentially through all of the lower hierarchy controllers (e.g., WCs) it controls during the round of tint command distribution. In other words, the hither hierarchy (e.g., NC) controller loops through (e.g., all of) the lower hierarchy controllers (e.g., WCs) it controls such that a status (e.g., tint) command is sent to (e.g., each of) the lower hierarchy controllers (e.g., WCs) sequentially in the round of status (e.g., tint) command distribution to change the status of the target (e.g., change the tint state of the IGU).

In some embodiments, a status request includes one or more instructions indicating what status information is being requested from the respective lower hierarchy controller (e.g., local controller such as a WC). In some embodiments, responsive to the receipt of such a request, the respective lower hierarchy controllers (e.g., WC) responds by transmitting the requested status information to the higher hierarchy controller (e.g., NC) (e.g., via the communication lines in an upstream set of cables). In some other embodiments, each status request by default causes the lower hierarchy controllers (e.g., WC) to transmit a predefined set of information for the set of targets (e.g., IGUs, sensors, emitters, or media) it controls. The status information that the lower hierarchy controllers (e.g., WC) communicates to the upper hierarchy controller (e.g., NC) responsive to the status request, can include a (e.g., tint) status value (S) for the target (e.g., IGUs). For example, indicating whether the targets (e.g., IGUs) is undergoing a status change (e.g., tinting transition) or has finished a status change (e.g., tinting transition, or light intensity change). The tint status value S or another value can indicate a particular stage in a tinting transition (for example, a particular stage of a voltage control profile). In some embodiments, the status value S or another value indicates whether the lower hierarchy controller (e.g., WC) is in a sleep mode. The status information communicated in response to the status request also can include the status (e.g., tint) value (C) for the target (e.g., IGUs), for example, as set by the controller (e.g., MC or the NC). The response also can include a set point voltage set by the lower hierarchy controller (e.g., WC) based at least in part on the status (e.g., tint) value (e.g., the value of the effective applied $V_{Eff}$). In some embodiments, the response includes a near real-time actual voltage level $V_{Act}$ measured, detected, or otherwise determined across the ECDs within the IGUs (for example, via the amplifier and the feedback circuit). In some embodiments, the response includes a near real-time actual current level $I_{Act}$ measured, detected, or otherwise determined through the ECDs within the IGUs (for example, via the amplifier and the feedback circuit). The response also can include various near real-time sensor data, for example, collected from photosensors or temperature sensors integrated on or within the IGUs.

In some embodiments, voice and/or gesture control is used to interact with a target (e.g., an optically switchable device). Such control methods may be more convenient compared to more conventional control methods, e.g., that may require a user to touch or otherwise physically interact with a particular component (e.g., switch, knob, keypad, touchscreen, etc.). Voice control may be beneficial for users, e.g., with certain disabilities.

In some embodiments, voice and/or gesture control is used to implement any type of manipulation of a target (e.g., any type of command on an optically switchable device). For example, voice and/or gesture control may be used to implement tinting commands for a target, or for a group or zone of targets. For example, the command may be for a single optically switchable device (e.g., "change window 1 to tint 4" or "make window 1 darker"), or for a group or zone of optically switchable devices (e.g., "change the windows in zone 1 to tint 4" or "make the windows in zone 1 darker" or "make the windows in zone 1 much darker," etc.). The commands may relate to discrete optical states to which the relevant optically switchable device(s) should change (e.g., discrete tint levels, or other discrete optical states) or relative changes in the optical states of the optically switchable device(s) (e.g., darker, lighter, more reflective, less reflective, e.g., or "my office is too dark, please lighten it up" or "I want to run the projector," (letting the system know to darken the room) or "it's hot in here" (letting the system know to darken the windows and block heat gain) etc.). Where relative changes are used, the control system may be designed and/or configured to implement incremental (e.g., step) changes (e.g., 10% darker or lighter) in the optical state of the optically switchable device to carry out the command. The degree of each incremental (e.g., step) change may be pre-defined. In some embodiments, the control system is designed and/or configured to implement incremental (e.g., step) changes of a size and/or degree specified by the user. Such command(s) may be modified by any relative words used in the command (e.g., "very" or "a little bit," or "lighter" or "darker" etc.).

In some embodiments, voice control is also be used to set a schedule for the target (e.g., optically switchable device).

For example, a user may direct the optically switchable device(s) to tint at particular times/days (e.g., "make the windows in zone 1 go to tint 4 at 2 pm Monday through Friday" or "the morning sun makes it hot in here" (letting the system know to tint the windows during the morning hours when the sun impinges on that side of the building) or "I can't see the mountains well in the afternoon" (letting the system know that the windows are tinted too much in the afternoon and to lighten them during the afternoon)). Similarly, voice control can be used to implement tinting rules for the optically switchable device (e.g., "tint the windows in zone 1 to tint 4 when it's sunny outside" or "tint the windows in this room if the temperature inside this room is above 70° F."). In some embodiments, any rules that can be implemented on a network of optically switchable devices (including any other networked components such as thermostat, BMS, electronic device, etc.) can be initiated via voice control.

In some embodiments, voice control is implemented on various components of control architecture for the target (e.g., smart window system), e.g., onboard window controllers or other window controllers, network controllers, master controllers, wall switches (e.g., interfaces with control components) and/or a separate device that interfaces with any or all of the aforementioned devices and/or components.

In some embodiments, gesture control is used to control the target. The gesture control may or may not use a limited command set (e.g., at times due to a lesser number of movements that would need to be recognized compared to the more expansive dictionary of words that can be recognized when using voice control). For example, gesture control can be used to implement many types of commands. For example, gesture control can be used to indicate that a particular target (e.g., window) or group of targets (e.g., windows) should change their state (e.g., change to a lighter or darker state (or other optical states if non-electrochromic optically switchable devices are used)). The user may indicate the target(s) (e.g., window(s)) to be changed, e.g., by standing in front of the relevant target(s) (e.g., window(s)) and/or pointing to the relevant target(s) (e.g., window(s)). Indication of the target may trigger coupling of the gesture with the target. The user may indicate the desired change by raising or lowering their hands or arms, or by opening or closing their palms, for instance. A dictionary of recognized gestures may be created to define the types of commands that can be accomplished via gesture control. More expansive gesture dictionaries may enable finer, more complex control of the optically switchable devices. There may be some degree of tradeoff in terms of ease of use, with smaller gesture dictionaries being potentially easier for users to master.

In some embodiments, the gestures are detected using at least one sensor. The sensor may be communicatively coupled to the network. The sensor may be an optical sensor (e.g., a camera such as a video camera). The sensor(s) (e.g., camera) may be provided on any available device, and in some examples is provided as part of a wall unit, as part of a device that interfaces with a wall unit (e.g., a smartphone, tablet, or other electronic device), as part of a hand-held device (e.g., smartphone, tablet, or other electronic device), on an electrochromic window or frame, or as part of any other device that is configured to control an electrochromic or other optically switchable window. For example, a user may gesture while holding, wearing, or otherwise moving a sensing device that is configured to sense movement, and/or acceleration, etc. The readings on the sensing device may be used to help determine what gesture a user has made. The movement sensing device may include one or more accelerometers (e.g., 3-axis accelerometer), gyroscopes, magnetometers, cameras, or the like (and may be included in a virtual reality (VR) interface, such as the Oculus Quest or Oculus Rift available from Facebook Technologies, LLC, of Menlo Park, California. Find attached the document with a comment regarding OVRPlayerController. The mobile circuitry may be, or be included in, a user controller, a character controller, and/or a player controller.

In some embodiments, the sensing device is a fitness device (e.g., any of various wearable devices from Fitbit Inc. or Jawbone, each in San Francisco, CA), watch (e.g., from Apple Inc. of Cupertino, CA or Pebble Technology Corporation in Palo Alto, CA), or similar wearable device. In some embodiments, relative positioning is, velocity, acceleration, and/or Doppler effect is used to determine changes in gesture as commands to change the status of the target. In some embodiments, image recognition software is used to determine changes in gesture as commands to change the status of the target. In some embodiments, facial recognition software is used to determine changes in facial expressions as commands to change the tint level of windows. The gesture may comprise facial or bodily gesture (e.g., of limbs or part of limbs). The gesture may comprise kinesthetic movement. The gesture may comprise a physical movement of a body part. The gesture may comprise a corporal, and/or anatomic movement. The movement may comprise a muscular movement. The movement may comprise a movement of one or more bones (e.g., by moving their adjoining muscle(s)).

In some embodiments, a type of command that may be initiated via voice control is to turn off "listening mode." The sound sensor (e.g., listening device) may be operatively (e.g., communicatively) coupled to the network. When listening mode is on, the device that listens for commands is able to pick up oral commands. When listening mode is off, the device that listens for commands is not able to pick up, hear, and/or record such commands. For example, the device that listens for commands may be part of a (e.g., window) controller, IGU, wall device, and/or another electronic device (e.g., phone, tablet, etc.). A user may request to turn listening mode off for increased privacy, and/or energy savings, etc. In some cases, the user may request that listening mode turn off for a specified time period (e.g., the duration of a meeting), for example. In order to turn listening mode back on, the user may press a button/touchscreen (e.g., on the device that listens for commands, on the window controller, IGU, wall device, or other electronic device) or otherwise indicate that listening mode should turn back on. Devices may indicate when listening mode is on and/or off. In one example, one or more lights (e.g., LEDs) may indicate whether listening mode is on or off. The light may be turned on to indicate that listening mode is on, and off to indicate that listening mode is off (or vice versa). In another example, a first light or light color may indicate that listening mode is on, and a second light or light color may indicate that listening mode is off. In another example, devices can use an audio cue, e.g., may emit a tone, e.g., periodically, as a reminder to the user that listening mode is inactive (or active). In certain implementations, listening mode may be deactivated for a period of time (e.g., for at least about 1 minute, 10 minutes, 30 minutes, 1 hour, 2 hour, 3 hours, 1 day, etc.), after which listening mode may automatically be reactivated. The period of time over which listening mode remains deactivated may be chosen by the user, or may be preset, for example. In some embodiments, listening mode is activated by default. Listening mode may be on unless it is turned off (e.g., permanently turned off, or turned off for a period of time, as mentioned herein). In some embodiments, the default setting is that listening mode is off (e.g., listening mode does not activate unless a command is received to turn listening mode on).

In some embodiments, where gesture command is used, the user can control whether a relevant device that interprets gesture commands is in a "watching mode." Like the listening mode, the watching mode can be turned on and off. When a device is in watching mode, it is able to sense and interpret gesture commands, for example. When the watching mode is off, the device is not able to sense, record, and/or process gesture commands. Details provided herein related to listening mode may similarly apply to watching mode. The device that interprets the gesture may or may not be part of the control system. The gesture interpreting device may comprise a circuitry (e.g., may comprise a processor). The gesture interpreting device may be communicatively coupled to the network and/or to the control system. The gestures may be interpreted with respect to a virtual image of the enclosure in which the controllable target (e.g., an IGU, a sensor, a light, or a media) is disposed in. The gestures may be interpreted with respect to a target it is coupled to (e.g., pointed at).

In some embodiments, one or more voice commands are used to ask a question to the system controlling the target (e.g., optically switchable device (or some component on the network on which the optically switchable device is installed)). The questions may relate directly to the target (e.g., actuator, or optically switchable device), or more generally, to any target (e.g., optically switchable device) or group of targets (e.g., devices) communicatively coupled to (e.g., on) the network, for example. For instance, a user may ask what the current optical state is for a particular optically switchable device (e.g., "what's the tint level of window 1?"). Similarly, a user may ask what the upcoming behavior will be for a particular optically switchable device (e.g., "when is the next time the windows in my office will begin to get darker?"). The questions may also relate to any other information to which the network has access. For instance, a user may ask about weather data (e.g., temperature data, cloud data, precipitation data, forecast data, etc.), location data (e.g., "where am I?" or "how do I get from here to the nearest printer/exit/bathroom/etc."), access data (e.g., "am I allowed to control the tint level of the windows in this room?"), etc. A user may ask about any environmental characteristic of the enclosure (e.g., as delineated herein). A user may ask for an explanation of why the target (e.g., optically switchable device) is performing in a certain way. In one example, a user might ask, "why is window 1 tinting?" and the system may explain in response to the query, "clouds expected to clear in 20 minutes, tinting in anticipation of bright sun." This feature may be particularly useful in cases where the optically switchable device is programmed to execute rules that might not be immediately observable and/or understandable to a user. The answer may be provided visually (e.g., on a screen), as a printed material, or aurally (e.g., through a speaker).

In some embodiments, a voice command is used to control the degree of privacy in the enclosure (e.g., room), e.g., with respect to (e.g., wireless) communications. In some embodiments, optically switchable windows are patterned to include one or more antenna that may be used to block or allow particular wavelengths to pass through the windows. When activated, these patterned antennae can provide increased security/privacy by blocking cell phone communications, Wi-Fi communications, etc. Examples of patterned antennae and related privacy considerations can be found in PCT Application No. PCT/US15/62387, filed Nov. 24, 2015, and titled WINDOW ANTENNAS that is incorporated herein by reference in its entirety.

In some embodiments where voice and/or gesture control are used, one or more dictionaries are defined. For voice control, the dictionaries may define a set of words and/or phrases that the system is configured to interpret/understand. Similarly, for gesture control, the dictionaries may define a set of gestures that the system is configured to interpret/understand. Dictionaries may be tiered, e.g., given a command in a first level dictionary, a new dictionary at a second level may be initiated for receiving commands, and once received, yet another level dictionary may be actuated. In this way, individual dictionaries need not be overly complex, and the end user can quickly get to the command structure they desire. In some embodiments, (e.g., when the target is a media) the gestures are interpreted as cursor movement on a media projection.

Examples of words or phrases that may be defined include names/identifications for each optically switchable device or group of devices (e.g., "window 1," "group 1," "zone 1," etc.). Such names/identifications may also be based at least in part on the location of the optically switchable devices. In this respect, the dictionaries may be defined to include words that identify optically switchable devices based at least in part on location (e.g., "first floor," or "break room," or "east-facing"), and/or words that provide a relation between the user (or some other person) and the optically switchable device being identified (e.g., "my office," "the left window," or "Deepa's room").

In some embodiments, the dictionaries also define words related to the desired commands that can be instructed. For example, the dictionaries may include words like "tint," "clear," "clearest," "darker," "darkest," "lighter," "lightest," "more," "less," "very," "a little," "tint level," "tint1," "tint2," etc. Any words likely to be used by a person when instructing the optically switchable device when using verbal commands may be included in the dictionary. In cases where the system is configured to allow a user to set a schedule or rules for the behavior of the optically switchable device, the dictionary or dictionaries can include any words needed to understand such commands (e.g., "Monday," "Tuesday through Friday," "morning," "afternoon," "bedtime," "sunrise," "if," "then," "when," "don't," "cloudy," "sunny," "degrees," "someone," "no one," "movement," "only," etc.). Similarly, in cases where the system is configured to allow a user to ask a question, the dictionary or dictionaries can include any words needed to understand the types of questions the system is designed to answer.

In some embodiments, there is a tradeoff between larger dictionaries, which may enable finer control, more natural and/or flexible commands, and more complex functions (e.g., answering any question where the answer is available on the internet), compared to smaller dictionaries, which may be easier for people to master, and which may enable faster and/or more local processing. Smaller dictionaries may be used in a tiered format, where access to successive dictionaries is afforded by a user providing the proper voice or gesture command in one dictionary in order to be allowed access to the next dictionary.

In some embodiments, a single dictionary may be used. In other embodiments, two or more dictionaries may be used, and the dictionary that is used at a particular time depends on what type of command, or what portion of a command a user is trying to convey. For example, a first dictionary may be used when a user is identifying which optically switchable device they wish to control, and a second dictionary may be used when the user is identifying what they want the optically switchable device to do. The first dictionary could include any words needed to identify the relevant optically switchable device, while the second dictionary could include any words needed to interpret what the user wants the optically switchable device to do. Such contextual dictionaries can provide a limited sub-set of words that the system is configured to understand and/or interpret whenever the particular dictionary is being used. This may make it easier to interpret a user's commands.

In some embodiments, one or more dictionaries may be tailored to particular users. The dictionaries for defining and/or determining which electrochromic window(s) a user desires to switch may be limited based at least in part on which windows the user is authorized to switch, for instance. In one example, user A is allowed to switch windows 1-5, while user B is allowed to switch windows 6-10. The dictionary or dictionaries used to transcribe and/or interpret commands from user A may be limited to identifying windows 1-5, while the dictionary or dictionaries used to transcribe and/or interpret commands from user B may be limited to identifying windows 6-10.

In some embodiments, each dictionary includes certain keywords that allow the user to navigate through the system more easily. Such keywords may include phrases such as "help," "back," "go back," "previous," "undo," "skip," "restart," "start over," "stop," "abort," etc. When a user requests help, the system may be configured to communicate to the user (e.g., visually and/or aurally) the words, phrases, commands, windows, etc. that the system is currently configured to accept/understand based at least in part on the dictionary that is being used at a given time. For instance, if a user requests help while the system is accessing a dictionary that defines the different windows available for switching, the system may communicate that the available inputs at that time are, e.g., "window 1," "window 2, "window 3," "group 1," etc.

In some embodiments, the system acts to ensure that a user is authorized to make a particular command before the command is executed. This can prevent unauthorized users from making changes to the optically switchable devices. One setting in which this is particularly valuable is conference rooms, where there may be many people present at once. In such cases, it may be desirable to ensure that people who do not have authority to change the optical state of the optically switchable devices are prevented from doing so. This can reduce the risk that the optically switchable devices will change based at least in part on overheard (typically non-relevant) comments made by those in the room. Another setting in which this feature may be valuable is a commercial office space, where it may be desired that individual people can each control a limited number of optically switchable devices near their workspaces, for instance. In one example, a (e.g., each) person may be authorized to control the target (e.g., optically switchable window(s)) in their particular office, or on their particular floor, etc. For example, it may be beneficial to ensure that the (e.g., only) people who are able to initiate a change in the target (e.g., optical transitions) via voice or gesture command are authorized to do so.

In some embodiments, authorization is done by having a user "log in" to the system to identify himself or herself. This may be done by logging into an application on an electronic device (e.g., smartphone, tablet, etc.), by keying in a code, electronically recognizing a code, by fingerprinting, eye pattern identification, facial identification, or voicing a passcode, etc. In another example, voice recognition may be used to confirm the identity of a user. In a further example, facial recognition, fingerprint scanning, retinal scanning, or other biometric-based methods may be used to confirm the identity of a user. Different authorization procedures may be best suited for different applications and/or contexts. In a particular example, a user may be automatically authorized. Such authorization may be based at least in part on a physical authorization token (e.g., an RFID badge, a BLE beacon, UWF beacon, etc. having appropriate identification information), and the proximity of the physical authorization token to a sensor that reads the token. The sensor may be provided on an optically switchable device or adjacent thereto (e.g., in a frame portion of the IGU such as in a mullion), on a controller in communication with the optically switchable device, on a wall unit in communication with the optically switchable device, etc. The verification may occur locally (e.g., on the sensor that reads the token, on an optically switchable device, on a controller, on a wall unit, etc.), and/or in the cloud.

In some embodiments, authorization occurs whenever it is needed, and authorization may expire after a set amount of time has passed, or after the user has been idle for a set amount of time (e.g., after 24 hours, or after 1 hour, or after 10 minutes). The time period used for auto-logging out may depend on the setting in which the target (e.g., windows) are installed or projected. For example, whether the target(s) (e.g., windows) are in a public area or a private area). In some cases, authorization may not expire until a user logs out (e.g., using any available method including, but not limited to, orally requesting a logout, pressing a logout button, etc.). In some embodiments, authorization occurs each time a command is made. In some embodiments, authorization occurs in stages even when interpreting a single command. In a first authorization stage, it may be determined whether the user has authorization to make any changes on the network, and in a second authorization stage, it may be determined whether the user has authorization to make the particular change that the user has requested and/or initiated.

In some embodiments, the authorization process is used to limit the dictionaries used to interpret the voice and/or gesture commands. For example, the dictionary or dictionaries for a particular user may exclude one or more specified targets (e.g., optically switchable devices (or groups/zones of such devices)) that the user is not authorized to control. In one example, a user may be only authorized to control the optically switchable devices in zone 1 and zone 2, so the dictionary or dictionaries used to interpret commands for this user may include "zone 1" and "zone 2" while excluding "zone 3." Any other words needed to interpret and/or understand the command may also be included in the dictionary.

In some embodiments, a voice and/or gesture control system includes several modules that may be used when practicing the disclosed voice and/or gesture control embodiments. These modules may be implemented separately or together, as appropriate for a particular application. The modules may be provided in separate pieces of hardware, and/or may control a variety of processors. The modules may be executed concurrently or non-concurrently (e.g., sequentially). A module may be independently implemented on a controller (e.g., the window controller, the network controller, and/or the master controller), an optically switchable device, a wall device, a router, a remote processor, and/or any other target (e.g., as disclosed herein). In some embodiments, one or more of the modules are implemented on a processor and/or a processing unit of a media controller or of a window controller. Within each module, any relevant processing may be done locally and/or remotely. The processing may be done in a central location and/or device, or it may be distributed throughout a number of locations and/or devices.

In some embodiments, the voice and/or gesture control system includes a voice recognition module which converts and/or transcribes speech to text. In other words, the input to this module may be speech (spoken by a user and captured/recorded by a microphone), and the output from this module may be a text string or file. This module may be implemented using a number of commercially available speech to text products, services, and/or libraries. As one example, Carnegie Mellon University of Pittsburgh, PA provides a number of open source speech software resources that may be used such as CMU Sphinx. Additional examples include various Dragon products available from Nuance Communications, Inc. in Burlington, MA, and Tazti, available from Voice Tech Group, Inc. of Cincinnati, OH. The voice recognition module may also be implemented using custom software designed specifically for voice control related to optically switchable devices.

In some embodiments, the voice and/or gesture control system includes a command processing module which interprets text in order to determine the desired command instruction. In other words, the input to this module may be a text file (which may be generated by the voice recognition module), while the output may be a set of commands and/or instructions that can be interpreted by the window controller (or by another controller on the network) to cause the relevant target (e.g., sensor, emitter, media, or optically switchable device) to initiate the requested command. This function may also be referred to as language processing or natural language processing. Similar to the speech recognition module, the command processing module may be implemented using a number of available products and/or services, or using software specifically developed for the particular application.

In some embodiments, the voice and/or gesture control system includes an authentication module which is used to practice the authorization and/or security techniques discussed herein. For example, the authorization module may be used to ensure that the person giving the command is authorized to make the command. The authentication module may comprise a blockchain procedure and/or embedded encryption key(s). The blockchain procedure may comprise (e.g., peer-to-peer) voting. The encryption key(s) may be linked to a target (e.g., a device). The authentication module may be designed to ensure that only authorized devices can connect to a given network, facility, and/or service. The module may compare the optically switchable device identified in the command to a list of optically switchable devices that the user is authorized to control. In cases where a user tries to control an optically switchable device that they are not authorized to control, the authentication module may be configured to notify the user (e.g., visually, in print, and/or aurally) that they are not authorized to control the relevant optically switchable device. In other cases, no action is taken when an un-authorized command is given (e.g., no notification to the user, and no change to the target status (e.g., no switching of the optically switchable device)). The authentication may consider the identification of the user and/or other employee data such as rank, seniority, certification, education, and/or departmental affiliation. The identification of the user may be provided to the authentication module, e.g., via a facility entry tag of the user. The authentication module may be required to limit access to sensitive medical information, dangerous manufacturing machinery, and/or any restricted information. Examples of authentication (e.g., using blockchain procedure) can be found in PCT patent application serial number PCT/US20/70123 that is incorporated herein by reference in its entirety.

In some embodiments, the voice and/or gesture control system includes a command execution module which executes the commands on the relevant optically switchable device(s). The command may be executed on a master controller, network controller(s), and/or window controller (s). In one example, the command may be executed by instructing the master controller to send all windows in a particular group or zone to a desired tint level. Generally, the command may be executed on and/or by any of the control apparatus, or by any of the control methods described herein.

In some embodiments, the voice and/or gesture control system includes a response generation module that generates a response. The response can be communicated to the user by a response communication module. The response generated by the response generation module may be a text response (e.g., displayed optically, displayed in print, and/or sounded). The text response may be displayed to the user, e.g., optically on a screen, using the response communication module. For example, the response communication module may convert the text response into a speech response (e.g., in a sound file) that is played to the user. Any appropriate text-to-speech methods may be used to accomplish this. For example, the response communication module may convert the text response to hard print, e.g., on a paper. Generally, the response generation module and the response communication module may work together to generate and/or communicate a response to the user.

In some embodiments, a response may be provided to a query of the communication module (e.g., automatically, for example, by the control system), which response may be communicated via a response generation module. One purpose of the response generation module and/or the response communication module may be to notify the user what command has been understood by the control system. Similarly, any of these modules can be used to notify the user, e.g., regarding any action that the optically switchable device is taking in response to the user's command. In one example, the response generation module may generate a response that repeats the basic command given by the user to alter a status of a target (e.g., "window 1 to tint 4" or "tint window 1 to tint 4 when it becomes sunny"). The response may then be communicated to the user via the response communication module. The response generation module and/or response communication module may be used to ask for clarification from the user. For instance, if it is unclear whether the user wants to change window 1 or window 2, the response generation module may be used to prompt the user for clarification and/or further information.

Figure 7:
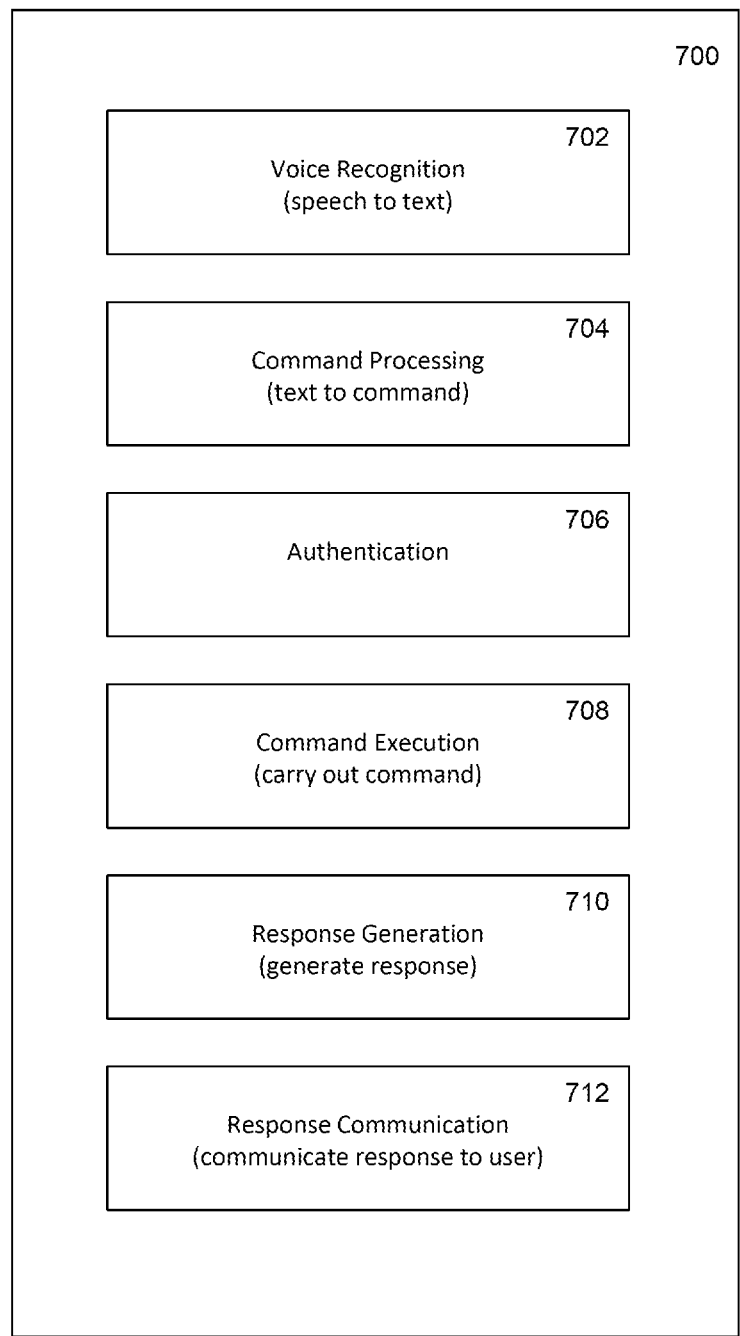
FIG. 7 is a block diagram showing example modules that may be used for implementing voice control.

FIG. 7 shows an example voice and/or gesture control system 700 comprising various modules. Functional modules within control system 700 include voice recognition module 702, command processing module 704, authentication module 706, command execution module 708, response generation module 710, and response communication module 712.

In operation of some embodiments, the voice and/or gesture control system implements a method for controlling (e.g., altering) a status of a target, e.g., controlling one of more devices using voice control. At least one microphone may be configured and positioned to receive voice commands. The microphone may be located at any portion of a facility in which the target is disposed, for example, in an enclosure where the target is disposed, for example, on the target (e.g., on an optically switchable device), on a wall device or on another electronic device such as a smartphone, tablet, laptop, PC, etc. One example command includes "turn window 1 to tint 4." For example, if listening mode is on, then the microphone is able to listen for and/or record voice commands from a user. Once recorded, the voice command may be converted and/or transcribed into a text command.

In some embodiments, the voice-to-text conversion is influenced by one or more dictionaries as described above. For example, words or phrases that sound similar to words or phrases stored in the relevant dictionary may be converted to the words/phrases stored in the dictionary, even if not exactly the same. In a particular example, a user gives the command to "switch window 1 to tint 4," but the voice recognition module initially interprets the command as "switch window 1 to tint floor." If the relevant dictionary or dictionaries associated with the voice recognition module defines phrases such as "window 1," "window 2," "tint 1," "tint 2," "tint 3," and "tint 4," but does not include any phrases with the word "floor," the voice recognition module may recognize that the user likely said "tint 4" rather than the initially understood "tint floor," which has no relevant meaning in the associated dictionary or dictionaries. In other words, the results of the text-to-speech operation may be limited or otherwise influenced by the relevant dictionaries being used.

In some embodiments, the text command is interpreted. This interpretation may be done by the command processing module. Like the voice-to-text conversion, the interpretation of the text command in operation 1007 may be influenced by the dictionary or dictionaries being used. This operation may involve specifically identifying which target or targets (e.g., optically switchable device or devices) the user is requesting to change, and/or identifying the particular requested change.

In some embodiments, it is determined whether the user is authorized to make the requested command. The authorization may be done by the authentication module, for example. If the user is not authorized to make the requested command, operation may end where either (1) nothing happens, or (2) a response is generated to notify the user that they are unauthorized to make the command. The response may be provided visually (e.g., through a visual display (e.g., on or adjacent to an optically switchable window), a wall device, or other electronic device), in print form, and/or aurally (e.g., by playing a sound file via speakers on an optically switchable device, wall device, or other electronic device).

In some embodiments, a response to the user is generated if the user is authorized to make the requested command. The response may be generated by the response generation module. The response may confirm that the requested command is taking place. The response may be communicated to the user by the response communication module. The response may be presented to the user visually (e.g., on a display), in print form (e.g., hard print), and/or aurally (e.g., via speakers). The display and/or speakers may be provided on an optically switchable device, a wall device, or other electronic device (e.g., smartphone, tablet, laptop, PC, etc.).

Figure 8:
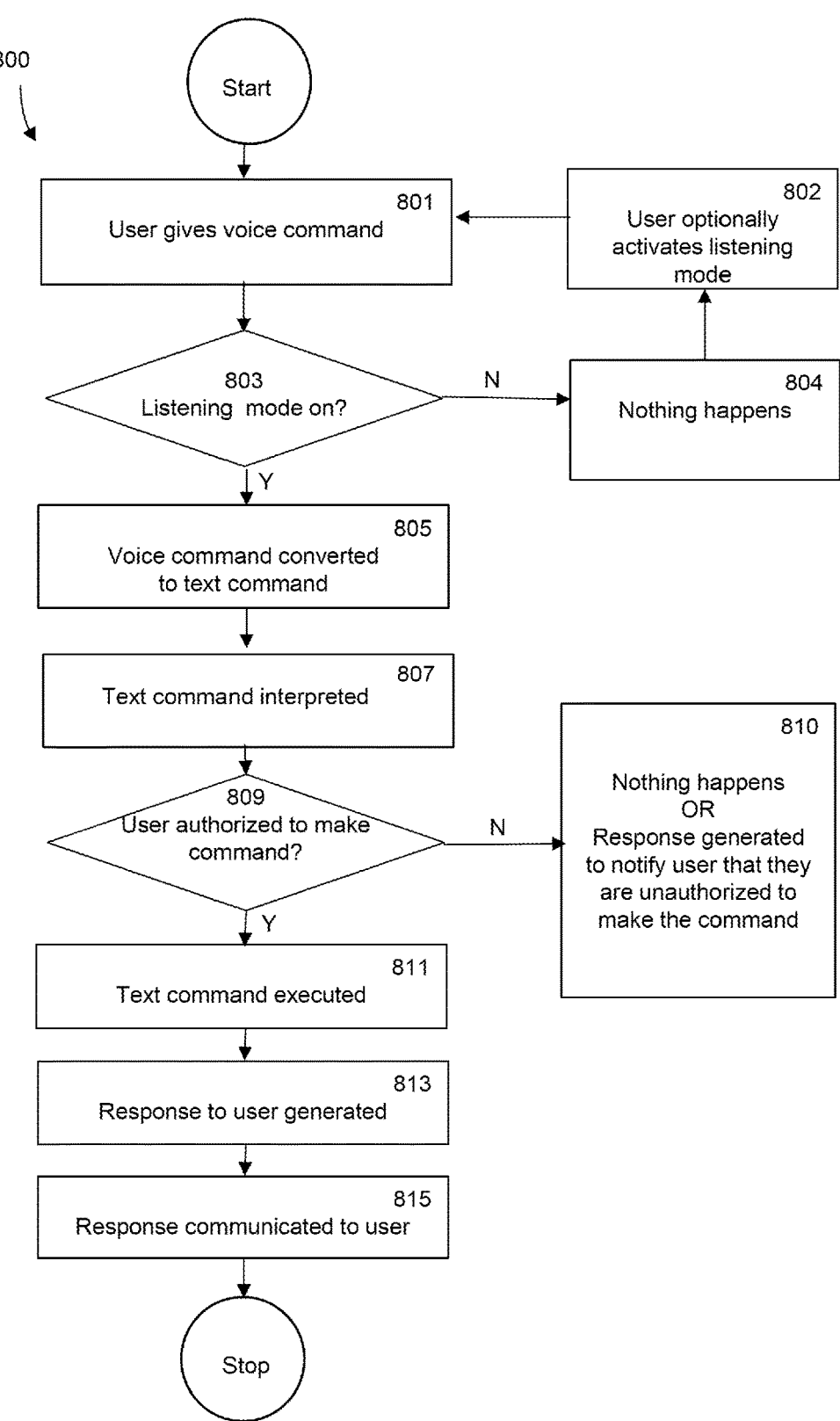
FIG. 8 is a flowchart of a control method.

FIG. 8 illustrates a flowchart for a method 800 of controlling one or more optically switchable devices (e.g., electrochromic windows) using voice control. The method 800 begins at operation 801, when a user provides a voice command. The voice command may be given in a variety of ways depending on the configuration of the voice control system and the robustness of the voice control processing, for instance.

Next, at operation 803 it is determined whether listening mode is on. When listening mode is on, the microphone can listen for and/or record voice commands from a user. When listening mode is off, the microphone can be off or otherwise not accepting voice commands related to the optically switchable devices. One example where the microphone can remain "on" while listening mode is "off," is when the microphone is located in a user's cell phone and the user is making an unrelated call on their cell phone. The determination in operation 803 may be made passively. If listening mode is not on (e.g., is "off"), the microphone will not pick up and/or record the voice command that was made in operation 801, and nothing will happen, as indicated at operation 804. In some embodiments, a user may optionally activate listening mode manually, as indicated at operation 802. Where this is the case, the method may continue at operation 801 where the user repeats the command. If listening mode is on at operation 803, the method continues with operation 805, where the voice command is converted/transcribed into a text command. The voice-to-text conversion may be done by the voice recognition module.

Next, at operation 807, the text command is interpreted. This interpretation may be done by the command processing module. Like the voice-to-text conversion discussed in relation to operation 805, the interpretation of the text command in operation 807 may be influenced by the dictionary or dictionaries being used. This operation may involve specifically identifying which optically switchable device or devices the user is requesting to change and identifying the particular requested change. For instance, if the command provided by the user is "switch window 1 to tint 4," the interpretation may involve determining (1) that the user is requesting a change for window 1, and (2) that the requested change relates to switching the window to tint state 4.

The text command interpretation at operation 807 (as well as the voice-to-text conversion at operation 805) may be influenced by user preferences and/or user permissions. For instance, if a user makes a voice command to "make the windows darker," the system may interpret which windows are desired to be switched based at least in part on which windows the user typically switches and/or based at least in part on which windows the user is allowed to switch.

At operation 809, it is determined whether the user is authorized to make the requested command. The authorization may be done by the authentication module, for example. If the user is not authorized to make the requested command, the method ends at operation 810 where either (1) nothing happens, or (2) a response is generated to notify the user that they are unauthorized to make the command. The response may be provided visually (e.g., through a visual display on an optically switchable window, a wall device, or other electronic device) and/or aurally (e.g., by playing a sound file via speakers on an optically switchable device, wall device, or another electronic device). Further details related to response generation are provided below.

If the user is authorized to make the requested command, the method can continue at operation 811, where the text command is executed. The command may be executed using any of the methods and systems described herein. The command may be executed using the command execution module. In some embodiments, the command may be executed over a network on which the optically switchable device is installed, and may involve one or more window controllers, network controllers, and/or master controllers. For example, operation 811 involves carrying out the command requested by the user in operation 801.

At operation 813, a response to the user is generated. The response may be generated by the response generation module. The response may confirm that the requested command is taking place. The response may specifically indicate the content of the command such that the user knows whether she was understood correctly. One example response may be "switching window 1 to tint 4." A simpler positive response such as "ok," or a green light and/or a tone may let the user know she was heard, without specifically repeating the content of the command (e.g., using the response generation module and/or the response communication module). In a particular example, the response may include a request that the user confirm that the system has correctly understood the desired command. In such a case, the command may not be executed until such confirmation is received from the user.

At operation 815, the response is communicated to the user. The response may be communicated to the user by the response communication module. The response may be presented to the user visually (e.g., on a display) and/or aurally (e.g., via speakers). The display and/or speakers may be provided on an optically switchable device, a wall device, or other electronic device (e.g., smartphone, tablet, laptop, PC, etc.). The display and/or speakers may be provided in the same unit as the microphone, or they may be provided in separate units. In certain cases where an aural response is provided, the response generation may involve generating the desired text of the response (e.g., using the response generation module), and then generating and playing a sound file that corresponds to the desired text (e.g., using response communication module). The method 800 may be practiced in a variety of ways. In some embodiments, certain operations occur in a different order from what is shown in FIG. 8.

In some embodiments, the voice control method involves using two or more dictionaries. FIG. 9 illustrates a flowchart for an example of a method 900 for controlling one or more optically switchable devices using two or more voice-control-related dictionaries. The method 900 of FIG. 9 is similar to the method 800 of FIG. 8, except that the command is interpreted in a piecemeal fashion, with different dictionaries applying to different portions of the command. Many of the operations illustrated in FIG. 9 are the same as those presented in FIG. 8, and for the sake of brevity the description will not be repeated.

In an embodiment of method 900, after it is determined that the listening mode is on in operation 903, part 1 of the voice command is converted to part 1 of the text command using a first dictionary in operation 925. The particular dictionary that is used may correspond to the part of the text that is being interpreted. Next, it is determined whether there are additional parts of the voice command to interpret/convert to text in operation 926. If there are additional parts of the voice command to interpret, the method continues at operation 927, where the dictionary is optionally switched to another dictionary. The next dictionary that is chosen may correspond to the next part of the command that is to be interpreted. The method then continues back at operation 925, where part 2 of the voice command is converted to part 2 of the text command, optionally using a different dictionary than was used in connection with part 1 of the command. The loop of operations 925, 926, and 927 continues until all of the parts of the command have been converted to text using the appropriate dictionaries.

In one example, the full voice command is "switch window 1 to tint 4." One part of the voice command (e.g., part 1) may relate to identifying which optically switchable devices the user desires to switch, in this case "window 1." Another part of the voice command (e.g., part 2) may relate to identifying what the desired command/ending optical state is, in this case switching to "tint 4." The different parts of the command may be structured as desired for a particular system. More structured commands may be easier to process and/or interpret, which may make local processing a more attractive option. Less structured commands may be harder to process and/or interpret, which may make remote processing a more attractive option.

In some embodiments, after all parts of the voice command have been converted to text, the different parts of the text command are joined together to define the full text command, and the method continues at operation 907. The remaining portions of the method are the same as those described in relation to FIG. 8.

Figure 10:
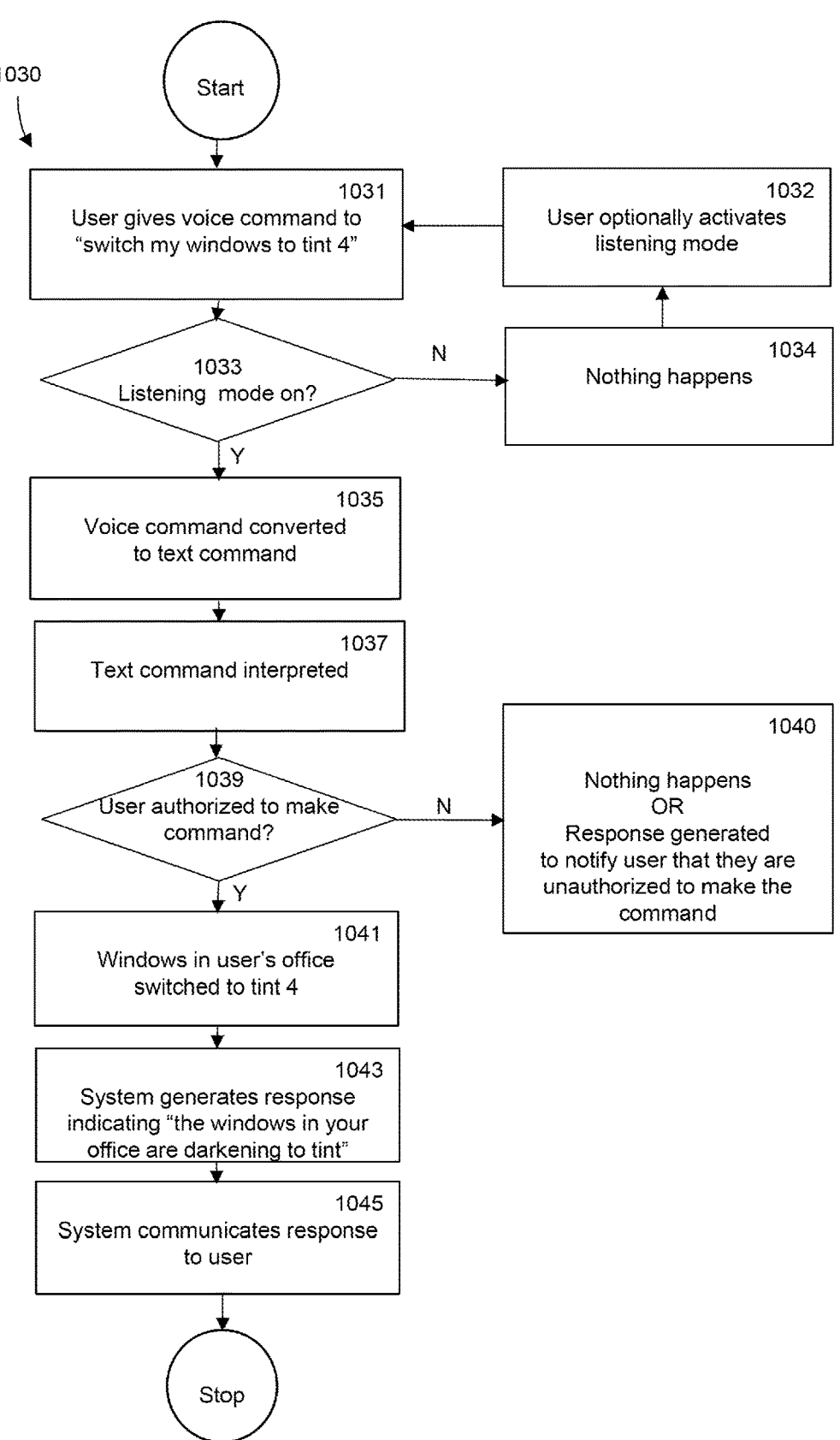
FIG. 10 is a flowchart of a control method.

FIG. 10 is a flowchart similar to the one shown in FIG. 8, in the context of a specific example where a user in a facility such as an office building requests the control system to switch the windows in the user's office to a particular tint state. The method 1030 begins at operation 1031, where the user requests, by voice, to "switch my windows to tint 4." If listening mode is not on, the system will take no action in response to the user's request, as indicated at operation 1034. In some cases, the user may optionally activate listening mode manually, as indicated in operation 1032. Where this is the case, the method may continue with operation 1031 where the user repeats the command. When listening mode is on at operation 1033, the method continues at operation 1035 where the voice command is converted to a text command. At this point, the control system may have an audio recording of the voice command given by the user, as well as a text file that indicates the content of the voice command.

Next, at operation 1037, the text command is interpreted. This may be done by the command processing module. This operation may involve identifying which windows are to be changed. In this example, the user requested to change "my windows." The control system may identify which windows to change by analyzing who is giving the command, which windows that user is authorized to change, which windows that user frequently changes, which windows are associated with the user in a database, which windows the user is near when she makes the command, etc. Identification of the user may be done in a number of ways as described above with respect to authorization. In this particular example, the control system uses voice recognition to identify the user, and identifies which windows to change by utilizing a database that associates each employee with the windows that are in each employee's office. At the end of operation 1037, the control system has identified that the user wishes to switch all the windows in the user's office to tint 4.

At operation 1039, it is determined whether the user is authorized to make the command. This may be done by the authentication module. In this example, the authorization process involves voice recognition. The system may analyze the recorded voice command given by the user in operation 1031 and compare it against prior recordings from this user and other users. This process allows the system to identify who made the command in operation 1031. The authorization process may also involve ensuring that the identified user is allowed to change the windows that she has requested to change. In this example, the control system checks whether the user is authorized to change the windows in her office by utilizing a database that associates each user with each window that the user is authorized to change. The user in this example works on floor 10 and is authorized to switch all the windows on floor 10. Therefore, the method continues with operation 1041, where the command is executed (e.g., via the command execution module), and all the windows in the user's office begin to switch to tint 4. In a case where the user makes an unauthorized command (e.g., the user is visiting a colleague on floor 9 and requests that the windows in the colleague's office go to tint 4, when the user is only authorized to switch windows on floor 10, where the user's office is located), the method may continue with operation 1040, where either nothing happens or the command system indicates that the user is not authorized to make the requested command. The system may or may not explain why the user is unauthorized to make the requested command, and/or may explain which windows, if any, the user is authorized to change.

At operation 1043, the control system generates a response indicating that "the windows in your office are darkening to tint 4." This may be done by the response generation module. The response may indicate which windows are going to be affected, as well as the particular action they will take (e.g., darkening, lightening, the final requested tint state, etc.). In this example, operation 1043 involves generating a text file indicating what the response will be. Next, at operation 1045, the response is communicated to the user. This may be done by the response communication module. The response may be communicated visually or aurally in various cases. In one example, this operation may involve generating a sound file that corresponds to the response in the text file for the response. The sound file may then be played to the user so that she knows her command has been heard, and that the system is acting on her request. For example, the text file (or another file generated based at least in part on the text file) may be displayed to the user so that she can visually appreciate that her command has been heard.

The examples in FIGS. 8-10 were provided for a target that is an IGU and the status change is a tint change of the IGU. Any status change to any target can be implemented in a similar manner.

In some embodiments where gesture command is used in place of voice command, a mobile circuitry, or a sensor (e.g., of a camera) may be used instead of (or in addition to) a microphone, in order to perceive and record the user's command. The mobile circuitry may be communicatively coupled to the network that is communicatively coupled to a digital twin of the enclosure in which the target is disposed. Instead of a voice recognition module, a gesture recognition module may be employed for analyzing the mobile circuitry and/or sensor (e.g., camera) data. For example, a user may be positioned within a field of view of a camera so that movements of the user can be captured which are carried out according to a desired control action to be taken in connection with controllable targets (e.g., devices) such as tintable windows. For example, movements of the user can be captured by the mobile device manipulated by the user (e.g., moved by the user) which are carried out according to a desired control action to be taken in connection with controllable targets (e.g., devices) such as tintable windows.

Figure 11A:
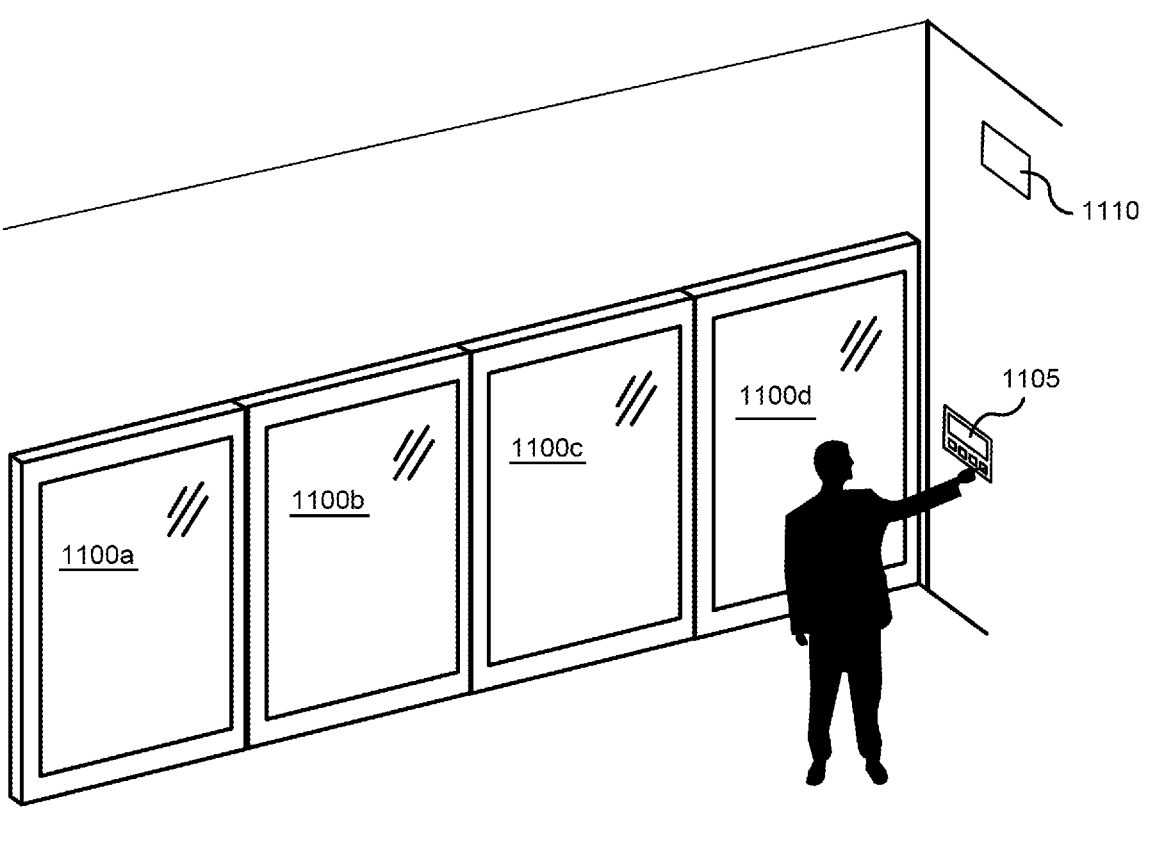
FIG. 11A shows a user interacting with a wall device.

FIG. 11A shows an example of a user interacting with a device 1105 for controlling status of a target that is the optical state of electrochromic windows 1100a-1100d. In this example, the device 1105 is a wall device as described above. In some embodiments, the wall device 1105 is or includes a smart device such as an electronic tablet or similar device. Device 1105 may be a device configured to control the electrochromic windows 1100a-1100d, including but not limited to a smartphone, tablet, laptop, PC, etc. The device 1105 may run an application/program that is configured to control the electrochromic windows. In some embodiments, the device 1105 communicates with an access point 1110, for example through a wired connection or a wireless connection (e.g., WiFi, Bluetooth, Bluetooth low energy, ZigBee, WiMax, etc.). The wireless connection can allow at least one apparatus (e.g., target apparatus) to connect to the network, internet, and/or communicate with one another wirelessly within an area (e.g., within a range). The access point 1110 may be a networking hardware device that allows a Wi-Fi compliant device to connect to a wired network. The device 1105 may communicate with a controller (e.g., a window controller, network controller, and/or master controller) through a connection scheme.

In some embodiments, the access point is connected to a switch to accomplish network communication between the control device of a user (e.g., a mobile circuitry) and a control unit for the target (e.g., window, media, or other appliance) to receive a command. For example, the switch may be connected to a router and/or the control unit. The connections between the different elements may be wired and/or wireless, as appropriate for a particular application. For example, the access point may be a wireless access point, and the connection between the access point and the device may be wireless. In some embodiments, the device may be any number of electronic devices configured to control a status of a target (e.g., such as a media, or the electrochromic windows). The router may include firewall protection to enhance security. The control unit may be a window controller, network controller, or master controller. If the control unit is not a window controller, it may relay instructions to relevant window controllers over the network, for example.

Figure 11B:
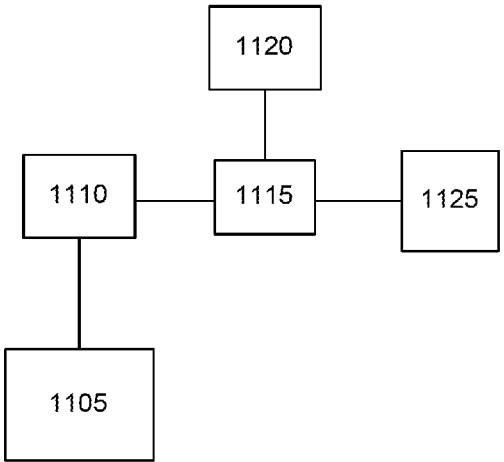
FIG. 11B shows a configuration of components that may be used to implement certain control methods described herein.

FIG. 11B shows an example of a user device 1105 connected to an access point 1110, which is further connected to a switch 1115. Switch 1115 may be connected to both router 1120 and controller (i.e., control unit) 1125. Router 1120 may include firewall protection to enhance security. The controller 1125 may be a window controller, network controller, or master controller. If the controller 1125 is not a window controller, the controller 1125 may relay instructions to relevant window controllers over the network.

Figure 12A:
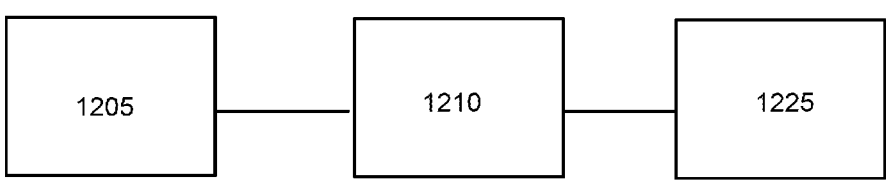
FIGS. 12A-12C show various configurations of components that may be used to implement certain control methods described herein.
Figure 12B:
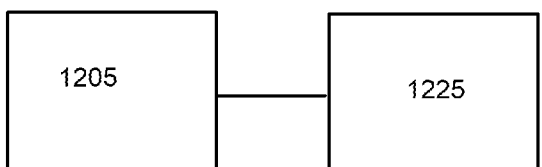
Figure 12C:
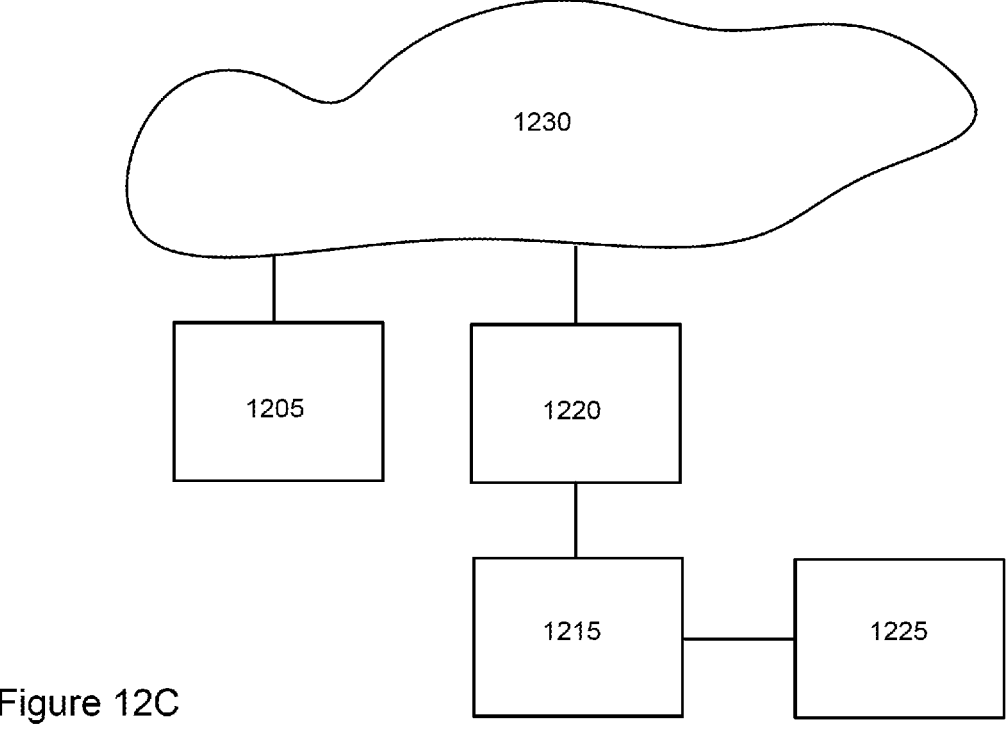

FIG. 12A shows an example wherein the device 1205 is connected to access point 1210, which is connected to controller 1225. Each of these connections may be wired and/or wireless. FIG. 12B shows an example wherein the device 1205 is directly connected to the controller 1225. This connection may be wired and/or wireless. FIG. 12C shows an example wherein device 1205 is connected to the cloud 1230 (e.g., the Internet). The cloud 1230 is also connected with router 1220, which is connected to switch 1215, which is connected to controller 1225. The connections may be wired and/or wireless, as appropriate for a particular application. In a particular example, the device 1205 can be a smartphone, which connects wirelessly (e.g., via a communication network that is capable of transmitting at least a third, fourth, or fifth generation communication (e.g., 3G, 4G, or 5G communication)) with the cloud 1230.

In some embodiments, the interactive systems to be controlled by a user include media (e.g., visual and/or audio content) for display, e.g., to building occupants. The display may include stills or video projection arrangements. The display may include transparent organic light-emitting devices (TOLED). The display may be integrated as a display construct with window panel(s) (e.g., frame(s)). Examples of display constructs can be found in U.S. provisional patent application Ser. No. 62/975,706 filed on Feb. 12, 2020, titled "TANDEM VISION WINDOW AND MEDIA DISPLAY," that is incorporated herein in its entirety.

In some embodiments, a display construct is coupled with a viewing (e.g., a tintable viewing) window. The viewing window may include an integrated glass unit (IGU). The display construct may include one or more glass panes. The display (e.g., display matrix) may comprise a light emitting diode (LED). The LED may comprise an organic material (e.g., organic light emitting diode abbreviated herein as "OLED"). The OLED may comprise a transparent organic light emitting diode display (abbreviated herein as "TOLED"), which TOLED is at least partially transparent. The display may have at its fundamental length scale 2000, 3000, 4000, 5000, 6000, 7000, or 8000 pixels. The display may have at its fundamental length scale any number of pixels between the aforementioned number of pixels (e.g., from about 2000 pixels to about 4000 pixels, from about 4000 pixels to about 8000 pixels, or from about 2000 pixels to about 8000 pixels). A fundamental length scale may comprise a diameter of a bounding circle, a length, a width, or a height. The fundamental length scale may be abbreviated herein as "FLS." The display construct may comprise a high resolution display. For example, the display construct may have a resolution of at least about 550, 576, 680, 720, 768, 1024, 1080, 1920, 1280, 2160, 3840, 4096, 4320, or 7680 pixels, by at least about 550, 576, 680, 720, 768, 1024, 1080, 1280, 1920, 2160, 3840, 4096, 4320, or 7680 pixels (at 30 Hz or at 60 Hz). The first number of pixels may designate the height of the display and the second pixels may designates the length of the display. For example, the display may be a high resolution display having a resolution of 1920×1080, 3840×2160, 4096×2160, or 7680×4320. The display may be a standard definition display, enhanced definition display, high definition display, or an ultra-high definition display. The display may be rectangular. The image projected by the display matrix may be refreshed at a frequency (e.g., at a refresh rate) of at least about 20 Hz, 30 Hz, 60 Hz, 70 Hz, 75 Hz, 80 Hz, 100 Hz, or 120 Hertz (Hz). The FLS of the display construct may be at least 20", 25", 30", 35", 40", 45", 50", 55", 60", 65", 80", or 90 inches ("). The FLS of the display construct can be of any value between the aforementioned values (e.g., from about 20" to about 55", from about 55" to about 100", or from about 20" to about 100").

In some embodiments, at least a portion of a window surface in a facility is utilized to display the various media using the glass display construct. The display may be utilized for (e.g., at least partial) viewing an environment external to the window (e.g., outdoor environment), e.g. when the display is not operating. The display may be used to display media (e.g., as disclosed herein), to augment the external view with (e.g., optical) overlays, augmented reality, and/or lighting (e.g., the display may act as a light source). The media may be used for entertainment and non-entertainment purposes. The media may be used for video conferencing. For example, the media may be used for work (e.g., data analysis, drafting, and/or video conferencing). For example, the media may be used for educational, health, safety, purchasing, monetary, or entertainment purposes. The media may present personnel not at the enclosure in which the media display is disposed (e.g., remote employees). The media may present personnel at the enclosure in which the media display is disposed. For example, the media display may mirror the personnel (e.g., and their actions such as in real time) in the enclosure in which the media display and the local personals are disposed. The media may be used as a coaching tool by mirroring the local personnel. For example, the mirroring media may serve as a fitness coaching tool, a speech coaching tool, a posture coaching tool, and/or a behavioral coaching tool. The media may present personnel at the enclosure in which the media display is disposed and remote personnel, e.g., in a collage, overlayed, and/or bifurcated display. The media may be manipulated (e.g., by utilizing the display construct). Utilizing the display construct can be direct or indirect. Indirect utilization of the media may be using an input device such as an electronic mouse, or a keyboard. The input device may be communicatively (e.g., wired and/or wirelessly) coupled to the media. Direct utilization may be by using the display construct as a touch screen using a user (e.g., finger) or a contacting device (e.g., an electronic pen or stylus).

In some embodiments, the media may be displayed by a transparent media display construct. The transparent display construct that is configured to display media, may be disposed on, or coupled (e.g., attached) to, a window, a door, a wall, a divider, or to any other architectural element of a facility. The architectural element may be a fixture or a non-fixture. The architectural element (e.g., window, wall, or divider) may be static or mobile (e.g., a moving window or door). The architectural element may comprise a tintable window. The architectural element may comprise a tintable substance (e.g., an optically switchable device such as an electrochromic device). The optically switchable device may alter its transparency, absorbance, or color, e.g., at least in the visible spectrum. A user may control the usage of the media and/or tint state of the architectural element, e.g., separately or as linked to each other. A user in one enclosure looking out of the enclosure through the transparent media display, may optionally see both the media, and the external environment of the enclosure through the media display.

Embodiments described herein relate to vision windows with a tandem (e.g., transparent) display construct. In certain embodiments, the vision window is an electrochromic window. The electrochromic window may comprise a solid state and/or inorganic electrochromic (EC) device. The vision window may be in the form of an insulated glass unit (IGU). When the IGU includes an electrochromic (abbreviated herein as "EC") device, it may be termed an "EC IGU." The EC IGU can tint (e.g., darken) a room in which it is disposed and/or provide a tinted (e.g., darker) background as compared to a non-tinted IGU. The tinted IGU can provide a background preferable (e.g., necessary) for acceptable (e.g., good) contrast on the (e.g., transparent) display construct. In another example, windows with (e.g., transparent) display constructs can replace televisions (abbreviated herein as "TVs") in commercial and residential applications. Together, the (e.g., transparent) display construct and EC IGU can provide visual privacy glass function, e.g. because the display can augment the privacy provided by EC glass alone.

Figure 13A:
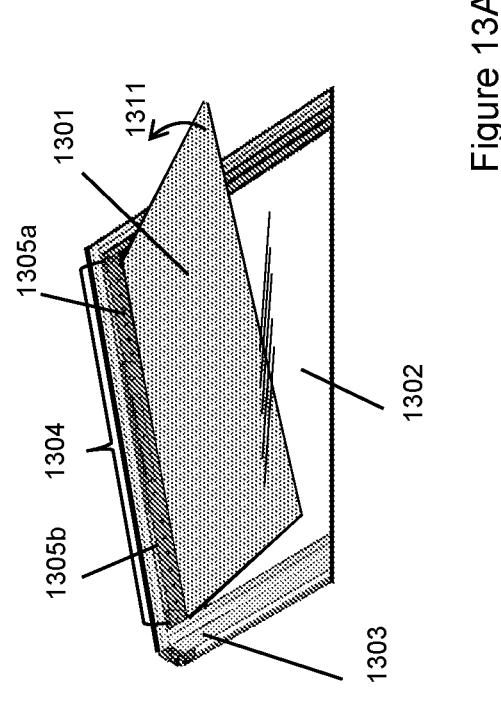
FIGS. 13A and 13B show various windows and display constructs.

FIG. 13A shows an example of a window 1302 framed in a window frame 1303, and a fastener structure 1304 comprising a first hinge 1305a and a second hinge 1305b, which hinges facilitate rotating display construct 1301 about the hinge axis, e.g., in a direction of arrow 1311. The window may be a smart window such as an electrochromic (EC) window. The window may be in the form of an EC IGU. In one embodiment, mounted to window frame (e.g., 1303) is one or more display constructs (e.g., transparent display) (e.g., 1301) that is transparent at least in part. In one embodiment, the one or more display constructs (e.g., transparent display) comprises T-OLED technology, but it should be understood that the present invention should not be limited by or to such technology. In one embodiment, one or more display constructs (e.g., transparent display) is mounted to frame (e.g., 1303) via a fastener structure (e.g., 1304). In one embodiment the fastener structure (also referred to herein as a "fastener") comprises a bracket. In one embodiment, the fastener structure comprises an L-bracket. In one embodiment, L-bracket comprises a length that approximates or equals a length of a side of window (e.g., and in the example shown in FIG. 13A, also the length of the fastener 1304). In embodiments, the fundamental length scale (e.g., length) of a window is at most about 60 feet ('), 50', 40', 30', 25', 20', 15', 10', 5' or 1'. The FLS of the window can be of any value between the aforementioned values (e.g., from 1' to 60', from 1' to 30', from 30' to 60', or from 10' to 40'). In embodiments, the fundamental length scale (e.g., length) of a window is at least about 60', 80', or 100'. In one embodiment, the display construct (e.g., transparent display) encompasses an area that (e.g., substantially) matches a surface area of the lite (e.g., pane).

Figure 13B:
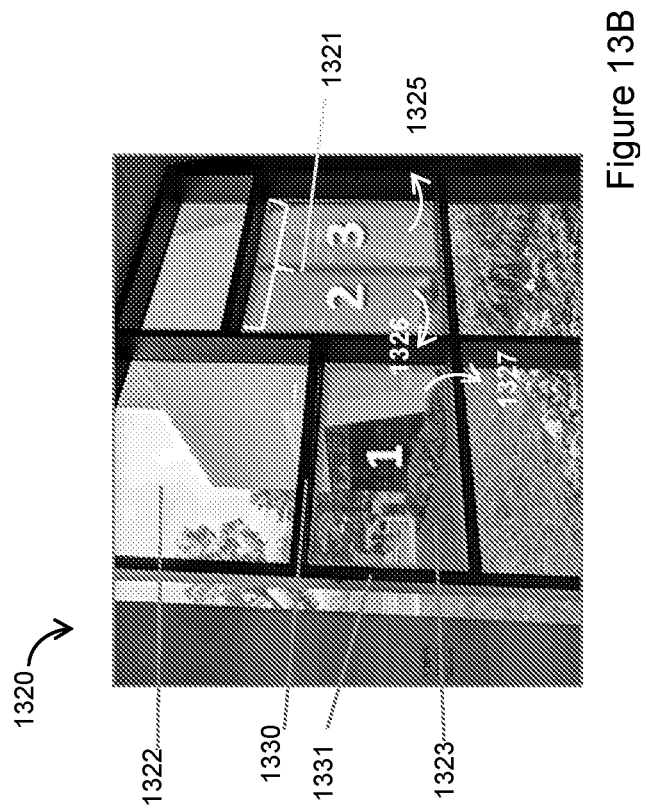

FIG. 13B shows an example of various windows in a facade 1320 of a building, which facade comprises windows 1322, 1323, and 1321, and display constructs 1, 2, and 3. In the example shown in FIG. 13B, display construct 1 is transparent at least in part and is disposed over window 1323 (e.g., display construct 1 is super positioned over window 1323) such that the entirety of window 1323 is covered by the display construct, and a user can view through the display construct 1 and the window 1323 the external environment (e.g., flowers, glass, and trees). Display construct 1 is coupled to the window with a fastener that facilitates rotation of the display construct about an axis parallel to the window bottom horizontal edge, which rotation is in the direction of arrow 1327. In the example shown in FIG. 13B, display constructs 2 and 3 are transparent at least in part and are disposed over window 1321 such that the entirety of window 1321 is covered by the two display construct each covering (e.g., extending to) about half of the surface area of window 1321, and a user can view through the display constructs 2 and 3 and the window 1321 the external environment (e.g., flowers, glass, and trees). Display construct 2 is coupled to the window 1321 with a fastener that facilitates rotation of the display construct about an axis parallel to the window left vertical edge, which rotation is in the direction of arrow 1326. Display construct 3 is coupled to the window with a fastener that facilitates rotation of the display construct about an axis parallel to the window 1321 right vertical edge, which rotation is in the direction of arrow 1325.

In some embodiments, the display construct comprises a hardened transparent material such as plastic or glass. The glass may be in the form of one or more glass panes. For example, the display construct may include a display matrix (e.g., an array of lights) disposed between two glass panes. The array of lights may include an array of colored lights. For example, an array of red, green, and blue colored lights. For example, an array of cyan, magenta, and yellow colored lights. The array of lights may include light colors used in electronic screen display. The array of lights may comprise an array of LEDs (e.g., OLEDs, e.g., TOLEDs). The matrix display (e.g., array of lights) may be at least partially transparent (e.g., to an average human eye). The transparent OLED may facilitate transition of a substantial portion (e.g., greater than about 30%, 40%, 50%, 60%, 80%, 90% or 95%) of the intensity and/or wavelength to which an average human eye senses. The matrix display may form minimal disturbance to a user looking through the array. The array of lights may form minimal disturbance to a user looking through a window on which the array is disposed. The display matrix (e.g., array of lights) may be maximally transparent. At least one glass pane of the display construct may be of a regular glass thickness. The regular glass may have a thickness of at least about 1 millimeters (mm), 2 mm, 3 mm, 4 mm, 5 mm, or 6 mm. The regular glass may have a thickness of a value between any of the aforementioned values (e.g., from 1 mm to 6 mm, from 1 mm to 3 mm, from 3 mm to about 4 mm, or from 4 mm to 6 mm). At least one glass pane of the display construct may be of a thin glass thickness. The thin glass may have a thickness of at most about 0.4 millimeters (mm), 0.5 mm, 0.6 mm, 0.7 mm, 0.8 mm, or 0.9 mm thick. The thin glass may have a thickness of a value between any of the aforementioned values (e.g., from 0.4 mm to 0.9 mm, from 0.4 mm to 0.7 mm, or from 0.5 mm to 0.9 mm). The glass of the display construct may be at least transmissive (e.g., in the visible spectrum). For example, the glass may be at least about 80%, 85%, 90%, 95%, or 99% transmissive. The glass may have a transmissivity percentage value between any of the aforementioned percentages (e.g., from about 80% to about 99%). The display construct may comprise one or more panes (e.g., glass panes). For example, the display construct may comprise a plurality (e.g., two) of panes. The glass panes may have (e.g., substantially) the same thickness, or different thickness. The front facing pane may be thicker than the back facing pane. The back facing pane may be thicker than the front facing pane. Front may be in a direction of a prospective viewer (e.g., in front of display construct 101, looking at display construct 101). Back may be in the direction of a (e.g., tintable) window (e.g., 102). One glass may be thicker relative to another glass. The thicker glass may be at least about 1.25*, 1.5*, 2*, 2.5*, 3*, 3.5*, or 4* thicker than the thinner glass. The symbol "*" designates the mathematical operation of "times." The transmissivity of the display construct (that including the one or more panes and the display matrix (e.g., light-array or LCD)) may be of at least about 20%, 30%, 35%, 40%, 45%, 50%, 60%, 70%, 80%, or 90%. The display construct may have a transmissivity percentage value between any of the aforementioned percentages (e.g., from about 20% to about 90%, from about 20% to about 50%, from about 20% to about 40%, from about 30% to about 40%, from about 40% to about 80%, or from about 50% to about 90%). A higher transmissivity parentage refers higher intensity and/or broader spectrum of light that passes through a material (e.g., glass). The transmissivity may be of visible light. The transmissivity may be measured as visible transmittance (abbreviated herein as "Tvis") referring to the amount of light in the visible portion of the spectrum that passes through a material. The transmissivity may be relative to the intensity of incoming light. The display construct may transmit at least about 80%, 85%, 90%, 95%, or 99% of the visible spectrum of light (e.g., wavelength spectrum) therethrough. The display construct may transmit a percentage value between any of the aforementioned percentages (e.g., from about 80% to about 99%). In some embodiments, instead of an array of lights, a liquid crystal display is utilized.

Figure 14:
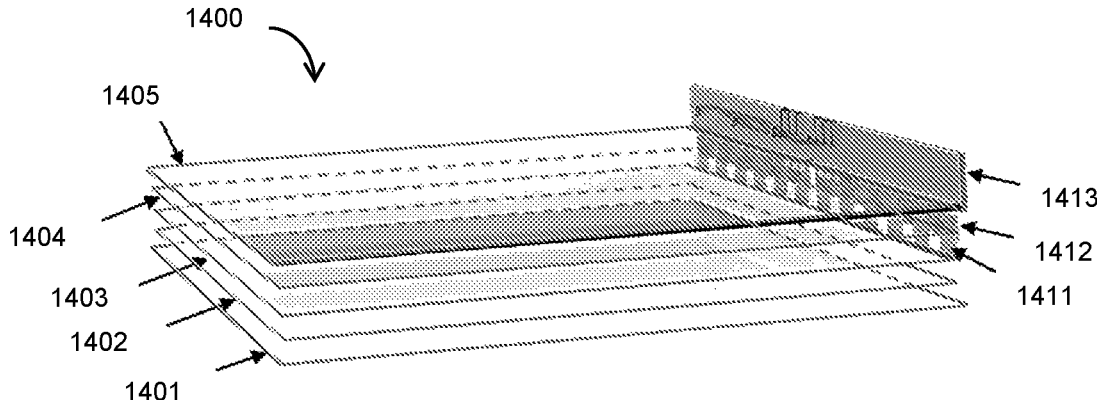
FIG. 14 schematically shows a display construct assembly.

FIG. 14 shows a schematic example of a display construct assembly 1400 prior to its lamination, which display construct that includes a thicker glass pane 1405, a first adhesive layer 1404, a display matrix 1403, a second adhesive layer 1402, and a thinner glass pane 1401, which matrix is connected via wiring 1411 to a circuitry 1412 that controls at least an aspect of the display construct, which display construct is coupled to a fastener 1413.

In some embodiments, diverse types of interfaces are employed for providing user control of interactive targets (e.g., systems, devices, and/or media). The interactive targets can be controlled, e.g., using control interface(s). The control interface may be local and/or remote. The control interface may be communicated through the network. The control system may be communicatively coupled to the network, to which the target(s) are communicatively coupled. An example of a control interface comprises manipulating a digital twin (e.g., representative model) of a facility. For example, one or more interactive devices (e.g., optically switchable windows, sensors, emitters, and/or media displays) may be controlled using a mobile circuitry. The mobile circuitry may comprise a gaming-type controller (e.g., a pointing device) or a virtual reality (VR) user interface. When an additional new device is installed in the facility (e.g. in a room thereof) and is coupled to the network, the new target (e.g., device) may be detected (e.g., and included into the digital twin). The detection of the new target and/or inclusion of the new target into the digital twin may be done automatically and/or manually. For example, the detection of the new target and/or inclusion of the new target into the digital twin may be without requiring (e.g., any) manual intervention.

In some embodiments, a digital twin comprises a digital model of the facility. The digital twin is comprised of a virtual three dimensional (3D) model of the facility. The facility may include static and/or dynamic elements. For example, the static elements may include representations of a structural feature of the facility and the dynamic elements may include representations of an interactive device with a controllable feature. The 3D model may include visual elements. The visual elements may represent facility fixture(s). The fixture may comprise a wall, a floor, wall, door, shelf, a structural (e.g., walk-in) closet, a fixed lamp, electrical panel, elevator shaft, or a window. The fixtures may be affixed to the structure. The visual elements may represent non-fixture(s). The non-fixtures may comprise a person, a chair, a movable lamp, a table, a sofa, a movable closet or a media projection. The visual elements may represent facility features comprising a floor, wall, door, window, furniture, appliance, people, and/or interactive target(s)). The digital twin may be similar to virtual worlds used in computer gaming and simulations, representing the environment of the real facility. Creation of a 3D model may include the analysis of a Building Information Modeling (BIM) model (e.g., an Autodesk Revit file having *.RVT format), e.g., to derive a representation of (e.g., basic) fixed structures and movable items such as doors, windows, and elevators. The 3D mode may comprise architectural details related to the design of the facility, such as a 3D model, elevation details, floor plans, and/or project settings related to the facility. The 3D model may comprise annotation (e.g., with two dimensional (2D) drafting element(s)). The 3D model may facilitate access to information from a model database of the facility. The 3D model may be utilized for planning and/or tracking various stages in the lifecycle of the facility (e.g., facility concept, construction, maintenance and/or demolition). The 3D model may be updated during the lifecycle of the facility. The update may be periodically, intermittently, on occurrence of an event (e.g., relating to the structural status of the facility), in real time, on availability of manpower, and/or at a whim. The digital twin may comprise the 3D model, and may be updated in relation to (e.g., when) the 3D model of the facility is updated. The digital twin may be linked to the 3D model (e.g., and thus linked to its updates). In real time may include within at most 15 seconds (sec.), 30 sec., 45 sec., 1 minute (min), 2 min., 3 min. 4 min., 5 min, 10 min., 15 min. or 30 min. from the occurrence of a change in the enclosure (e.g., a change initiated by the user).

In some embodiments, the digital twin (e.g., 3D model of the facility) is defined at least in part by using one or more sensors (e.g., optical, acoustic, pressure, gas velocity, and/or distance measuring sensor(s)), to determine the layout of the real facility. Usage of sensor data can be used exclusively to model the environment of the enclosure. Usage of sensor data can be used in conjunction with a 3D model of the facility (e.g., (BIM model) to model the environment of the enclosure. The BIM model of the facility may be obtained before, during, and/or after the facility has been constructed. The BIM model of the facility can be updated (e.g., manually and/or using the sensor data) during operation of the facility (e.g., in real time). In real time may include, during occurrence of a change of, or in, the facility. In real time may include within at most 2 h, 4 h, 6 h, 8 h, 12 h, 24 h, 36 h, 48 h, 60 h, or 72 h from the occurrence of a change of, or in, the facility.

In some embodiments, dynamic elements in the digital twin include target (e.g., device) settings. The target setting may comprise (e.g., existing and/or predetermined): tint values, temperature settings, and/or light switch settings. The target settings may comprise available actions in media displays. The available actions may comprise menu items or hotspots in displayed content. The digital twin may include virtual representation of the target and/or of movable objects (e.g., chairs or doors), and/or occupants (actual images from a camera or from stored avatars). In some embodiments, the dynamic elements can be targets (e.g., devices) that are newly plugged into the network, and/or disappear from the network (e.g., due to a malfunction or relocation). The digital twin can reside in any circuitry (e.g., processor) operatively coupled to the network. The circuitry in which the digital circuitry resides may be in the facility, outside of the facility, and/or in the cloud. In some embodiments, a two-way link is maintained between the digital twin and a real circuitry. The real circuitry may be part of the control system. The real circuitry may be included in the master controller, network controller, floor controller, local controller, or in any other node in a processing system (e.g., in the facility or outside of the facility). For example, the two-way link can be used by the real circuitry to inform the digital twin of changes in the dynamic and/or static elements so that the 3D representation of the enclosure can be updated, e.g., in real time. In real time may include, during occurrence of a change of, or in, the enclosure. In real time may include within at most 15 seconds (sec.), 30 sec., 45 sec., 1 minute (min), 2 min., 3 min. 4 min., 5 min, 10 min., 15 min. or 30 min. from the occurrence of a change in, the enclosure. The two-way link may be used by the digital twin to inform the real circuitry of manipulative (e.g., control) actions entered by a user on a mobile circuitry. The mobile circuitry can be a remote controller (e.g., comprising a handheld pointer, manual input buttons, or touchscreen).

In some embodiments, one or more mobile circuitry devices of a user are aligned with (e.g., linked to) the virtual 3D "digital twin" model of the facility (or any portion thereof), e.g., via WiFi or other network connections. The mobile circuitry may comprise a remote (e.g., mobile)

control interface. The mobile circuitry may include a pointer, gaming controller, and/or virtual reality (VR) controller. For example, the mobile circuitry may have no interaction with the physical facility, e.g., other than forwarding network communications via the aligned communication channel to and/or from the digital twin. The user interaction may not be direct and/or physical with any device being controlled in the enclosure. The user interaction of the user with the target may be indirect. The interaction of the user with the target may be devoid of tactile touch, optical ray projection, and/or vocal sound. The control actions taken by the user to control the target may be based at least in part on a relative position of the digital circuitry manipulated by a user, relative to the modeled space in the digital twin (e.g., virtual movement within the modeled enclosure). The control actions taken by the user to control the target may be not based on (e.g. and are oblivious to) the spatial relationship between the user and the digital twin. For example, a user may use a remote control pointing device, and point to a presentation portion. The presentation may be displayed on a TOLED display construct disposed in the line of sight between a user and a window (e.g., smart window). The coupling between the mobile circuitry and the target may be time based and/or may be action based. For example, the user may use the point the remote controller to the presentation, and by this couple with the presentation. The coupling may initiate on pointing in a duration that exceeds a duration threshold. The coupling may initiate by clicking the remote controller while pointing. The user may then point to a position that triggers a dropdown menu in the presentation. The dropdown menu may be visible (i) when the pointing may exceed a time threshold (ii) when the user presses button(s) on the remote controller (e.g., action based), and/or (iii) when the user performs a gesture (e.g., as disclosed herein). The user may then choose from the menu. The choice may be initiated (i) when the pointing may exceed a time threshold (ii) when the user presses button(s) on the remote controller (e.g., action based), and/or (iii) when the user performs a gesture (e.g., as disclosed herein). The actions of the user done in conjunction with the mobile circuitry (e.g., remote controller) may be communicated to the network, and thereby to the digital twin that is in turn communicated to the target. And thus, the user may indirectly communicate with the target through the digital twin. The mobile circuitry (e.g., remote controller) may be located with respect to the enclosure at one time, at time intervals, and/or continuously. Once a relative location of the mobile circuitry (e.g., remote controller) with the enclosure is determined, the user may use the remote controller anywhere (e.g., inside the enclosure, or outside of the enclosure). Outside of the enclosure may comprise in the facility or outside of the facility. For example, a conference room may establish its relative location with a remote controller. Thereafter, a user may use the relatively located remote controller to manipulate a light intensity of a light bulb disposed in the conference room while in the conference room, or while outside of the conference room (e.g., from home).

In some embodiments, the mobile circuitry (e.g., remote controller) can control a (e.g., any) interactive and/or controllable target (e.g., device) in the facility or any portion thereof, as long as (i) the target and (ii) the mobile circuitry (e.g., remote controller) are communicatively coupled to the digital twin (e.g., using the network). For example, the facility may comprise interactive targets comprising one or more sensors, emitters, tintable windows, or media displays, which devices are coupled to a communication network. In some embodiments, the user interacts with the digital twin from within the facility or from an (e.g., arbitrary) location outside the facility. For example, a remote controller device can comprise a virtual reality (VR) device, e.g., having a headset (e.g., a binocular display) and/or a handheld controller (e.g., motion sensor with or without input buttons). The mobile circuitry may comprise an Oculus Virtual Reality Player Controller (OVRPlayerController). In some embodiments, a remote control interface may be used which provides (i) visual representation to the user of the digital twin for navigation in the virtual facility, and/or (ii) user input actions for movement within the 3D model. The user input actions may include (1) pointing to an intended interactive target to be controller (e.g., to alter status of the target), (2) gestures, and/or (3) button presses, to indicate a selection action to be taken with the mobile circuitry (e.g., remote controller). The remote controller may be used to manipulate an interactive target by pointing towards them (e.g., for coupling), gesturing in other directions, and/or pressing one or more buttons operatively coupled to the mobile circuitry (e.g., buttons disposed on an envelope of the mobile circuitry). Interfacing between the mobile circuitry and the digital twin may not be carried out through a screen depicting the digital twin. Interfacing between the user and the digital twin may not be carried out through a screen showing the digital twin. Interfacing between the mobile circuitry and the digital model may not require (e.g., any) optical sensor as facilitator). Some embodiments employ a different mode of input from augmented reality applications that operate through interaction with a screen (e.g., by using an optical sensor such as a camera).

In some embodiments, a mobile circuitry (e.g., handheld controller) without any display or screen is used, which display or screen may depict a digital representation of the enclosure and/or the target. For example, instead of virtual navigation within the enclosure by the user, the actual location of the user can be determined in order to establish the location of the user in the digital twin, e.g., to use as a reference in connection with a pointing action by the user. For example, the mobile circuitry (e.g., handheld controller) may include geographic tracking capability (e.g., GPS, UWB, BLE, and/or dead-reckoning) so that location coordinates of the mobile circuitry can be transmitted to the digital twin using any suitable network connection established by the user between the mobile circuitry and the digital twin. For example, a network connection may at least partly include the transport links used by a hierarchical controller network within a facility. The network connection may be separate from the controller network of the facility (e.g., using a wireless network such as a cellular network).

In some embodiments, a user may couple to a requested target. The coupling may comprise a gesture using the mobile circuitry. The coupling may comprise an electronic trigger in the mobile circuitry. The coupling may comprise a movement, pointing, clicking gesture, or any combination thereof. For example, the coupling may initiate at least in part by pointing to the target for a period of time above a threshold (e.g., that is predetermined). For example, the coupling may initiate at least in part by clicking a button (e.g., a target selection button) on a remote controller that includes the mobile circuitry. For example, the coupling may initiate at least in part by moving the mobile circuitry towards a direction of the target. For example, the coupling may initiate at least in part by pointing a frontal portion of the mobile circuitry in a direction of the target (e.g., for a time above a first threshold) and clicking a button (e.g., for a time above a second threshold). The first and second thresholds can be (e.g., substantially) the same or different.

Figure 15:
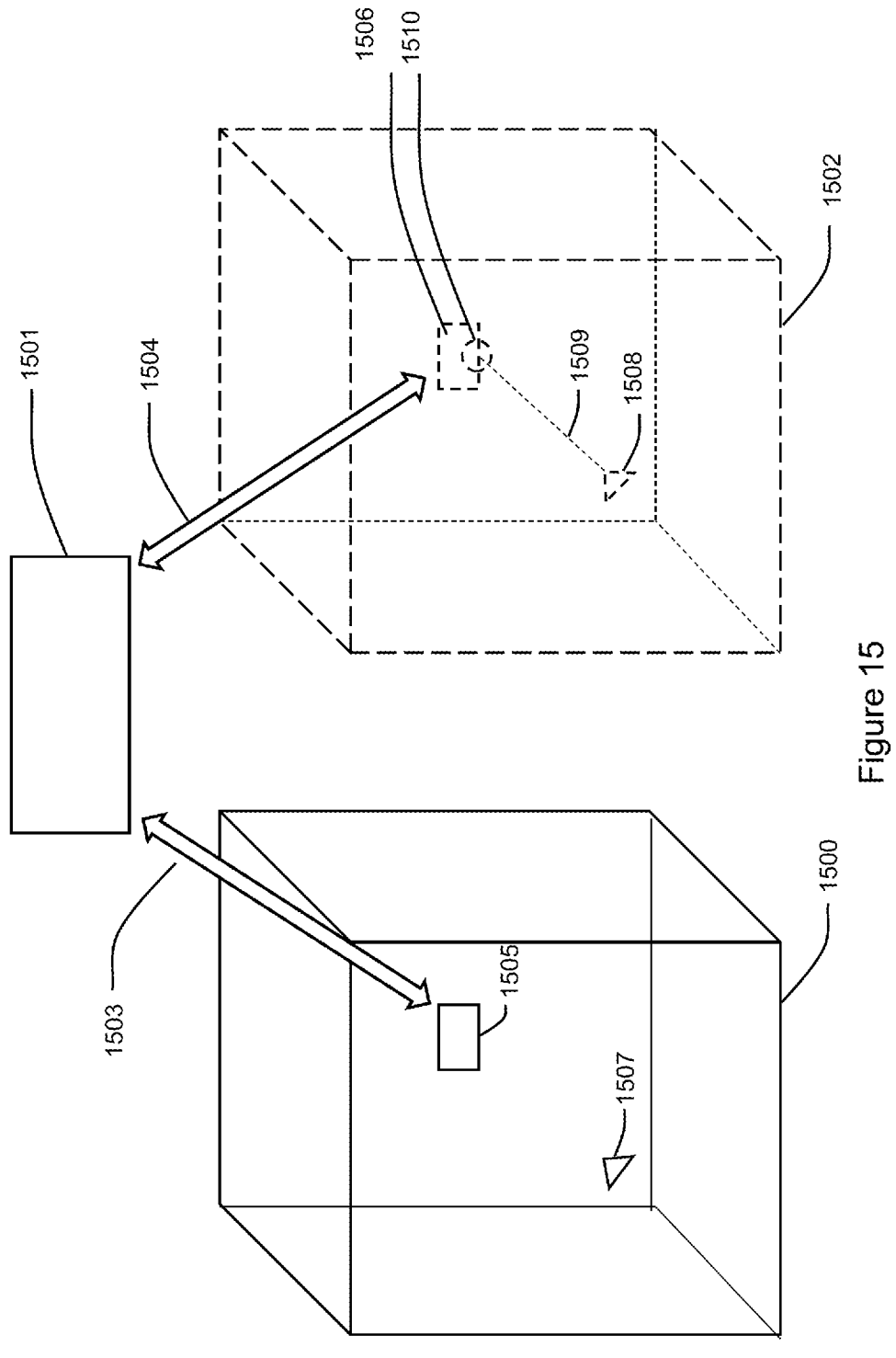
FIG. 15 depicts an enclosure communicatively coupled to its digital twin representation.

FIG. 15 shows an example embodiment of a control system in which a real, physical enclosure (e.g., room) 1500 includes a controller network for managing interactive network devices under control of a processor 1501 (e.g., a master controller). The structure and contents of building 1500 are represented in a 3-D model digital twin 1502 as part of a modeling and/or simulation system executed in a computing asset. The computing asset may be co-located with or remote from enclosure 1500 and processor (e.g., master controller) 1501. A network link 1503 in enclosure 1500 connects processor 1501 with a plurality of network nodes including an interactive target 1505. Interactive target 1505 is represented as a virtual object 1506 within digital twin 1502. A network link 1504 connects processor 1501 with digital twin 1502.

In the example of FIG. 15, a user located in enclosure 1500 carries a handheld control 1507 having a pointing capability (e.g., to couple with the target 1505). The location of handheld control 1507 may be tracked, for example, via a network link with digital twin 1502 (not shown). The link may include some transport media contained within network 1503. Handheld controller 1507 is represented as a virtual handheld controller 1508 within digital twin 1502. Based at least in part on the tracked location and pointing capability of handheld controller 1507, when the user initiates a pointing event (e.g., aiming at a particular target and pressing an action button on the handheld controller) it is transmitted to digital twin 1502. Accordingly, digital twin 1502 with the target (e.g., represented as a digital ray 1509 from the tracked location within digital twin 1502). Digital ray 1509 intersects with virtual device 1506 at a point of intersection 1510. A resulting interpretation of actions made by the user in the digital twin 1502 is reported by digital twin 1502 to processor 1501 via network link 1504. In response, processor 1501 relays a control message to interactive device 1505 to initiate a commanded action in in accordance with a gesture (or other input action) made by the user.

Figure 16:
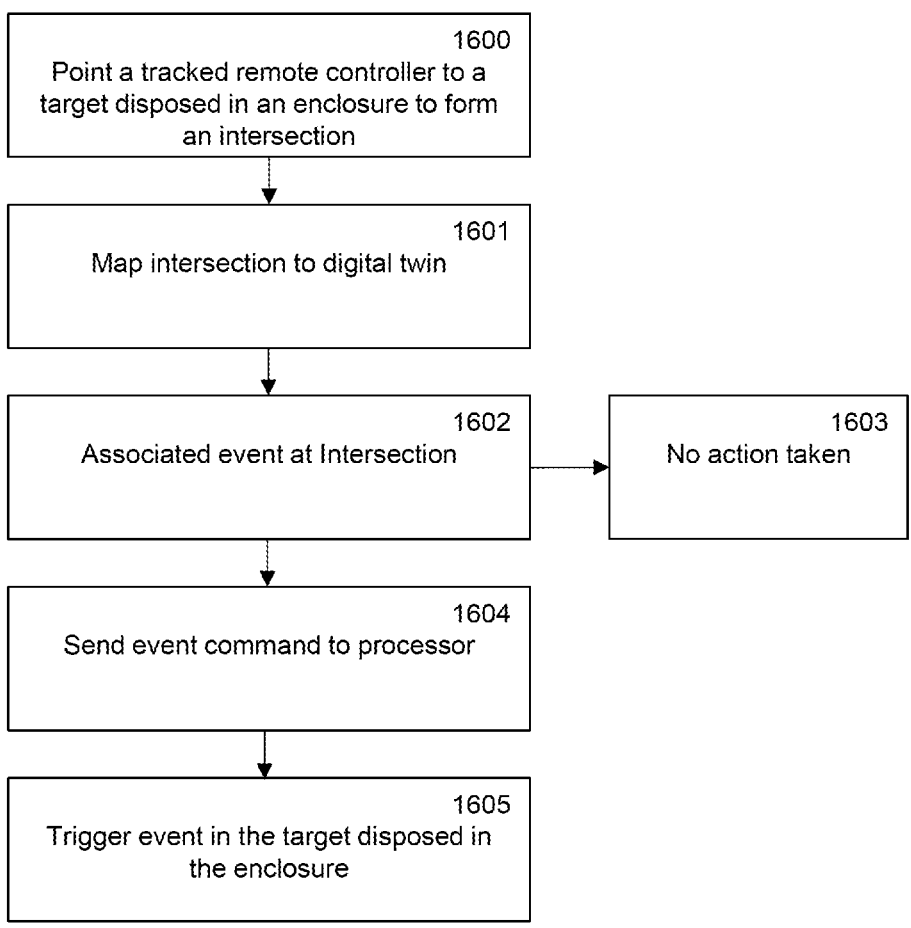
FIG. 16 is a flowchart for a control method.

FIG. 16 shows an example method corresponding to the embodiment of FIG. 15. For example, a user carrying a mobile circuitry (e.g., handheld remote controller) in an enclosure (e.g., building) represented by the digital twin, may wish to interact with a particular interactive target. In operation 1600, the user couples to the target, e.g., by pointing and/or clicking with the tracked remote controller to signify a requested control action. The mobile circuitry may couple to the target by pointing towards it (e.g., for a period of time longer than a threshold time). The mobile circuitry may couple to the target by a coupling command. The coupling command may comprise tactile, oral, visual, and/or written command. The coupling may comprise any voice and/or gesture command disclosed herein. The coupling may comprise pressing a button that is operatively (e.g., communicatively) coupled to the mobile circuitry, to the target, and/or to the digital twin.

In some embodiments, the mobile circuitry may be directional in at least two directions. For example, the mobile circuitry may have a front direction and a back direction. For example, the mobile circuitry may be able to distinguish between at least two, three, four, five, or six spatial directions. The directions may comprise up, down, front, back, right, or left. The directions may comprise north, south, east, and west. The directions may be relative directions, e.g., relative to the previous position of the mobile circuitry. The directions may be absolute directions (e.g., within a measurable error range). The directions may be in accordance with a Global Positioning System (GPS). Coupling of the mobile circuitry (e.g., remote controller) and the target (e.g., media projection) may comprise pointing a front direction of the mobile circuitry towards the target, e.g., for a time above a threshold. Using a network communication route from the remote controller to the digital twin, an intersection between the mobile circuitry and the target may be mapped digitally in the digital twin. The intersection may be from the tracked location of the mobile circuitry (e.g., handheld controller) along a digital ray indicated by pointing direction, e.g., to identify any requested interactive target (e.g., device and/or control element on a device). In the example shown in FIG. 16, a remote controller that is communicatively coupled to the digital twin (e.g. and tracked through a network communication route) points to a target disposed in an enclosure in operation 1601. A virtual digital ray can be envisioned from the pointed remote controller to the target towards which the remote controller directionally points. The network communication route may comprise a (e.g., separate) network connection. In operation 1602, it is determined whether any predetermined event (e.g., any control event) is associated with the point of intersection at the interactive target. For example, the point of intersection may indicate a light switch target. An event associated with pointing and/or clicking on the light switch may be a change in the on/off state of the light switch. If no associated event is found for the point of intersection, then no action is taken, and the method ends at an operation 1603. If an associated event is found, then the method proceeds to operation 1604 to send an event command from the digital twin to a processor (e.g., controller) operatively coupled with the light switch in the enclosure. In operation 1605, the processor receives the event command and triggers the associated event in the corresponding physical enclosure. Triggering the associated even may be by sending the command to an appropriate controller for the interactive device (e.g., a tint command send to a corresponding window controller).

In some embodiments, social interaction and/or communication is provided via the digital twin. When the digital twin is coupled to a communication network, it (e.g., intrinsically) allows for a social experience where remote participants join the facility and interact with targets (e.g., devices or media) therein via the digital twin. The concept of the digital twin may enable multi-user participation in manipulating an interactive target disposed in an enclosure; whether the participants are in the enclosure or not, and/or whether the participants are local or remote. For example, a plurality of users may access (e.g., interact with) the digital twin at the same time in a way that is perceptible to the other users. For example, when users employ VR headsets with visual displays and audio communication, they may see and/or hear one another in the virtual space represented by the digital twin. For example, when users employ video conferencing tools, they may see and/or hear one another in the virtual space represented by the digital twin. For example, a tracked user may be represented as an avatar placed within the corresponding location in the digital twin and displayed to other users. The avatar may be generic and/or may include photographic data that may be stored in advance or captured during an interaction of the user with the digital twin (e.g., using a camera or other personal identifier). The personal identifier may comprise facial recognition, fingerprint scanning, retinal scanning, or other biometric-based methods used to confirm an identity of a user.

Figure 17:
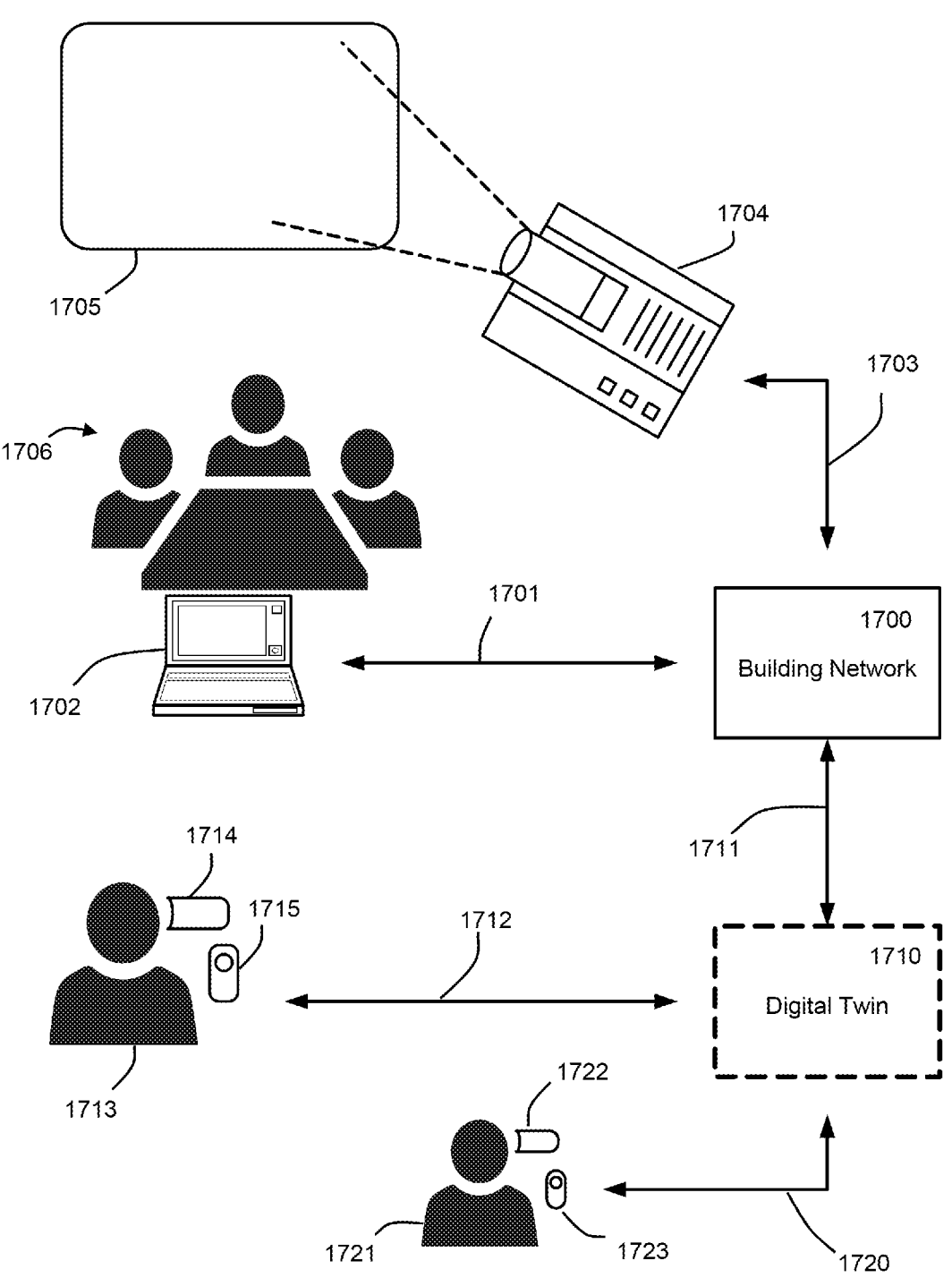
FIG. 17 depicts user interaction with a digital twin to control a target.

FIG. 17 shows an example in which multiple users interact socially via a digital twin which provides access to controllable features of interactive target(s) within an enclosure environment. For example, a building network 1700 may include a network communication link between a master controller, network controllers, window controllers, and interactive targets such as sensors, actuators, emitters, media display, computing devices, and/or electrochromic windows. FIG. 17 represents a group of individuals meeting, in which a mobile circuitry (e.g., laptop computer) 1702 is connected to a building network 1700 by a communication link (e.g., WiFi) 1701 for providing a media presentation. A projector 1704 which projects a media display 1705 (e.g., on a display construct) to a group of room occupants 1706 is coupled to building network 1700 by a communication link 1703. Thus, media content for a presentation (e.g., a computer application such as a spreadsheet or slideshow) generated by device 1702 can be transmitted to projector 1704 for display. The media content can also be sent to a digital twin 1710 over a link 1711 so that it can be represented as a visible element in digital twin 1710. The media content can instead be transmitted over a direct link (e.g., Bluetooth (BLE) or WiFi) between device 1702 and projector 1704. There may be a parallel connection of device 1702 to building network 1700 so that the media content can be provided to digital twin 1710 or the simulation model can be maintained without including the media content in the digital twin.

Digital twin 1710 is accessible to a user 1713 via a communication link 1712 between digital twin 1710 and/or user interface equipment. For example, the user interface equipment can include a VR headset 1714 and a VR handheld controller 1715. Another user 1721 accesses digital twin 1710 at the same time via a communication link 1720. User 1721 may have a VR headset 1722 and a VR handheld controller 1723. In some embodiments, the digital twin 1710 may include dynamic elements for the room containing the group meeting 1706 (e.g., representations of persons seated around a conference table, representations of remote participants at virtual locations to which they have navigated within the VR model, and/or instantaneous views of the media content being displayed in the room). Digital twin 1710 may provide for exchanging audio signals captured by microphones (e.g., disposed in the room and/or the VR equipment) for reproduction for the other participants.

In some embodiments, network communication among a controller (e.g., MC), digital twin, user mobile circuitry (e.g., remote controller), and local interactive devices includes mono- or bi-directional messaging capability. For example, a combination of local area networks and/or wide area networks with appropriate gateways may be configured to facilitate (i) exchanging messages, (ii) updating of a digital twin, and/or (ii) user remote interaction with a target (e.g., for remotely controlling the interactive target). The messages may be relevant to a status change of the target, and/or to users of a meeting (without or with relation to the target, without or with relation to the enclosure in which the target is disposed, and with or without relation to the subject matter of the meeting). The controller may be configured (e.g., by appropriate software programming) to interact with the digital twin. The interaction may be for providing data identifying changes to static elements and the states of dynamic elements included in the digital twin. The digital twin may be configured to provide (i) intuitive capabilities to manipulate a target remotely, (ii) a virtual reality experience to at least one user to navigate a virtual 3D model of the enclosure, (iii) to investigate various dynamic states in the digital twin, and/or (iv) to exchange interactive (e.g., control) actions (e.g., events) related to the target, which actions are initiated by at least one user, e.g., via a virtual-reality interface. The remote manipulation may or may not comprise an electromagnetic and/or acoustic beam directed from the remote controller to the target. In some embodiments, remote manipulation may be devoid of an electromagnetic and/or acoustic beam directed from the remote controller to the target. In some embodiments, the communication coupling of the remote controller with the target may be (e.g., only) through the network that is communicatively coupled to the digital twin. In some embodiments, the communication coupling of the remote controller with the target may be (e.g., only) through the digital twin (e.g., using the network as a communication pathway that communicatively coupled the target, the digital twin, and the remote controller (comprising the mobile circuitry). The communication coupling may comprise wired and/or wireless communication. The digital twin may be configured to process a user input event, e.g., (i) to identify whether it corresponds to a valid command related to the target (e.g., from a predetermined list of valid control actions of the target) and/or (ii) to forward valid commands (e.g., to at least one controller or directly to the target) for manipulating the target (e.g., manipulating a state of the target that is manipulatable). In some embodiments, at least one controller monitors its ongoing exchange of data and/or commands with the local interactive target, e.g., to collect and/or forward updated information for the digital twin. The updated information may include any dynamic change of state, e.g., resulting from remote event(s) initiated by the user(s).

In some embodiments, messaging sequences include one or more data messages and one or more command messages exchanges between (i) one or more local targets and the processor, (ii) the processor and the digital twin, and/or (iii) the digital twin and the mobile circuitry. For example, a processor (e.g., a controller such as a master controller) may send a data message to the digital twin when one or more new targets join the network from time to time. The data may represent new static and/or dynamic elements for inclusion in the digital twin 3D model of the facility. The data may represent changes in a (e.g., system) state for a dynamic element of a target.

In some embodiments, the mobile circuitry and the digital twin exchange one or more messages that enable a user to control (including to monitor and/or alter) operation of real targets (e.g., by manipulating their virtual twin elements in digital twin). For example, a user may activate their mobile circuitry (e.g., a remote gaming controller such as a VR headset and handheld VR controller (e.g., a point and click button)) to create a link with the digital twin. In some embodiments, upon an initial connection the digital twin and mobile circuitry exchange data messages with data for displaying a simulated scene in the digital twin, e.g., according to a default starting position. For example, a virtual simulation may begin at an entrance to the enclosure, or at any other point of interest (e.g., chosen by a user). In some embodiments when the user is actually located in the enclosure being represented, the starting position may correspond to the current location of the user (e.g., an initiate message may provide geographic coordinates of a GPS-equipped user remote controller). Data or commands within messages between the mobile circuitry and the digital twin may include navigation actions (resulting in updated views being returned from the digital twin) and/or control actions (e.g., point and click) to indicate a desired change in an alterable state of a target.

In some embodiments, the digital twin validates a received control action, e.g., by mapping the control action to an indicated location in the digital twin and/or checking against a list of valid actions. For example, the digital twin may only send a message to the processor (e.g., controller) when the control action event of the user corresponds to an identifiable and authorized interaction. When a valid interaction is found, a command message may be transmitted from the digital twin to the processor (e.g., controller), and forwarded to the affected target. After executing the command, one or more acknowledgement messages may propagate back to the digital twin and the 3D model of the digital twin may optionally be updated accordingly. For example, after executing a change in a tint value of an insulated glass unit (IGU), the digital twin model of the IGU may be adjusted to show a corresponding change in tint level.

Figure 18:
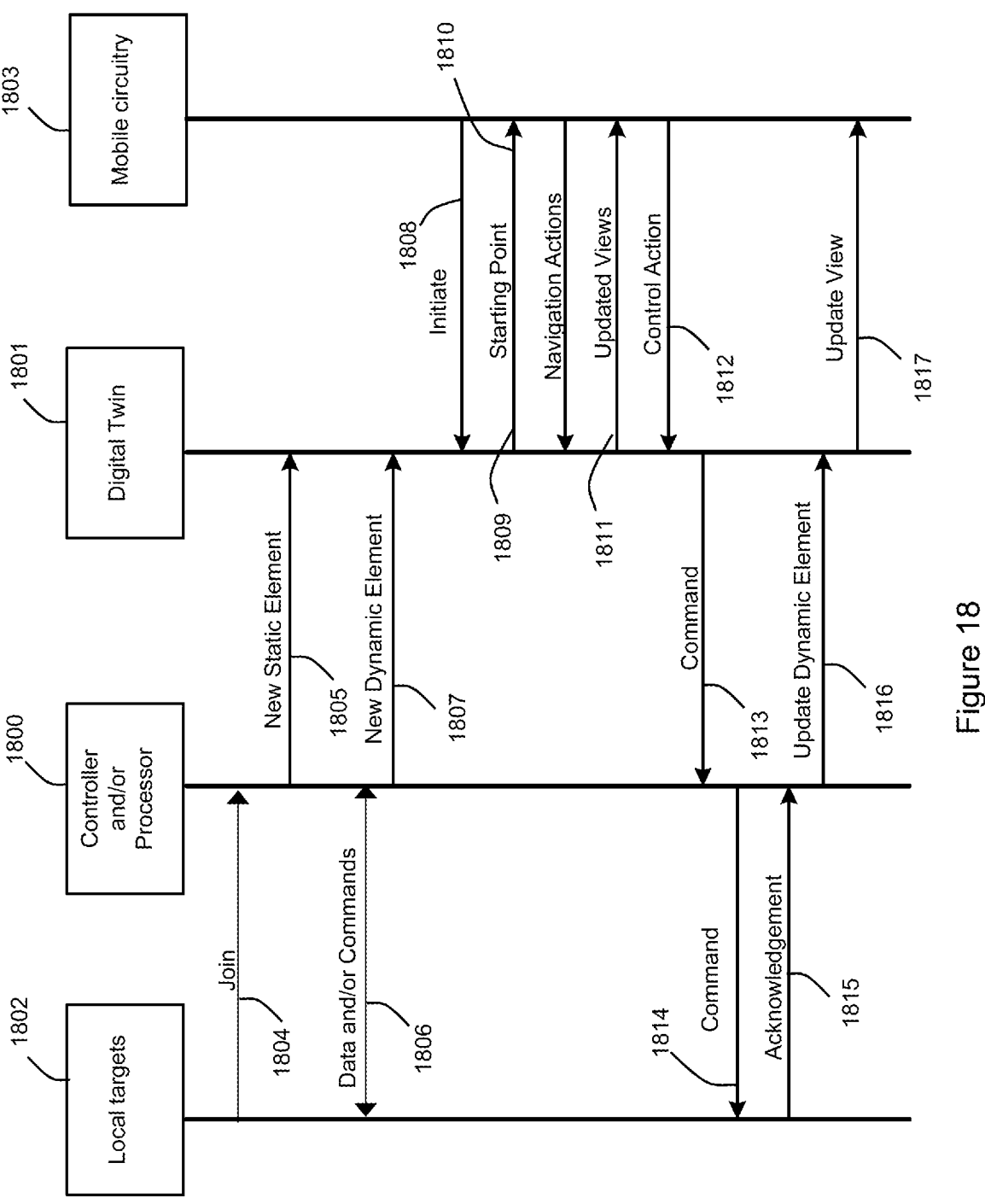
FIG. 18 is a schematic representation of a message diagram related to communications between system components.

FIG. 18 is an example messaging sequence during operation of a control system in an enclosure (e.g., a building for which a digital twin has been constructed) including a controller and/or processor 1800, one or more interactive and interconnected targets (e.g., devices) 1802. One or more new targets may join the network from time to time. For example, a new target sends a joining message 1804 to the processor and/or controller 1800 upon its interconnection. The new target may, for example, represent new static and/or dynamic elements for inclusion within the digital twin 3-D model. For example, when a new static element has been added, then a new static element message 1805 is transmitted from processor and/or controller 1800 to digital twin 1801. The processor and/or controller 1800 and targets 1802 may (e.g., continuously or intermittently) exchange data and/or command messages 1806, e.g., as part of their normal operation. In some embodiments, controller and/or processor 1800 may identify changes manifested with the exchange of data and commands and/or messages (e.g., 1806) that result in a changed system state for a dynamic element. Accordingly, processor and/or controller 1800 may send a new dynamic element message 1807 to digital twin 1801. Digital twin 1801 may then update the digital twin (e.g., 3D model of the enclosure) to reflect the new state (e.g., tint state of a window or contents of a display screen in a media presentation).

In the example of FIG. 18, network interactions completely separate from the interactions of processor and/or controller 1800 are conducted by the user (whether the user is remotely located or in the enclosure). For example, mobile circuitry (e.g., embedded in a remote controller) 1803 and digital twin 1801 exchange messages that enable a user to monitor and/or alter operation of real targets 1802, e.g., by manipulating their virtual twin elements in digital twin 1801. For example, a user may activate their mobile circuitry (e.g., a remote gaming controller such as a VR headset and handheld VR controller (e.g., a point and click button)) to cause an initiate message 1808 to be sent to digital twin 1801. In response, digital twin 1801 may send a starting point message 1809 to mobile circuitry 1803. The starting point message may include, e.g., data for displaying a simulated scene in the digital twin, e.g., according to a default starting position. For example, a virtual simulation may begin at an entrance to the enclosure, or at any other point of interest (e.g., chosen by a user).

In the example of FIG. 18, the user may invoke a gesture (e.g., movement) and/or button presses on their remote controller that includes the mobile circuitry 1803, e.g., to navigate through various locations in the 3D model. Corresponding navigation action messages 1810 may be transmitted from mobile circuitry 1803 to digital twin 1801, and data for updated views are returned from digital twin 1801 to mobile circuitry 1803 to view updated view messages 1811. Once the user approaches a requested interactive target in the simulation, the user may initiate a control action (e.g., point and click) causing a control action message 1812 to be sent to digital twin 1801.

In some embodiments, digital twin 1801 validates control actions by mapping the control action to an indicated location in the 3D model and/or checking against a list of valid actions. When a valid control action event is detected, digital twin 1801 may send a command message 1813 to processor and/or controller 1800 to identify the corresponding target and the corresponding change of state (e.g., toggling of an identified lighting circuit, or selection of a menu item in a projected display of a laptop presentation). A command message 1814 may be transmitted from processor and/or controller 1800 to the affected target 1802. After executing the command, target 1802 may send an acknowledgement message 1815 to processor and/or controller 1800. If the change is among the dynamic elements included in the digital twin, then processor and/or controller 1800 may send an update dynamic element message 1816 to digital twin 1801. If the current simulation being viewed by the user includes the dynamic element, then an update view message 1817 may be sent to remote controller 1803, e.g., to provide new data adjusted for the new dynamic state.

At time, it may be requested and/or advantageous to reduce (e.g., eliminate) direct contact between a user and a target apparatus (e.g., surface of the target apparatus). For example, reducing direct user interaction between the user and a target apparatus may reduce a risk of pathogen infection (e.g., fungi, virus, and/or bacteria), which pathogen resides in the (e.g., surface) of the device. The pathogen may be contagious and/or disease causing. The target apparatus may be an interactive target. The target apparatus may be disposed in an enclosure. The target apparatus may be a third party apparatus. The target apparatus may be a service device (e.g., a device offering service(s) to a user).

In some embodiments, the target apparatus is operatively coupled to a network. The network is operatively coupled, or includes, a control system (e.g., one or more controllers such as a hierarchal control system). In some embodiments, a mobile circuitry of a user is paired to a target apparatus (e.g., service device). The target apparatus may receive an identification tag when operatively (e.g., communicatively) coupled to the network (e.g., and to the control system). The target apparatus may be operatively coupled to a mobile circuitry through the network (e.g., using indirect coupling). The coupling between the mobile circuitry and the target apparatus may be through an application of the facility and/or of the target apparatus. There may not be a requirement for a physical proximity between the target apparatus and the mobile circuitry (e.g., and the user). The target apparatus may be selected using information related to a location of the user and/or the mobile circuitry of the user. The user may be located at a distance of at most 50 meters (m), 25 m, 10 m, 5 m, 2 m, or 1.5 m from the target apparatus. The user may be located at a distance between any of the above mentioned distances from the target apparatus (e.g., from about 50 m to about 1.5 m, from about 50 m to about 25 m, from about 25 m to about 1.5 m). The distance between the user and the target apparatus may be larger than the distance requires for pairing between devices (e.g., Bluetooth type pairing). There may be no need for any physical proximity between the user (and/or the mobile circuitry of the user), and the target apparatus (e.g., service device). The user may select the target apparatus (e.g., service device) from a list (e.g., dropdown menu). The user may be required to operatively coupled the mobile circuitry to the network to which the target apparatus is coupled. The communication between the mobile circuitry and the service device can be mono-directional (e.g., from the mobile circuitry to the target apparatus, or vice versa), or bidirectional between the target apparatus and the mobile circuitry (e.g., through the network). One user may control one or more target apparatuses (e.g., service device). One target apparatus may be controlled by one or more users. A plurality of users may send requests to one target apparatus, which requests may be placed in a que (e.g., based on a prioritization scheme such as time of receipt, urgency, and/or user seniority).

In some embodiments, the target apparatus is identified by the network upon connection to the network (which connection may be wired and/or wireless). The target apparatus may be identified via an identification code (e.g., RFID, QR-ID, barcode). In some embodiments, the identification code is not a visible (e.g., scannable) identification code. The identification code may comprise non-contact identification (e.g., electromagnetic and/or optical). The optically recognized identification may be a machine-readable code, e.g., consisting of an array of black and white squares or lines (e.g., barcode or a Quick Response (QR) code). The electromagnetic identifier may comprise radio-frequency identification (RFID). The RFID may be ultra-high frequency RFID. The identifier may comprise a transponder (e.g., RF transponder), a receiver, a transmitter, or an antenna. The identifier may be passive or active (e.g., transmit electromagnetic radiation). The identifier may comprise near field communication (NFC).

In some embodiments, a user may control the target apparatus (e.g., service device). For example, a user may control mechanical, electrical, electromechanical, and/or electromagnetic (e.g., optical and/or thermal) actions of the target apparatus. For example, the user may control a physical action of the target apparatus. For example, the user may control if the target apparatus is turned on or off, if any controllable compartment thereof is open or closed, direct directionality (e.g., left, right, up, down), enter and/or change settings, enable or deny access, transfer data to memory, reset data in the memory, upload and/or download software or executable code to the target apparatus, cause executable code to be run by a processor associated with and/or incorporated in the target apparatus, change channels, change volume, causing an action to return to a default setting and/or mode. The user may change a set-point stored in a data set associated with the target apparatus, configure or reconfigure software associated with the target apparatus. The memory can be associated with and/or be part of the target apparatus.

In some embodiments, the target apparatus is operatively (e.g., communicatively) coupled to the network (e.g., communication, power and/or control network) of the enclosure. Once the target apparatus becomes operatively coupled to the network of the enclosure, it may be part of the targets controlled via the digital twin. The new target (e.g., third party target) may offer one or more services to a user. For example, the target (e.g., target apparatus) may be a dispenser. The dispenser may dispense food, beverage, and/or equipment, upon a command. The service device may include media players (e.g., which media may include music, video, television, and/or internet), manufacturing equipment, medical device, and/or exercise equipment. The target apparatus may comprise a television, recording device (e.g., video cassette recorder (VCR), digital video recorder (DVR), or any non-volatile memory), Digital Versatile Disc or Digital Video Disc (DVD) player, digital audio file player (e.g., MP3 player), cable and/or satellite converter set-top box ("STBs"), amplifier, compact disk (CD) player, game console, home lighting, electrically controlled drapery (e.g., blinds), tintable window (e.g., electrochromic window), fan, HVAC system, thermostat, personal computer, dispenser (e.g., soap, beverage, food, or equipment dispenser), washing machine, or dryer. In some embodiments, the target apparatus excludes entertainment an entertainment device (e.g., a television, recording device (e.g., video cassette recorder (VCR), digital video recorder (DVR), or any non-volatile memory), Digital Versatile Disc or Digital Video Disc (DVD) player, digital audio file player (e.g., MP3 player), cable and/or satellite converter set-top box ("STBs"), amplifier, compact disk (CD) player, and/or game console). The command may be initiated by contacting the target, or by communicating (e.g., remotely) with the target. For example, a user may press a button on the target apparatus to dispense item(s) (e.g., food, beverage, and/or equipment). For example, a user may interact with the target apparatus through usage of the mobile circuitry. The mobile circuitry may comprise a cellular phone, a touchpad, or a laptop computer.

In some embodiments, the network may be a low latency network. The low latency network may comprise edge computing. For example, at least one (e.g., any) controller of the (e.g., hierarchal) control system can be a part of the computing system. For example, at least one (e.g., any) circuitry coupled to the network can be a part of the computing system. Latency (e.g., lag or delay) may refer to a time interval between a cause and its effect of some physical change in the system being observed. For example, latency and physically be a consequence of the limited velocity which any physical interaction can propagate. For example, latency may refer to a time interval between a stimulation and a response to the stimulus. For example, the latency may refer to a delay before a transfer of data begins following an instruction for transfer of the data. The network may comprise fiber optics. The latency may be at least about 3.33 microseconds (µs), or 5.0 µs for every kilometer of fiber optic path length. The latency of the network may be at most about 100 milliseconds (ms), 75 ms, 50 ms, 25 ms, 10 ms, 5 ms, 4 ms, 3 ms, 2 ms, 1 ms, or 0.5 ms. The latency of the network may be of any value between the aforementioned values (e.g., from about 100 ms to about 0.5 ms, from about 100 ms to about 50 ms, from about 50 ms to about 5 ms, or from about 5 ms to about 0.5 ms). The network may comprise a packet-switched network. The latency may be measured as he time from the source sending a packet to the destination receiving it (e.g., one way latency). The latency may be measured one-way latency from source to destination plus the one-way latency from the destination back to the source (e.g., round trip latency).

In some embodiments, the mobile circuitry includes an application related to the target apparatus (e.g., third party device). The application may depict one or more service options offered by the target apparatus. For example, if the target apparatus is a beverage dispenser, the application may offer a selection of the various beverage options offered by the target apparatus, that are available to the user. For example, if the target apparatus is a food dispenser, the application may offer a selection of the various food options offered by the target apparatus, that are available to the user. For example, if the target apparatus is a mask dispenser, the application may offer dispensing of one mask option that is available to the user.

In some embodiments, a user is locatable in the enclosure (e.g., facility such as a building). The user can be located using one or more sensors. The user may carry a tag. The tag may include radio frequency identification (e.g., RFID) technology (e.g., transceiver), Bluetooth technology, and/or Global Positional System (GPS) technology. The radio frequency may comprise ultrawide band radio frequency. The tag may be sensed by one or more sensors disposed in the enclosure. The sensor(s) may be disposed in a device ensemble. The device ensemble may comprise a sensor or an emitter. The sensor(s) may be operatively (e.g., communicatively) coupled to the network. The network may have low latency communication, e.g., within the enclosure. The radio waves (e.g., emitted and/or sensed by the tag) may comprise wide band, or ultra-wideband radio signals. The radio waves may comprise pulse radio waves. The radio waves may comprise radio waves utilized in communication. The radio waves may be at a medium frequency of at least about 300 kilohertz (KHz), 500 KHz, 800 KHz, 1000 KHz, 1500 KHz, 2000 KHz, or 2500 KHz. The radio waves may be at a medium frequency of at most about 500 KHz, 800 KHz, 1000 KHz, 1500 KHz, 2000 KHz, 2500 KHz, or 3000 KHz. The radio waves may be at any frequency between the aforementioned frequency ranges (e.g., from about 300 KHz to about 3000 KHz). The radio waves may be at a high frequency of at least about 3 megahertz (MHz), 5 MHz, 8 MHz, 10 MHz, 15 MHz, 20 MHz, or 25 MHz. The radio waves may be at a high frequency of at most about 5 MHz, 8 MHz, 10 MHz, 15 MHz, 20 MHz, 25 MHz, or 30 MHz. The radio waves may be at any frequency between the aforementioned frequency ranges (e.g., from about 3 MHz to about 30 MHz). The radio waves may be at a very high frequency of at least about 30 Megahertz (MHz), 50 MHz, 80 MHz, 100 MHz, 150 MHz, 200 MHz, or 250 MHz. The radio waves may be at a very high frequency of at most about 50 MHz, 80 MHz, 100 MHz, 150 MHz, 200 MHz, 250 MHz, or 300 MHz. The radio waves may be at any frequency between the aforementioned frequency ranges (e.g., from about 30 MHz to about 300 MHz). The radio waves may be at an ultra-high frequency of at least about 300 kilohertz (MHz), 500 MHz, 800 MHz, 1000 MHz, 1500 MHz, 2000 MHz, or 2500 MHz. The radio waves may be at an ultra-high frequency of at most about 500 MHz, 800 MHz, 1000 MHz, 1500 MHz, 2000 MHz, 2500 MHz, or 3000 MHz. The radio waves may be at any frequency between the aforementioned frequency ranges (e.g., from about 300 MHz to about 3000 MHz). The radio waves may be at a super high frequency of at least about 3 gigahertz (GHz), 5 GHz, 8 GHz, 10 GHz, 15 GHz, 20 GHz, or 25 GHz. The radio waves may be at a super high frequency of at most about 5 GHz, 8 GHz, 10 GHz, 15 GHz, 20 GHz, 25 GHz, or 30 GHz. The radio waves may be at any frequency between the aforementioned frequency ranges (e.g., from about 3 GHz to about 30 GHz).

In some embodiments, the identification tag of the occupant comprises a location device. The location device (also referred to herein as "locating device") may compromise a radio emitter and/or receiver (e.g., a wide band, or ultra-wide band radio emitter and/or receiver). The locating device may include a Global Positioning System (GPS) device. The locating device may include a Bluetooth device. The locating device may include a radio wave transmitter and/or receiver. The radio waves may comprise wide band, or ultra-wideband radio signals. The radio waves may comprise pulse radio waves. The radio waves may comprise radio waves utilized in communication. The radio waves may be at a medium frequency of at least about 300 kilohertz (KHz), 500 KHz, 800 KHz, 1000 KHz, 1500 KHz, 2000 KHz, or 2500 KHz. The radio waves may be at a medium frequency of at most about 500 KHz, 800 KHz, 1000 KHz, 1500 KHz, 2000 KHz, 2500 KHz, or 3000 KHz. The radio waves may be at any frequency between the aforementioned frequency ranges (e.g., from about 300 KHz to about 3000 KHz). The radio waves may be at a high frequency of at least about 3 megahertz (MHz), 5 MHz, 8 MHz, 10 MHz, 15 MHz, 20 MHz, or 25 MHz. The radio waves may be at a high frequency of at most about 5 MHz, 8 MHz, 10 MHz, 15 MHz, 20 MHz, 25 MHz, or 30 MHz. The radio waves may be at any frequency between the aforementioned frequency ranges (e.g., from about 3 MHz to about 30 MHz). The radio waves may be at a very high frequency of at least about 30 Megahertz (MHz), 50 MHz, 80 MHz, 100 MHz, 150 MHz, 200 MHz, or 250 MHz. The radio waves may be at a very high frequency of at most about 50 MHz, 80 MHz, 100 MHz, 150 MHz, 200 MHz, 250 MHz, or 300 MHz. The radio waves may be at any frequency between the aforementioned frequency ranges (e.g., from about 30 MHz to about 300 MHz). The radio waves may be at an ultra-high frequency of at least about 300 kilohertz (MHz), 500 MHz, 800 MHz, 1000 MHz, 1500 MHz, 2000 MHz, or 2500 MHz. The radio waves may be at an ultra-high frequency of at most about 500 MHz, 800 MHz, 1000 MHz, 1500 MHz, 2000 MHz, 2500 MHz, or 3000 MHz. The radio waves may be at any frequency between the aforementioned frequency ranges (e.g., from about 300 MHz to about 3000 MHz). The radio waves may be at a super high frequency of at least about 3 gigahertz (GHz), 5 GHz, 8 GHz, 10 GHz, 15 GHz, 20 GHz, or 25 GHz. The radio waves may be at a super high frequency of at most about 5 GHz, 8 GHz, 10 GHz, 15 GHz, 20 GHz, 25 GHz, or 30 GHz. The radio waves may be at any frequency between the aforementioned frequency ranges (e.g., from about 3 GHz to about 30 GHz).

In some embodiments, the locating device facilitates location within an error range. The error range of the locating device may be at most about 5 meters (m), 4 m, 3 m, 2 m, 1 m, 0.5 m, 0.4 m, 0.3 m, 0.2 m, 0.1 m, or 0.05 m. The error range of the locating device may be any value between the aforementioned values (e.g., from about 5 m to about 0.05 m, from about 5 m to about 1 m, from about 1 m to about 0.3 m, and from about 0.3 m to about 0.05 m). The error range may represent the accuracy of the locating device.

In some embodiments, a user seeks a service from a target apparatus that is a service device. The user may approach the service device, and open an application related to the facility (or services offered by and/or in the facility) on his mobile circuitry (e.g., handheld processor). The mobile circuitry may be operatively coupled (e.g., wirelessly) to the network. In parallel, and/or as a consequence to the opening of the application, the network may ascertain a location of the user. The location of the user may be ascertained via the mobile circuitry and/or via a tag carried by the user. The tag may transmit (e.g., emit) an identification of the user and/or the location of the user. The mobile circuitry can be a hand-held mobile circuitry (e.g., a cellular phone, laptop computer, tablet computer, gaming controller, virtual reality controller, or any other remote controller). The transmission may be sensed by one or more sensors disposed in the enclosure. Ascertaining a location of the user, the application may eligible targets (e.g., service devices) in a vicinity of the user. The user may select a requested target from the eligible targets presented by the application. Selection of the service device may allow opening its interface (e.g., and thus allow selection of its services). The user may select a requested service. The user selection may be transmitted to the service device through the network, and the service device may fulfil the request of the user. In this manner, the user is not required to physically contact the service device to perform service selection. The user may then retrieve the fulfilled service. Alternatively, the user may disable the location of the service, and select the service device that is remote, to fulfil a request. The user may or may not view (e.g., in the application) a digital twin of the enclosure in which the service device is disposed. The user may employ gesture control to operate the service device. For example, the user may employ his mobile circuitry to point to a service choice visible on the service device, which service choice may be translated by the control system to a choice selection.

For example, a user seeks a café late drink from an automatic coffee dispenser that can prepare espresso, macchiato, cappuccino, café late, and mocha. The user approaches the coffee dispenser and opens a facility application on his cellular phone that is coupled to the facility network. In parallel, and/or as a consequence to the opening of the application, the network can ascertain a location of the user. The location of the user may be ascertained via the cellular phone of the user and/or via an identification tag carried (e.g., ID tag) by the user (e.g., tag that allows entry to the facility). The tag may transmit (e.g., emit) the identification of the user and/or the location of the user. The transmission may be sensed by one or more sensors disposed in the facility. Ascertaining a location of the user, the application may eligible targets (e.g., service devices) in a vicinity of the user. The user may select the coffee dispenser from the eligible targets presented by the application. In one option, selection of the coffee dispenser may allow opening an interface to allow selection between espresso, macchiato, cappuccino, café late, and mocha drinks. The user may select a café late. The user selection may be transmitted to the coffee dispenser through the network, and the coffee dispenser may fulfil the café late drink request of the user. In this manner, the user is not required to physically contact the coffee dispenser to perform service selection of the café late drink. The user may then retrieve the café late drink without contacting the coffee dispenser. In another option, selection of the coffee dispenser may allow viewing the room in which the coffee dispenser is located as a digital twin. The user may point the cellular device at a coffee drink option shown on the coffee dispenser. This gesture may be transmitted to the control system via the network and translated by the control system to a choice selection. The user selection may be transmitted to the coffee dispenser through the network, and the coffee dispenser may fulfil the café late drink request of the user. In this manner, the user is not required to physically contact the coffee dispenser to perform service selection of the café late drink. The user may then retrieve the café late drink without contacting the coffee dispenser.

In some examples, there are various target apparatuses (e.g., machines) of the same type in a facility. For example, several printers, several coffee machines, or several food dispensers. A user may send a request to a target apparatus type. The specific target apparatus of that type executing the request may be the one closest to the user. The location of the user may be ascertain via the network (e.g., using facial recognition and/or ID tag). The control system may use the location of the user to identify a specific target apparatus of the requested type for executing the requested task. A user may override such recommendation of the control system. A user may request a specific target apparatus to execute the task. Certain target apparatuses may be dedicate to certain groups of user (e.g., departments). There may be a hierarchy in the permission provided to users to use the service apparatuses. The hierarchy may depend on the location, rank, department, of the user. The hierarchy may depend on the date and time at which the request is made, and/or requested execution time of the request. The groups of users may be identified by the control system. The group of users may be identified according to their activities at work and/or outside of work. Members of the group may be informed of other group members and/or of existence of the group. At times, certain functions may be informed of the group and/or its members (e.g., human resources, management, and/or facilities). For example, in case of a fire in the facility, a group of firefighters in the facility may be informed. For example, in case of an emergency in the facility, a group of medical professionals in the facility may be informed.

In some embodiments, the user toggles between gesture control mode and tap control mode. In the gesture control mode, the user can utilize the mobile circuitry to point the mobile circuitry at the target apparatus in space. In the tap control mode, the user is not required to point the mobile circuitry at the target apparatus in space, but select options related on the target apparatus, which options appear on the mobile circuitry for selection (e.g., via a dropdown menu). The selection between options presented on the mobile circuitry can be by using a touchscreen of the mobile circuitry, and/or scrolling through the options such as by using scroll functionality implemented in the mobile circuitry (e.g., represented by arrows).

In some embodiments, the interactive target is operatively coupled to the network via a computing interface. The computing interface may comprise an application programming interface (API). The countering interface may define interactions between multiple software and/or hardware intermediaries. The computing interface may identify requests that can be made, how to make those requests, the data formats that should be used, and/or any particular conventions to follow. The computing interface may provide extension mechanisms to allow a user extension of existing functionality. For example, an API can be specific to a target, or it can be designed using an industry standard (e.g., to ensure interoperability). When a user requests a service (e.g., via the computing interface) from a service device via the mobile circuitry and/or via gesture control, the message is sent to the server (e.g., as part of the control system), the service device may be informed, and may pick the request from a server queue, process the service request, and deploys (e.g., provides) the service to be picked by the user. Examples of communication interface, messaging, and control can be found in U.S. provisional patent application Ser. No. 63/000,342 filed on Mar. 26, 2020, titled "MESSAGING IN A MULTI CLIENT NETWORK," which is incorporated herein by reference in its entirety.

Figure 19:
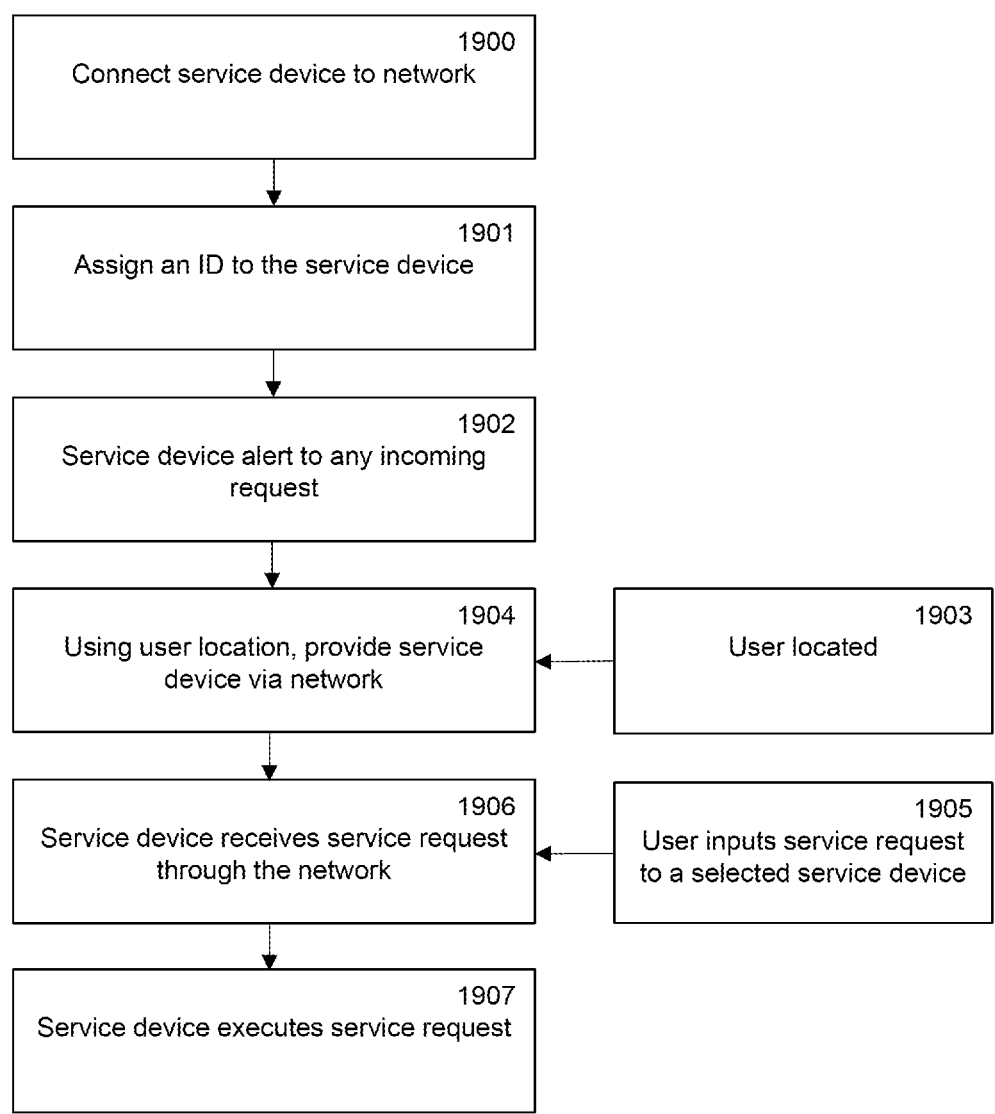
FIG. 19 is a flowchart for a control method.

FIG. 19 shows an example method corresponding to the embodiment of FIG. 19, in which a service device (e.g., third party device) is connected to the network of the facility in operation 1900, the service device is provided an identification in 1901, the service device stays alert to any incoming request (e.g., checks the network for any incoming request) in operation 1902. A location of a user disposed in the enclosure is identified in operation 1903. Once a user opens the facility application, a user is provided with service devices in the vicinity of the user in operation 1904. The user may select a service device, and therein a service provided by the service device in operation 1905. The selection of the service may be through an application menu, or through gesture control. The selection of the service is transmitted to the selected service device in operation 1906 through the network, the service device then executes the request in operation 1907.

Figure 20:
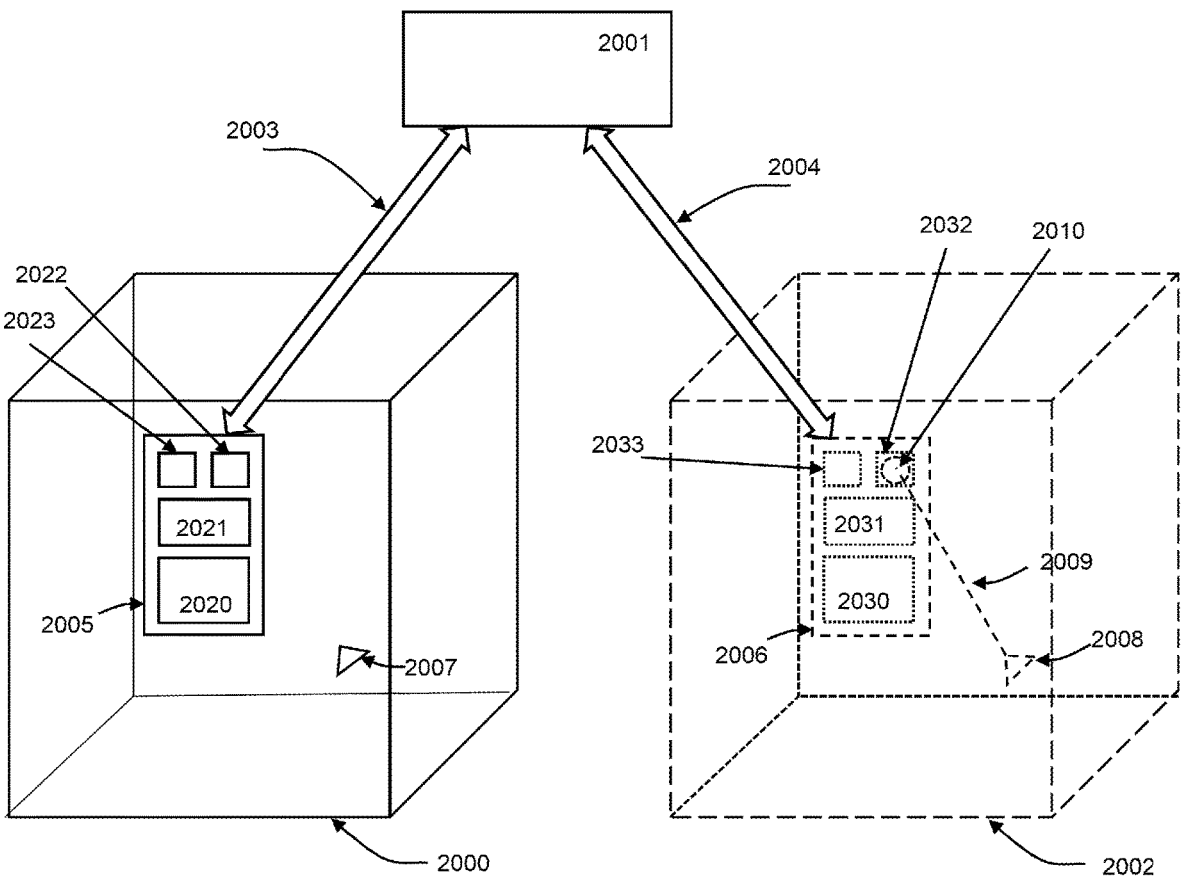
FIG. 20 depicts an enclosure communicatively coupled to its digital twin representation.

FIG. 20 shows an example embodiment of a control system in which a real, physical enclosure (e.g., room) 2000 includes a controller network for managing interactive network devices under control of a processor 2001 (e.g., a master controller). The structure and contents of building 2000 are represented in a 3-D model digital twin 2002 as part of a modeling and/or simulation system executed in a computing asset. The computing asset may be co-located with or remote from enclosure 2000 and processor 2001. A network link 2003 in enclosure 2000 connects processor 2001 with a plurality of network nodes including an interactive target 2005 that is a real service device having various service options 2022, 2023, and 2021, and service fulfilment compartment 2020. Service device 2005 is represented as a virtual object 2006 (e.g., a virtual service device) within digital twin 2002. A network link 2004 connects processor 2001 with digital twin 2002.

In the example of FIG. 20, a user located in enclosure 2000 carries a handheld control 2007 having a pointing capability (e.g., to couple with the target 2005). The location of handheld control 2007 may be tracked, for example, via a network link with digital twin 2002 (not shown). The link may include some transport media contained within network 2003. Handheld controller 2007 is represented as a virtual handheld controller 2008 within digital twin 2002. Based at least in part on the tracked location and pointing capability of handheld controller 2007, when the user initiates a pointing event (e.g., aiming at a particular target 2022, 2023, or 2021 and pressing an action button on the handheld controller) it is transmitted to digital twin 2002. Accordingly, digital twin 2002 with the target (e.g., represented as a digital ray 2009 from the tracked location within digital twin 2002). Digital ray 2009 intersects with virtual service device 2006 at a point of intersection 2010 in virtual service option 2032 provided by the virtual service device 2006. A resulting interpretation of actions made by the user in the digital twin 2002 is reported by digital twin 2002 to processor 2001 via network link 2004. In response, processor 2001 relays a control message to interactive device 2005 to initiate a commanded action in in accordance with a gesture (or other input action) made by the user. The real service device 2005 is analogous to the virtual service device 2006. The real service options 2021-2023 are analogous to virtual service options 2031-2033. The real dispensing compartment 2020 is analogous to the virtual dispensing compartment 2030.

In some embodiments, target apparatus(es) (e.g., service device(s)) can be discovered within a range from a user (e.g., using the network and the control system). In some embodiments, target apparatus(es) (e.g., service device(s)) can be discovered within a range from a target apparatus. The user range and the apparatus range can intersect. The range can be referred to herein as a "discovery range," for example, a service apparatus discovery range. A target apparatus can be discovered by a user when the target apparatus discovery range intersects with the user discovery range. For example, a target apparatus can be discovered by a user when the user is in the target apparatus discovery range. The discovery can be using the network. The discovery can be displayed in a mobile circuitry (e.g., cellular phone) of the user. The range can be specific to a target apparatus, target apparatus type, or a set of target apparatus types. For example, a first range can be for manufacturing machines, a second range can be for media displays, and a third range can be for food service machines. The range can be specific to an enclosure, or to a portion of the enclosure. For example, a first discovery range can be for a lobby, a second discovery range can be for a cafeteria, and a third discovery range can be for an office or for a group of offices. The range can be fixed or adjustable (e.g., by a user, a manager, a facility owner, and/or a lessor). A first target apparatus type may have a different discovery range from a second target apparatus type. For example, a larger control range can be assigned for light switches, and shorter for beverage service devices. The larger control range can be of at most about 1 meter (m), 2 m, 3 m, or 5 m. The shorter control range can be of at most about 0.2 m, 0.3 m, 0.4 m, 0.5 m, 0.6 m, 0.7 m, 0.8 m, or 0.9 m. A user may detect (e.g., visually and/or using a list) devices within relevant use range of the user. Visually may comprise using icons, drawings, and/or a digital twin of the enclosure (e.g., as disclosed herein). Usage of discovery ranges may facilitate focusing (e.g., shortening) a list of target apparatuses relevant for the user to control, e.g., and prevent the user from having to select from a long list of (e.g., largely irrelevant) target apparatuses (e.g., service devices). Controlling the range can be using a position of the user (e.g., using a geolocation device such as one comprising UWB technology), and target apparatus paring (e.g., Wi-Fi pairing) to the network. The range of discovery be unconstrained by a rage dictated by direct device-user paring technology (e.g., Bluetooth pairing range). For example, when the user is located far from the target apparatus, the user may be able to couple with the target apparatus even if the device is out of the direct device-user paring technology range (e.g., user range). The third party target apparatus selected by the user may or may not incorporate a technology for direct device-user pairing technology.

In some embodiments, pulse-based ultra-wideband (UWB) technology (e.g., ECMA-368, or ECMA-369) is a wireless technology for transmitting large amounts of data at low power (e.g., less than about 1 millivolt (mW), 0.75 mW, 0.5 mW, or 0.25 mW) over short distances (e.g., of at most about 300 feet ('), 250', 230', 200', or 150'). A UWB signal can occupy at least about 750 MHz, 500 MHz, or 250 MHz of bandwidth spectrum, and/or at least about 30%, 20%, or 10% of its center frequency. The UWB signal can be transmitted by one or more pulses. A component broadcasts digital signal pulses may be timed (e.g., precisely) on a carrier signal across a number of frequency channels at the same time. Information may be transmitted, e.g., by modulating the timing and/or positioning of the signal (e.g., the pulses). Signal information may be transmitted by encoding the polarity of the signal (e.g., pulse), its amplitude and/or by using orthogonal signals (e.g., pulses). The UWB signal may be a low power information transfer protocol. The UWB technology may be utilized for (e.g., indoor) location applications. The broad range of the UWB spectrum comprises low frequencies having long wavelengths, which allows UWB signals to penetrate a variety of materials, including various building fixtures (e.g., walls). The wide range of frequencies, e.g., including the low penetrating frequencies, may decrease the chance of multipath propagation errors (without wishing to be bound to theory, as some wavelengths may have a line-of-sight trajectory). UWB communication signals (e.g., pulses) may be short (e.g., of at most about 70 cm, 60 cm, or 50 cm for a pulse that is about 600 MHz, 500 MHz, or 400 MHz wide; or of at most about 20 cm, 23 cm, 25 cm, or 30 cm for a pulse that is has a bandwidth of about 1 GHz, 1.2 GHz, 1.3 GHz, or 1.5 GHz). The short communication signals (e.g., pulses) may reduce the chance that reflecting signals (e.g., pulses) will overlap with the original signal (e.g., pulse).

In some embodiments, an identification (ID) tag of a user can include a micro-chip. The micro-chip can be a micro-location chip. The micro-chip can incorporate auto-location technology (referred to herein also as "micro-location chip"). The micro-chip may incorporate technology for automatically reporting high-resolution and/or high accuracy location information. The auto-location technology can comprise GPS, Bluetooth, or radio-wave technology. The auto-location technology can comprise electromagnetic wave (e.g., radio wave) emission and/or detection. The radio-wave technology may be any RF technology disclosed herein (e.g., high frequency, ultra-high frequency, super high frequency. The radio-wave technology may comprise UWB technology. The micro-chip may facilitate determination of its location within an accuracy of at most about 25 centimeters, 20 cm, 15 cm, 10 cm, or 5 cm. In various embodiments, the control system, sensors, and/or antennas are configured to communicate with the micro-location chip. In some embodiments, the ID tag may comprise the micro-location chip. The micro-location chip may be configured to broadcast one or more signals. The signals may be omnidirectional signals. One or more component operatively coupled to the network may (e.g., each) comprise the micro-location chip. The micro-location chips (e.g., that are disposed in stationary and/or known locations) may serve as anchors. By analyzing the time taken for a broadcast signal to reach the anchors within the transmittable distance of the ID-tag, the location of the ID tag may be determined. One or more processors (e.g., of the control system) may perform an analysis of the location related signals. For example, the relative distance between the micro-chip and one or more anchors and/or other micro-chip(s) (e.g., within the transmission range limits) may be determined. The relative distance, know location, and/or anchor information may be aggregated. At least one of the anchors may be disposed in a floor, ceiling, wall, and/or mullion of a building. There may be at least 1, 2, 3, 4, 5, 8, or 10 anchors disposed in the enclosure (e.g., in the room, in the building, and/or in the facility). At least two of the anchors may have at least of (e.g., substantially) the same X coordinate, Y coordinate, and Z coordinate (of a Cartesian coordinate system).

In some embodiments, a window control system enables locating and/or tracking one or more devices (e.g., comprising auto-location technology such as the micro location chip) and/or at least one user carrying such device. The relative location between two or more such devices can be determined from information relating to received transmissions, e.g., at one or more antennas and/or sensors. The location of the device may comprise geo-positioning and/or geolocation. The location of the device may an analysis of electromagnetic signals emitted from the device and/or the micro-location chip. Information that can be used to determine location includes, e.g., the received signal strength, the time of arrival, the signal frequency, and/or the angle of arrival. When determining a location of the one or more components from these metrics, a localization (e.g., using trilateration such as triangulation) module may be implemented. The localization module may comprise a calculation and/or algorithm. The auto-location may comprise geolocation and/or geo-positioning. Examples of location methods may be found in PCT Patent Application serial number PCT/US17/31106 filed on May 4, 2017 titled "WINDOW ANTENNAS," which is incorporated herein by reference in its entirety.

In some embodiments, the position of the user may be located using one or more positional sensors. The positional sensor(s) may be disposed in the enclosure (e.g., facility, building, or room). The positional sensor may be part of a sensor ensemble or separated from a sensor ensemble (e.g., standalone positional sensor). The positional sensor may be operatively (e.g., communicatively) coupled to a network. The network may be a network of the facility (e.g., of the building). The network may be configured to transmit communication and power. The network may be any network disclosed herein. The network may extend to a room, a floor, several rooms, several floors, the building, or several buildings of the facility. The network may operatively (e.g., to facilitate power and/or communication) couple to a control system (e.g., as disclosed herein), to sensor(s), emitter(s), antenna, router(s), power supply, building management system (and/or its components). The network may be coupled to personal computers of users (e.g., occupants) associated with the facility (e.g., employees and/or tenants). At least part of the network may be installed as the initial network of the facility, and/or disposed in an envelope structure of the facility. The users may or may not be present in the facility. The personal computers of the users may be disposed remote from the facility. The network may be operatively coupled to other devices in the facility that perform operations for, or associated with, the facility (e.g., production machinery, communication machinery, and/or service machinery). The production machinery may include computers, factory related machinery, and/or any other machinery configured to produce product(s) (e.g., printers and/or dispensers). The service machinery may include food and/or beverage related machinery, hygiene related machinery (e.g., mask dispenser, and/or disinfectant dispensers). The communication machinery may include media projectors, media display, touch screens, speakers, and/or lighting (e.g., entry, exit, and/or security lighting).

In some embodiments, at least one device ensemble includes at least one processor and/or memory. The processor may perform computing tasks (e.g., including machine learning and/or artificial intelligence related tasks). In this manner the network can allow low latency (e.g., as disclosed herein) and faster response time for applications and/or commands. In some embodiments, the network and circuitry coupled thereto may form a distributed computing environment (e.g., comprising CPU, memory, and storage) for application and/or service hosting to store and/or process content close to the user's mobile circuitry (e.g., cellular device, pad, or laptop).

In some embodiments, the network is coupled to device ensemble(s). The device ensemble may perform (e.g., in real time) sensing and/or tracking of occupants in an enclosure in which the device ensemble is disposed (e.g., in situ), e.g., (i) to enable seamless connectivity of the user's mobile circuitry to the network and/or adjustment of network coupled machinery to requirements and/or preferences of the user, (ii) to identify the user (e.g., using facial recognition, speech recognition, and/or identification tag), and/or (iii) to cater the environment of the enclosure according to any preferences of the user. For example, when a meeting organizer enters into an allocated meeting room, the organizer may be recognized by one or more sensors (e.g., using facial recognition and/or ID tag), presentation of the organizer may appear on screens of the meeting room and/or of screens of processors of the invitees. The screen may be controlled (e.g., remotely by the organizer or invitees, e.g., as disclosed herein). The invitees can be in the meeting room, or remote. The organizer can connect to an assistant via the network. The assistant can be real or virtual (e.g., digital office assistant). The organizer can place one or more requests to the assistant, which requests may be satisfied by the assistant. The requests may require communication and/or control using the network. For example, the request may be retrieval of a file and/or file manipulation (e.g., during the meeting). The request may be altering a function controlled by the control system (e.g., dim the lights, cool the room environment, sound an alarm, shut doors of the facility, and/or halt operation of a factory machinery). The assistant (e.g., digital assistant) may take notes during the meeting (e.g., using speech recognition), schedule meetings, and/or update files. The assistant may analyze (e.g., read) emails and/or replies to them. An occupant may interact with the assistant in a contactless (e.g., remote) manner, e.g., using gesture and/or voice interactions (e.g., as disclosed herein).

Figure 24:
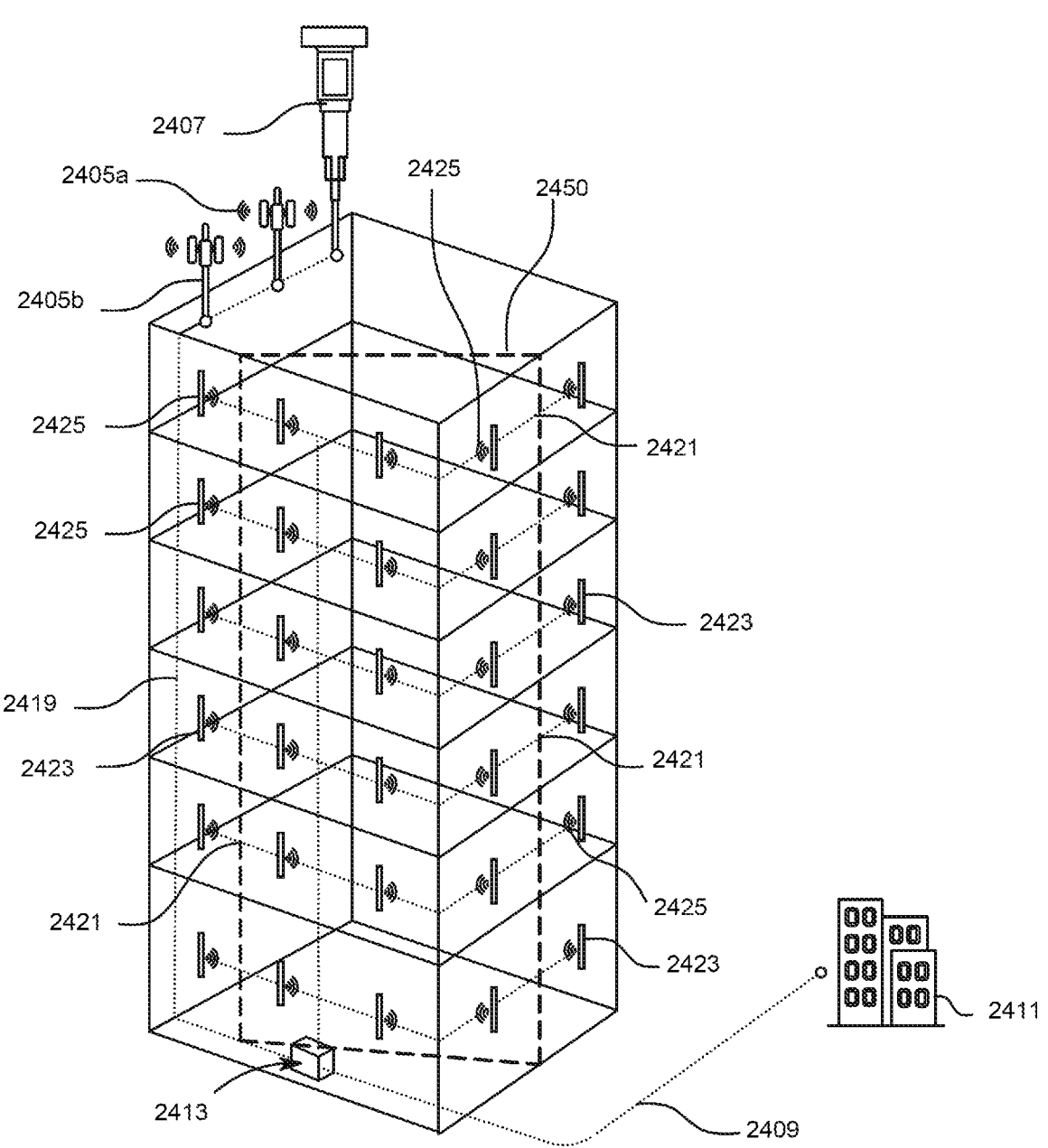
FIG. 24 schematically shows a building and a network.

FIG. 24 shows an example of a building with device ensembles (e.g., assemblies, also referred to herein as "digital architectural elements"). As points of connection, the building can include multiple rooftop donor antennas 2405, 2405b as well as a sky sensor 2407 for sending electromagnetic radiation (e.g., infrared, ultraviolet, radio frequency, and/or visible light). These wireless signals may allow a building services network to wirelessly interface with one or more communications service provider systems. The building has a control panel 2413 for connecting to a provider's central office 2411 via a physical line 2409 (e.g., an optical fiber such as a single mode optical fiber). The control panel 2413 may include hardware and/or software configured to provide functions of, for example, a signal source carrier head end, a fiber distribution headend, and/or a (e.g., bidirectional) amplifier or repeater. The rooftop donor antennas 2405a and 2405b can allow building occupants and/or devices to access a wireless system communications service of a (e.g., 3$^{rd}$ party) provider. The antenna and/or controller(s) may provide access to the same service provider system, a different service provider system, or some variation such as two interface elements providing access to a system of a first service provider, and a different interface element providing access to a system of a second service provider.

As shown in the example of FIG. 24, a vertical data plane may include a (e.g., high capacity, or high-speed) data carrying line 2419 such as (e.g., single mode) optical fiber or UTP copper lines (of sufficient gauge). In some embodiments, at least one control panel could be provided on at least part of the floors of the building (e.g., on each floor). In some embodiments, one (e.g., high capacity) communication line can directly connect a control panel in the top floor with (e.g., main) control panel 2413 in the bottom floor (or in the basement floor). Note that in the example shown in FIG. 24, control panel 2417 directly connects to rooftop antennas 2405a, 2405b and/or sky sensor 2407, while control panel 2413 directly connects to the (e.g., 3$^{rd}$ party) service provider central office 2411.

FIG. 24 shows an example of a horizontal data plane that may include one or more of the control panels and data carrying wiring (e.g., lines), which include trunk lines 2421. In certain embodiments, the trunk lines comprise (e.g., are made from) coaxial cable. The trunk lines may comprise any wiring disclosed herein. The control panels may be configured to provide data on the trunk lines 2421 via a data communication protocol (such as MoCA and/or d.hn). The data communication protocol may comprise (i) a next generation home networking protocol (abbreviated herein as "G.hn" protocol), (ii) communications technology that transmits digital information over power lines that traditionally used to (e.g., only) deliver electrical power, or (iii) hardware devices designed for communication and transfer of data (e.g., Ethernet, USB and Wi-Fi) through electrical wiring of a building. The data transfer protocols may facilitate data transmission rates of at least about 1 Gigabits per second (Gbit/s), 2 Gbit/s, 3 Gbit/s, 4 Gbit/s, or 5 Gbit/s. The data transfer protocol may operate over telephone wiring, coaxial cables, power lines, and/or (e.g., plastic) optical fibers. The data transfer protocol may be facilitated using a chip (e.g., comprising a semiconductor device). At least one (e.g., each) horizontal data plane may provide high speed network access to one or more device ensembles such as 2423 (e.g., a set of one or more devices in a housing comprising an assembly of devices) and/or antennas (e.g., 2425), some or all of which are optionally integrated with device ensembles. The antennas (and associated radios, not shown) may be configured to provide wireless access by any of various protocols, including, e.g., cellular (e.g., one or more frequency bands at or proximate 28 GHz), Wi-Fi (e.g., one or more frequency bands at 2.4, 5, and 60 GHz), CBRS, and the like. Drop lines may connect device ensembles (e.g., 2423) to trunk lines (e.g., 2421). In some embodiments, a horizontal data plane is deployed on a floor of a building. The devices in the device ensemble may comprise a sensor, emitter, or antenna. The device ensemble may comprise circuitry. The devices in the device ensemble may be operatively coupled to the circuitry. The circuitry may comprise a processor. The circuitry may be operatively coupled to memory and/or communication hub (e.g., ethernet and/or cellular communication). One or more donor antennas (e.g., 2405a, 2405b) may connect to the control panel (e.g., 2413) via high speed lines (e.g., single mode optical fiber or copper). In the depicted example of FIG. 24, the control panel 2413 is located in a lower floor of the building. The connection to the donor antenna(s) may be via one or more vRAN radios and wiring (e.g., coaxial cable).

In the example shown in FIG. 24, the communications service provider central office 2411 connects to ground floor control panel 2413 via a high speed line 2409 (e.g., an optical fiber serving as part of a backhaul). This entry point of the service provider to the building is sometimes referred to as a Main Point of Entry (MPOE), and it may be configured to permit the building to distribute both voice and data traffic.

In some cases, a small cell system is made available to a building, at least in part, via one or more antennas. Examples of antennas, sky sensor, and control systems can be found in U.S. patent application Ser. No. 15/287,646, filed Oct. 6, 2016, which is incorporated herein by reference in its entirety.

In some embodiments, the target apparatus is operatively coupled to the network. The network may be operatively (e.g., communicatively) coupled to one or more controllers. The network may be operatively (e.g., communicatively) coupled to one or more processors. Coupling of the target apparatus to the network may allow contactless communication of a user with the target apparatus using a mobile circuitry of the user (e.g., through a software application installed on the mobile circuitry). In this manner, a user need not directly communicatively couple and decouple from the service device (e.g., using Bluetooth technology). By coupling the target apparatus to the network to which the user is communicatively coupled (e.g., through the mobile circuitry of the user), a user may be communicatively couple to a plurality of target apparatuses simultaneously (e.g., concurrently). The user may control at least two of the plurality of target apparatuses sequentially. The user may control at least two of the plurality of target apparatuses simultaneously (e.g., concurrently). For example, a user may have two applications of two different target apparatuses open (e.g., and running) on his mobile circuitry, e.g., available for control (e.g., manipulation).

In some example, the discovery of target apparatus by a user is not restricted by a range. The discovery of target apparatus by a user can be restricted by at least one security protocol (e.g., dangerous manufacturing machinery may be available only to permitted manufacturing personnel). The security protocol can have one or more security levels. The discovery of target apparatus by a user can be restricted by apparatuses in a room, floor, building, or facility in which the user is located. The user may override at least one (e.g., any) range restriction and select the target apparatus from all available target apparatuses.

In some embodiments, the target apparatus is communicatively coupled to the network. The target device may utilize a network authentication protocol. The network authentication protocol may open one or more ports for network access. The port(s) may be opened when an organization and/or a facility authenticates (e.g., through network authentication) an identity of a target apparatus that attempts to operatively couple (and/or physically couples) to the network. Operative coupling may comprise communicatively coupling. The organization and/or facility may authorize (e.g., using the network) access of the target apparatus to the network. The access may or may not be restricted. The restriction may comprise one or more security levels. The identity of the target apparatus can be determined based on the credentials and/or certificate. The credentials and/or certificate may be confirmed by the network (e.g., by a server operatively coupled to the network). The authentication protocol may or may not be specific for physical communication (e.g., Ethernet communication) in a local area network (LAN), e.g., that utilizes packets. The standard may be maintained by the Institute of Electrical and Electronics Engineers (IEEE). The standard may specify the physical media (e.g., target apparatus) and/or the working characteristics of the network (e.g., Ethernet). The networking standard may support virtual LANs (VLANs) on a local area (e.g., Ethernet) network. The standard may support power over local area network (e.g., Ethernet). The network may provide communication over power line (e.g., coaxial cable). The power may be direct current (DC) power. The power may be at least about 12 Watts (W), 15 W, 25 W, 30 W, 40 W, 48 W, 50 W, or 100 W. The standard may facilitate mesh networking. The standard may facilitate a local area network (LAN) technology and/or wide area network (WAN) applications. The standard may facilitate physical connections between target apparatuses and/or infrastructure devices (hubs, switches, routers) by various types of cables (e.g., coaxial, twisted wires, copper cables, and/or fiber cables). Examples of network authentication protocols can be 802.1X, or KERBEROS. The network authentication protocol may comprise secret-key cryptography. The network can support (e.g., communication) protocols comprising 802.3, 802.3af (PoE), 802.3at (PoE+), 802.1Q, or 802.11s. The network may support a communication protocol for Building Automation and Control (BAC) networks (e.g., BACnet). The protocol may define service(s) used to communicate between building devices. The protocol services may include device and object discovery (e.g., Who-Is, I-Am, Who-Has, and/or I-Have). The protocol services may include Read-Property and Write-Property (e.g., for data sharing). The network protocol may define object types (e.g., that are acted upon by the services). The protocol may define one or more data links/physical layers (e.g., ARC-NET, Ethernet, BACnet/IP, BACnet/IPv6, BACnet/MSTP, Point-To-Point over RS-232, Master-Slave/Token-Passing over RS-485, ZigBee, and/or LonTalk). The protocol may be dedicated to devices (e.g., Internet of Things (IoT) devices and/or machine to machine (M2M) communication). The protocol may be a messaging protocol. The protocol may be a publish—subscribe protocol. The protocol may be configured for messaging transport. The protocol may be configured for remote devices. The protocol may be configured for devices having a small code footprint and/or minimal network bandwidth. The small code footprint may be configured to be handled by microcontrollers. The protocol may have a plurality of quality of service levels including (i) at most once, (ii) at least once, and/or (iii) exactly once. The plurality of quality of service levels may increase reliability of the message delivery in the network (e.g., to its target). The protocol may facilitate messaging (i) between device to cloud and/or (ii) between cloud to device. The messaging protocol is configured for broadcasting messages to groups of targets such as target apparatuses (e.g., devices), sensors, and/or emitters. The protocol may comply with Organization for the Advancement of Structured Information Standards (OASIS). The protocol may support security schemes such as authentication (e.g., using tokens). The protocol may support access delegation standard (e.g., OAuth). The protocol may support granting a first application (and/or website) access to information on a second application (and/or website) without providing the second with a security code (e.g., token and/or password) relating to the first application. The protocol may be a Message Queuing Telemetry Transport (MQTT) or Advanced Message Queuing Protocol (AMQP) protocol. The protocol may be configured for a message rate of at least one (1) message per second per publisher. The protocol may be configured to facilitate a message payload size of at most 64, 86, 96, or 128 bytes. The protocol may be configured to communicate with any device (e.g., from a microcontroller to a server) that operates a protocol compliant (e.g., MQTT) library and/or connects to compliant broker (e.g., MQTT broker) over a network. Each device (e.g., target apparatus, sensor, or emitter) can be a publisher and/or a subscriber. A broker can handle millions of concurrently connected devices, or less than millions. The broker can handle at least about 100, 10000, 100000, 1000000, or 10000000 concurrently connected devices. In some embodiments, the broker is responsible for receiving (e.g., all) messages, filtering the messages, determining who is interested in each message, and/or sending the message to these subscribed device (e.g., broker client). The protocol may require internet connectivity to the network. The protocol may facilitate bi-directional, and/or synchronous peer-to-peer messaging. The protocol may be a binary wire protocol. Examples of such network protocol, control system, and network can be found in U.S. provisional patent application Ser. No. 63/000,342 filed Mar. 26, 2020 titled "MESSAGING IN A MULTI CLIENT NETWORK," which is incorporated herein by reference in its entirety.

Examples of network security, communication standards, communication interface, messaging, coupling of devices to the network, and control can be found in U.S. provisional patent application Ser. No. 63/000,342, and in PCT patent application serial number PCT/US20/70123 filed Jun. 4, 2020, titled "SECURE BUILDING SERVICES NETWORK," each of which is incorporated herein by reference in its entirety.

In some embodiments, the network allows a target apparatus to couple to the network. The network (e.g., using controller(s) and/or processor(s)) may let the target apparatus join the network, authenticate the target apparatus, monitor activity on the network (e.g., activity relating to the target apparatus), facilitate performance of maintenance and/or diagnostics, and secure the data communicated over the network. The security levels may allow bidirectional or monodirectional communication between a user and a target apparatus. For example, the network may allow only monodirectional communication of the user to the target apparatus. For example, the network may restrict availability of data communicated through the network and/or coupled to the network, from being accessed by a third party owner of a target apparatus (e.g., service device). For example, the network may restrict availability of data communicated through the network and/or coupled to the network, from being accessed by the organization and/or facility into data relating to a third party owner and/or manufacturer of a target apparatus (e.g., service device).

In some embodiments, the control system is operatively coupled to a learning module. The learning module may utilize a learning scheme, e.g., comprising artificial intelligence. The learning module may be learn preference of one or more users associated with the facility. Users associated with the facility may include occupants of the facility and/or users associated with an entity residing and/or owning the facility (e.g., employees of a company residing in the facility). The learning modules may analyze preference of a user or a group of users. The learning module may gather preferences of the user(s) as to one or more environmental characteristic. The learning module may use past preference of the user as a learning set for the user or for the group to which the user belongs. The preferences may include environmental preference or preferences related to a target apparatus (e.g., service machine, and/or production machine).

In some embodiments, a control system conditions various aspects of an enclosure. For example, the control system may condition an environment of the enclosure. The control system may project future environmental preferences of the user, and condition the environment to these preferences in advance (e.g., at a future time). The preferential environmental characteristic(s) may be allocated according to (i) user or group of users, (ii) time, (iii) date, and/or (iv) space. The data preferences may comprise seasonal preferences. The environmental characteristics may comprise lighting, ventilation speed, atmospheric pressure, smell, temperature, humidity, carbon dioxide, oxygen, VOC(s), particulate matter (e.g., dust), or color. The environmental characteristics may be a preferred color scheme or theme of an enclosure. For example, at least a portion of the enclosure can be projected with a preferred theme (e.g., projected color, picture or video). For example, a user is a heart patient and prefers (e.g., requires) an oxygen level above the ambient oxygen level (e.g., 20% oxygen) and/or a certain humidity level (e.g., 70%). The control system may condition the atmosphere of the environment for that oxygen and humidity level when the heart patient occupant is in a certain enclosure (e.g., by controlling the BMS).

In some embodiments, a control system may operate a target apparatus according to preference of a user or a group of users. The preferences may be according to past behavior of the user(s) in relation to the target apparatus (e.g., settings, service selection, timing related selections, and/or location related selections). For example, a user may refer coffee late with 1 teaspoon of sugar at 9 am from the coffee machine near his desk at a first location. The coffee machine at the first location may automatically generate a cup of such coffee at 9 am in the first location. For example, a user group such as a work-team prefers to enter a conference room having a forest background, with a light breeze at 22° C. The control system may control project the forest background (e.g., on a wall and/or on a media screen), adjust the ventilation system to have a light breeze, and adjust the HVAC system for 22° C. in every conference room when this group is holding a meeting. The control system may facilitate such control by controlling the HVAC system, projector, and/or media display.

In some embodiments, the control system may adjust the environment and/or target apparatus according to hierarchical preferences. When several different users (e.g., of different groups) are gathered in an enclosure, which users have conflicting preferences, the control system may adjust the environment and/or target apparatus according to a pre-established hierarchy. The hierarchy may comprise jurisdictional (e.g., health and/or safety) standards, health, safety, employee rank, activity taking place in the enclosure, number of occupants in the enclosure, enclosure type, time of day, date, season, and/or activity in the facility.

In some embodiments, the control system considers results (e.g., scientific and/or research based results) regarding environmental conditions that affect health, safety and/or performance of enclosure occupants. The control system may establish thresholds and/or preferred window-ranges for one or more environmental characteristic of the enclosure (e.g., of an atmosphere of the enclosure). The threshold may comprise a level of atmospheric component (e.g., VOC and/or gas), temperature, and time at a certain level. The certain level may be abnormally high, abnormally low, or average. For example, the controller may allow short instances of abnormally high VOC level, but not prolonged time with that VOC level. The control system may automatically override preference of a user if it contradicts health and/or safety thresholds. Health and/or safety thresholds may be at a higher hierarchical level relative to a user's preference. The hierarchy may utilize majority preferences. For example, if two occupants of a meeting room have one preference, and the third occupant has a conflicting preference, then the preferences of the two occupants will prevail (e.g., unless they conflict health and/or safety considerations).

Figure 25:
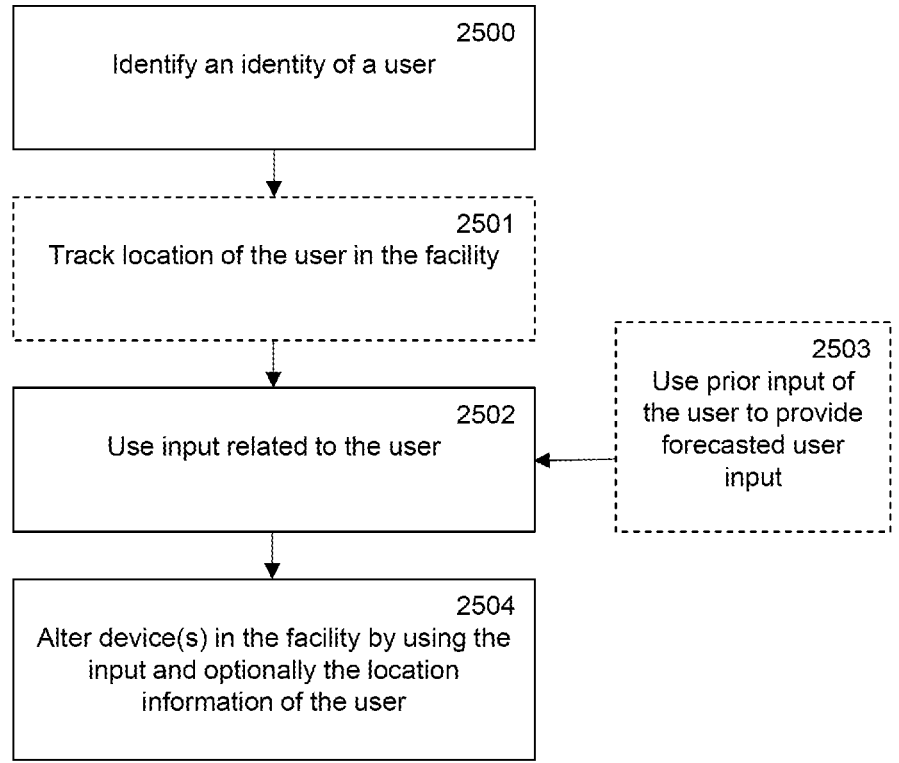
FIG. 25 shows a flow chart for a control method.

FIG. 25 shows an example of a flow chart depicting operations of a control system that is operatively coupled to one or more devices in an enclosure (e.g., a facility). In block 2500 an identify of a user is identified by a control system. The identity can be identified by one or more sensors (e.g., camera) and/or by an identification tag (e.g., by scanning or otherwise sensing by one or more sensors). In block 2501, a location of the user may optionally be tracked as the user spends time in the enclosure. The use may provide input as to any preference. The preference may be relating to a target apparatus, and/or environmental characteristics. A learning module may optionally track such preferences and provide predictions as to any future preference of the user in block 2503. Past elective preferences by the user may be recorded (e.g., in a database) and may be used as a learning set for the learning module. As the learning process progress over time and the user provides more and more inputs, the predictions of the learning module may increase in accuracy. The learning module may comprise any learning scheme (e.g., comprising artificial intelligence and/or machine learning) disclosed herein. The user may override recommendations and/or predictions made by the learning module. The user may provide manual input into the control system. In block 2502, the user input is provided (whether directly by the user or by predictions of the learning module) to the control system. The control system may alter (or direct alteration of) one or more devices in the facility to materialize the user preferences (e.g., input) by using the input. The control system may or may not use location of the user. The location may be a past location or a current location. For example, the user may enter a workplace by scanning a tag. Scanning of the identification tag (ID tag) can inform the control system of an identify of the user, and the location of the user at the time of scanning. The user may express a preference for a sound of a certain level that constitutes the input. The expression of preference may be by manual input (including tactile, voice and/or gesture command). A past expression of preference may be registered in a database and linked to the user. The user may enter a conference room at a prescheduled time. The sound level in the conference room may be adjusted to the user preference (i) when the prescheduled meeting was scheduled to initiate and/or (ii) when one or more sensors sense presence of the user in the meeting room. The sound level in the conference room may be return to a default level and/or adjusted to another's preference (i) when the prescheduled meeting was scheduled to end and/or (ii) when one or more sensors sense absence of the user in the meeting room.

In some embodiments, a user expresses at least one preference environmental characteristic(s) and/or target apparatus, which preference constitutes an input. The input may be by manual input (including tactile, voice and/or gesture command). A past expression of preference (e.g., input) may be registered in a database and linked to the user. The user may be part of a group of users. The group of users may be any grouping disclosed herein. The preference of the user may be linked to the group to which the user belongs. The user may enter an enclosure at a prescheduled time. The environmental characteristic(s) of the enclosure may be adjusted to the user preference (i) when the user was scheduled to enter the enclosure and/or (ii) when one or more sensors sense presence of the user in the enclosure. The environmental characteristic(s) of the enclosure may be return to a default level and/or adjusted to another's preference (i) when the scheduled presence of the user in the enclosure terminates and/or (ii) when one or more sensors sense absence of the user in the enclosure. The target apparatus may be adjusted to the user preference (i) when the user was scheduled to use the target apparatus and/or (ii) when one or more sensors sense presence of the user near the target apparatus (e.g., within a predetermined distance threshold). The target apparatus may return to default setting or be adjusted to another's preference (i) when the scheduled use of the target apparatus by the user ends and/or (ii) when one or more sensors sense absence of the user near the target apparatus (e.g., within a predetermined distance threshold).

In some embodiments, data is analyzed by a learning module. The data can be sensor data and/or user input. The user input may be regarding one or more preferred environmental characteristic and/or target apparatus. The learning module may comprise at least one rational decision making process, and/or learning that utilizes the data (e.g., as a learning set). The analysis of the data may be utilized to adjust and environment, e.g., by adjusting one or more components that affect the environment of the enclosure. The analysis of the data may be utilized to control a certain target apparatus, e.g., to produce a product, according to user preferences, and/or choose the certain target apparatus (e.g., based on user preference and/or user location). The data analysis may be performed by a machine based system (e.g., comprising a circuitry). The circuitry may be of a processor. The sensor data analysis may utilize artificial intelligence. The data analysis may rely on one or more models (e.g., mathematical models). In some embodiments, the data analysis comprises linear regression, least squares fit, Gaussian process regression, kernel regression, nonparametric multiplicative regression (NPMR), regression trees, local regression, semiparametric regression, isotonic regression, multivariate adaptive regression splines (MARS), logistic regression, robust regression, polynomial regression, step-wise regression, ridge regression, lasso regression, elasticnet regression, principal component analysis (PCA), singular value decomposition, fuzzy measure theory, Borel measure, Han measure, risk-neutral measure, Lebesgue measure, group method of data handling (GMDH), Naive Bayes classifiers, k-nearest neighbors algorithm (k-NN), support vector machines (SVMs), neural networks, support vector machines, classification and regression trees (CART), random forest, gradient boosting, or generalized linear model (GLM) technique. The data analysis may include a deep learning algorithm and/or artificial neural networks (ANN). The data analysis may comprise a learning schemes with a plurality of layers in the network (e.g., ANN). The learning of the learning module may be supervised, semi-supervised, or unsupervised. The deep learning architecture may comprise deep neural networks, deep belief networks, recurrent neural networks, or convolutional neural networks. The learning schemes may be ones utilized in computer vision, machine vision, speech recognition, natural language processing, audio recognition, social network filtering, machine translation, bioinformatics, drug design, medical image analysis, material inspection programs, and/or board game programs.

In some examples, a target apparatus is a tintable window (e.g., an electrochromic window). In some embodiments, a dynamic state of an electrochromic window is controlled by altering a voltage signal to an electrochromic device (ECD) used to provide tinting or coloring. An electrochromic window can be manufactured, configured, or otherwise provided as an insulated glass unit (IGU). IGUs may serve as the fundamental constructs for holding electrochromic panes (also referred to as "lites") when provided for installation in a building. An IGU lite or pane may be a single substrate or a multi-substrate construct, such as a laminate of two substrates. IGUs, especially those having double- or triple-pane configurations, can provide a number of advantages over single pane configurations; for example, multi-pane configurations can provide enhanced thermal insulation, noise insulation, environmental protection and/or durability when compared with single-pane configurations. A multi-pane configuration also can provide increased protection for an ECD, for example, because the electrochromic films, as well as associated layers and conductive interconnects, can be formed on an interior surface of the multi-pane IGU and be protected by an inert gas fill in the interior volume of the IGU.

In some embodiments, a tintable window exhibits a (e.g., controllable and/or reversible) change in at least one optical property of the window, e.g., when a stimulus is applied. The stimulus can include an optical, electrical and/or magnetic stimulus. For example, the stimulus can include an applied voltage. One or more tintable windows can be used to control lighting and/or glare conditions, e.g., by regulating the transmission of solar energy propagating through them. One or more tintable windows can be used to control a temperature within a building, e.g., by regulating the transmission of solar energy propagating through them. Control of the solar energy may control heat load imposed on the interior of the facility (e.g., building). The control may be manual and/or automatic. The control may be used for maintaining one or more requested (e.g., environmental) conditions, e.g., occupant comfort. The control may include reducing energy consumption of a heating, ventilation, air conditioning and/or lighting systems. At least two of heating, ventilation, and air conditioning may be induced by separate systems. At least two of heating, ventilation, and air conditioning may be induced by one system. The heating, ventilation, and air conditioning may be induced by a single system (abbreviated herein as "HVAC). In some cases, tintable windows may be responsive to (e.g., and communicatively coupled to) one or more environmental sensors and/or user control. Tintable windows may comprise (e.g., may be) electrochromic windows. The windows may be located in the range from the interior to the exterior of a structure (e.g., facility, e.g., building). However, this need not be the case. Tintable windows may operate using liquid crystal devices, suspended particle devices, microelectromechanical systems (MEMS) devices (such as micro-shutters), or any technology known now, or later developed, that is configured to control light transmission through a window. Examples of windows (e.g., with MEMS devices for tinting) are described in U.S. patent application Ser. No. 14/443,353 filed May 15, 2015, titled "MULTI-PANE WINDOWS INCLUDING ELECTROCHROMIC DEVICES AND ELECTROMECHANICAL SYSTEMS DEVICES," that is incorporated herein by reference in its entirety. In some cases, one or more tintable windows can be located within the interior of a building, e.g., between a conference room and a hallway. In some cases, one or more tintable windows can be used in automobiles, trains, aircraft, and other vehicles, e.g., in lieu of a passive and/or non-tinting window.

In some embodiments, the tintable window comprises an electrochromic device (referred to herein as an "EC device" (abbreviated herein as ECD, or "EC"). An EC device may comprise at least one coating that includes at least one layer. The at least one layer can comprise an electrochromic material. In some embodiments, the electrochromic material exhibits a change from one optical state to another, e.g., when an electric potential is applied across the EC device. The transition of the electrochromic layer from one optical state to another optical state can be caused, e.g., by reversible, semi-reversible, or irreversible ion insertion into the electrochromic material (e.g., by way of intercalation) and a corresponding injection of charge-balancing electrons. For example, the transition of the electrochromic layer from one optical state to another optical state can be caused, e.g., by a reversible ion insertion into the electrochromic material (e.g., by way of intercalation) and a corresponding injection of charge-balancing electrons. Reversible may be for the expected lifetime of the ECD. Semi-reversible refers to a measurable (e.g., noticeable) degradation in the reversibility of the tint of the window over one or more tinting cycles. In some instances, a fraction of the ions responsible for the optical transition is irreversibly bound up in the electrochromic material (e.g., and thus the induced (altered) tint state of the window is not reversible to its original tinting state). In various EC devices, at least some (e.g., all) of the irreversibly bound ions can be used to compensate for "blind charge" in the material (e.g., ECD).

In some implementations, suitable ions include cations. The cations may include lithium ions (Li+) and/or hydrogen ions (H+) (i.e., protons). In some implementations, other ions can be suitable. Intercalation of the cations may be into an (e.g., metal) oxide. A change in the intercalation state of the ions (e.g. cations) into the oxide may induce a visible change in a tint (e.g., color) of the oxide. For example, the oxide may transition from a colorless to a colored state. For example, intercalation of lithium ions into tungsten oxide (WO3-y (0<y≤~0.3)) may cause the tungsten oxide to change from a transparent state to a colored (e.g., blue) state.

EC device coatings as described herein are located within the viewable portion of the tintable window such that the tinting of the EC device coating can be used to control the optical state of the tintable window.

Figure 21:
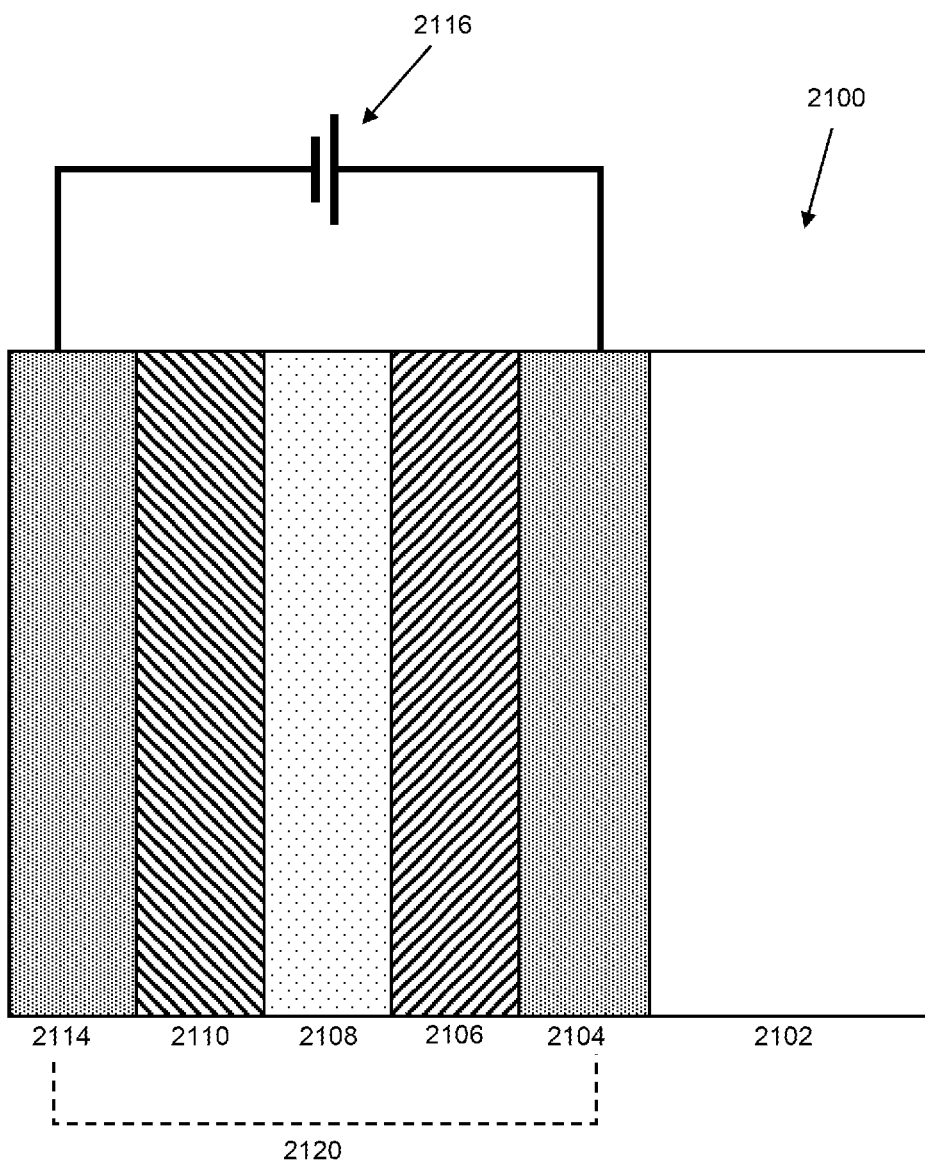
FIG. 21 schematically shows an electrochromic device.

FIG. 21 shows an example of a schematic cross-section of an electrochromic device 2100 in accordance with some embodiments. The EC device coating is attached to a substrate 2102, a transparent conductive layer (TCL) 2104, an electrochromic layer (EC) 2106 (sometimes also referred to as a cathodically coloring layer or a cathodically tinting layer), an ion conducting layer or region (IC) 2108, a counter electrode layer (CE) 2110 (sometimes also referred to as an anodically coloring layer or anodically tinting layer), and a second TCL 2114. Elements 2104, 2106, 2108, 2110, and 2114 are collectively referred to as an electrochromic stack 2120. A voltage source 2116 operable to apply an electric potential across the electrochromic stack 2120 effects the transition of the electrochromic coating from, e.g., a clear state to a tinted state. In other embodiments, the order of layers is reversed with respect to the substrate. That is, the layers are in the following order: substrate, TCL, counter electrode layer, ion conducting layer, electrochromic material layer, TCL. In various embodiments, the ion conductor region (e.g., 2108) may form from a portion of the EC layer region (e.g., 2106) and/or from a portion of the CE layer (e.g., 2110). In such embodiments, the electrochromic stack (e.g., 2120) may be deposited to include cathodically coloring electrochromic material (the EC layer) in direct physical contact with an anodically coloring counter electrode material (the CE layer). The ion conductor region (sometimes referred to as an interfacial region, or as an ion conducting substantially electronically insulating layer or region) may form where the EC layer and the CE layer meet, for example through heating and/or other processing steps. Examples of electrochromic devices (e.g., including those fabricated without depositing a distinct ion conductor material) can be found in U.S. patent application Ser. No. 13/462,725 filed May 2, 2012, titled "ELECTROCHROMIC DEVICES," that is incorporated herein by reference in its entirety. In some embodiments, an EC device coating may include one or more additional layers such as one or more passive layers. Passive layers can be used to improve certain optical properties, to provide moisture, and/or to provide scratch resistance. These and/or other passive layers can serve to hermetically seal the EC stack 2120. Various layers, including transparent conducting layers (such as 2104 and 2114), can be treated with anti-reflective and/or protective layers (e.g., oxide and/or nitride layers).

In some embodiments, an IGU includes two (or more) substantially transparent substrates. For example, the IGU may include two panes of glass. At least one substrate of the IGU can include an electrochromic device disposed thereon. The one or more panes of the IGU may have a separator disposed between them. An IGU can be a hermetically sealed construct, e.g., having an interior region that is isolated from the ambient environment. A "window assembly" may include an IGU. A "window assembly" may include a (e.g., stand-alone) laminate. A "window assembly" may include one or more electrical leads, e.g., for connecting the IGUs and/or laminates. The electrical leads may operatively couple (e.g. connect) one or more electrochromic devices to a voltage source, switches and the like, and may include a frame that supports the IGU or laminate. A window assembly may include a window controller, and/or components of a window controller (e.g., a dock).

Figure 22:
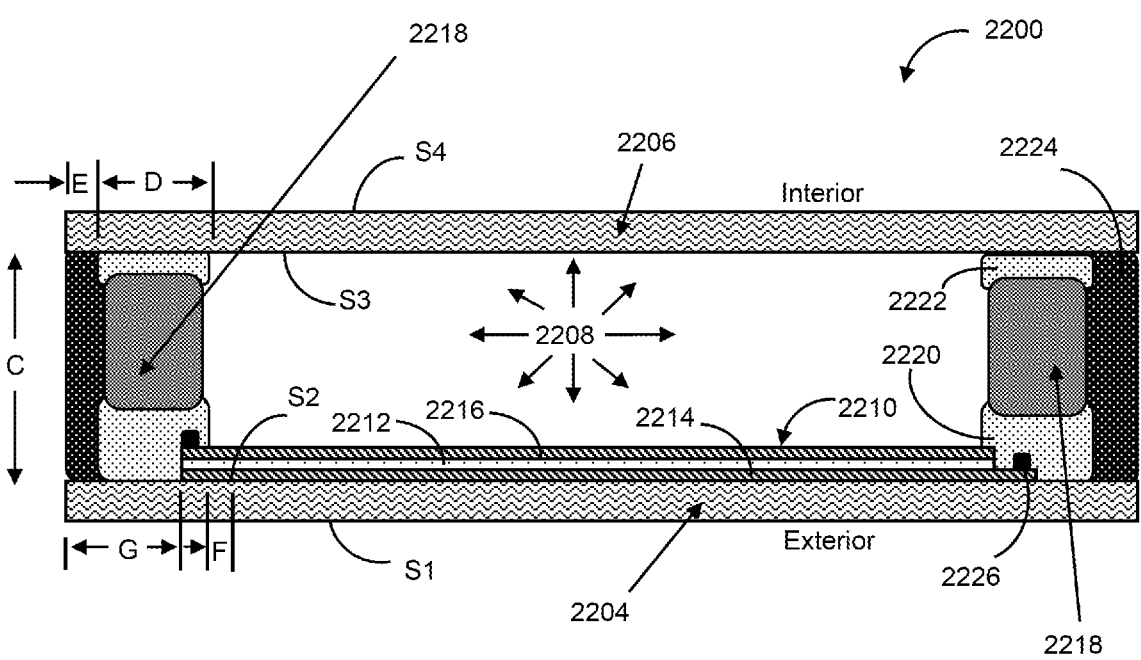
FIG. 22 shows a cross-sectional view of an example electrochromic window.

FIG. 22 shows an example implementation of an IGU 2200 that includes a first pane 2204 having a first surface 51 and a second surface S2. In some implementations, the first surface 51 of the first pane 2204 faces an exterior environment, such as an outdoors or outside environment. The IGU 2200 also includes a second pane 2206 having a first surface S3 and a second surface S4. In some implementations, the second surface S4 of the second pane 2206 faces an interior environment, such as an inside environment of a home, building or vehicle, or a room or compartment within a home, building or vehicle.

In some embodiments, (e.g., each of the) first and/or the second panes 2204 and 2206 are transparent and/or translucent to light, e.g., in the visible spectrum. For example, (e.g., each of the) first and/or second panes 2204 and 2206 can be formed of a glass material (e.g., an architectural glass or other shatter-resistant glass material such as, for example, a silicon oxide $(SO_x)$-based glass material. The (e.g., each of the) first and/or second panes 2204 and 2206 may be a soda-lime glass substrate or float glass substrate. Such glass substrates can be composed of, for example, approximately 75% silica $(SiO_2)$ as well as $Na_2O$, CaO, and several minor additives. However, the (e.g., each of the) first and/or the second panes 2204 and 2206 can be formed of any material having suitable optical, electrical, thermal, and mechanical properties. For example, other suitable substrates that can be used as one or both of the first and the second panes 2204 and 2206 can include other glass materials as well as plastic, semi-plastic and thermoplastic materials (for example, poly (methyl methacrylate), polystyrene, polycarbonate, allyl diglycol carbonate, SAN (styrene acrylonitrile copolymer), poly(4-methyl-1-pentene), polyester, polyamide), and/or mirror materials. In some embodiments, (e.g., each of the) first and/or the second panes 2204 and 2206 can be strengthened, for example, by tempering, heating, or chemically strengthening.

In FIG. 22, first and second panes 2204 and 2206 are spaced apart from one another by a spacer 2218, which is typically a frame structure, to form an interior volume 2208. In some embodiments, the interior volume is filled with Argon (Ar) or another gas, such as another noble gas (for example, krypton (Kr) or xenon (Xn)), another (non-noble) gas, or a mixture of gases (for example, air). Filling the interior volume 2208 with a gas such as Ar, Kr, or Xn can reduce conductive heat transfer through the IGU 2200. Without wishing to be bound to theory, this may be because of the low thermal conductivity of these gases as well as improve acoustic insulation, e.g., due to their increased atomic weights. In some embodiments, the interior volume 2208 can be evacuated of air or other gas. Spacer 2218 generally determines the height "C" of the interior volume 2208 (e.g., the spacing between the first and the second panes 2204 and 2206). In FIG. 22, the thickness (and/or relative thickness) of the ECD, sealant 2220/2222 and bus bars 2226/2228 may not be to scale. These components are generally thin and are exaggerated here, e.g., for ease of illustration only. In some embodiments, the spacing "C" between the first and the second panes 2204 and 2206 is in the range of approximately 6 mm to approximately 30 mm. The width "D" of spacer 2218 can be in the range of approximately 5 mm to approximately 15 mm (although other widths are possible and may be desirable). Spacer 2218 may be a frame structure formed around all sides of the IGU 2200 (for example, top, bottom, left and right sides of the IGU 100). For example, spacer 2218 can be formed of a foam or plastic material. In some embodiments, spacer 2218 can be formed of metal or other conductive material, for example, a metal tube or channel structure having at least 3 sides, two sides for sealing to each of the substrates and one side to support and separate the lites and as a surface on which to apply a sealant, 2224. A first primary seal 2220 adheres and hermetically seals spacer 2218 and the second surface S2 of the first pane 2204. A second primary seal 2222 adheres and hermetically seals spacer 2218 and the first surface S3 of the second pane 2206. In some implementations, each of the primary seals 2220 and 2222 can be formed of an adhesive sealant such as, for example, polyisobutylene (PIB). In some implementations, IGU 2200 further includes secondary seal 2224 that hermetically seals a border around the entire IGU 2200 outside of spacer 2218. To this end, spacer 2218 can be inset from the edges of the first and the second panes 2204 and 2206 by a distance "E." The distance "E" can be in the range of approximately four (4) millimeters (mm) to approximately eight (8) mm (although other distances are possible and may be desirable). In some implementations, secondary seal 2224 can be formed of an adhesive sealant such as, for example, a polymeric material that resists water and that adds structural support to the assembly, such as silicone, polyurethane and similar structural sealants that form a water-tight seal.

In the example of FIG. 22, the ECD coating on surface S2 of substrate 2204 extends about its entire perimeter to and under spacer 2218. This configuration is functionally desirable as it protects the edge of the ECD within the primary sealant 2220 and aesthetically desirable because within the inner perimeter of spacer 2218 there is a monolithic ECD without any bus bars or scribe lines.

Configuration examples of IGUs are described in U.S. Pat. No. 8,164,818, issued Apr. 24, 2012 and titled ELECTROCHROMIC WINDOW FABRICATION METHODS, U.S. patent application Ser. No. 13/456,056 filed Apr. 25, 2012 and titled ELECTROCHROMIC WINDOW FABRICATION METHODS, PCT Patent Application No. PCT/US2012/068817 filed Dec. 10, 2012 and titled THIN-FILM DEVICES AND FABRICATION, U.S. Pat. No. 9,454,053, issued Sep. 27, 2016 and titled THIN-FILM DEVICES AND FABRICATION, and PCT Patent Application No. PCT/US2014/073081, filed Dec. 13, 2014 and titled THIN-FILM DEVICES AND FABRICATION, each of which is hereby incorporated by reference in its entirety.

In the example shown in FIG. 22, an ECD 2210 is formed on the second surface S2 of the first pane 2204. The ECD 2210 includes an electrochromic ("EC") stack 2212, which itself may include one or more layers. For example, the EC stack 2212 can include an electrochromic layer, an ion-conducting layer, and a counter electrode layer. The electrochromic layer may be formed of one or more inorganic solid materials. The electrochromic layer can include or be formed of one or more of a number of electrochromic materials, including electrochemically-cathodic or electrochemically-anodic materials. EC stack 2212 may be between first and second conducting (or "conductive") layers. For example, the ECD 2210 can include a first transparent conductive oxide (TCO) layer 2214 adjacent a first surface of the EC stack 2212 and a second TCO layer 2216 adjacent a second surface of the EC stack 2212. An example of similar EC devices and smart windows can be found in U.S. Pat. No. 8,764,950, titled ELECTROCHROMIC DEVICES, by Wang et al., issued Jul. 1, 2214 and U.S. Pat. No. 9,261,751, titled ELECTROCHROMIC DEVICES, by Pradhan et al., issued Feb. 16, 2216, which is incorporated herein by reference in its entirety. In some implementations, the EC stack 2212 also can include one or more additional layers such as one or more passive layers. For example, passive layers can be used to improve certain optical properties, to provide moisture or to provide scratch resistance. These or other passive layers also can serve to hermetically seal the EC stack 2212.

In some embodiments, the selection or design of the electrochromic and counter electrode materials generally governs the possible optical transitions. During operation, in response to a voltage generated across the thickness of the EC stack (for example, between the first and the second TCO layers), the electrochromic layer transfers or exchanges ions to or from the counter electrode layer to drive the electrochromic layer to the desired optical state. To cause the EC stack to transition to a transparent state, a positive voltage may be applied across the EC stack (for example, such that the electrochromic layer is more positive than the counter electrode layer). In some embodiments, in response to the application of the positive voltage, the available ions in the stack reside primarily in the counter electrode layer. When the magnitude of the potential across the EC stack is reduced or when the polarity of the potential is reversed, ions may be transported back across the ion conducting layer to the electrochromic layer causing the electrochromic material to transition to an opaque state (or to a "more tinted," "darker" or "less transparent" state). Conversely, in some embodiments using electrochromic layers having different properties, to cause the EC stack to transition to an opaque state, a negative voltage is applied to the electrochromic layer relative to the counter electrode layer. For example, when the magnitude of the potential across the EC stack is reduced or its polarity reversed, the ions may be transported back across the ion conducting layer to the electrochromic layer causing the electrochromic material to transition to a clear or "bleached" state (or to a "less tinted", "lighter" or "more transparent" state).

In some implementations, the transfer or exchange of ions to or from the counter electrode layer also results in an optical transition in the counter electrode layer. For example, in some implementations the electrochromic and counter electrode layers are complementary coloring layers. More specifically, in some such implementations, when or after ions are transferred into the counter electrode layer, the counter electrode layer becomes more transparent, and similarly, when or after the ions are transferred out of the electrochromic layer, the electrochromic layer becomes more transparent. Conversely, when the polarity is switched, or the potential is reduced, and the ions are transferred from the counter electrode layer into the electrochromic layer, both the counter electrode layer and the electrochromic layer become less transparent.

In some embodiments, the transition of the electrochromic layer from one optical state to another optical state is caused by reversible ion insertion into the electrochromic material (for example, by way of intercalation) and a corresponding injection of charge-balancing electrons. For example, some fraction of the ions responsible for the optical transition may be irreversibly bound up in the electrochromic material. In some embodiments, suitable ions include lithium ions (Li+) and hydrogen ions (H+) (i.e., protons). In some other implementations, other ions can be suitable. Intercalation of lithium ions, for example, into tungsten oxide ($WO_{3-y}$ ($0 < y \leq \sim 0.3$)) causes the tungsten oxide to change from a transparent state to a blue state.

In some embodiments, a tinting transition is a transition from a transparent (or "translucent," "bleached" or "least tinted") state to an opaque (or "fully darkened" or "fully tinted") state. Another example of a tinting transition is the reverse (e.g., a transition from an opaque state to a transparent state). Other examples of tinting transitions include transitions to and from various intermediate tint states, for example, a transition from a less tinted, lighter or more transparent state to a more tinted, darker or less transparent state, and vice versa. Each of such tint states, and the tinting transitions between them, may be characterized or described in terms of percent transmission. For example, a tinting transition can be described as being from a current percent transmission (% T) to a target T. Conversely, in some other instances, each of the tint states and the tinting transitions between them may be characterized or described in terms of percent tinting; for example, a transition from a current percent tinting to a target percent tinting.

In some embodiments, a voltage applied to the transparent electrode layers (e.g. across the EC stack) follows a control profile used to drive a transition in an optically switchable device. For example, a window controller can be used to generate and apply the control profile to drive an ECD from a first optical state (for example, a transparent state or a first intermediate state) to a second optical state (for example, a fully tinted state or a more tinted intermediate state). To drive the ECD in the reverse direction—from a more tinted state to a less tinted state—the window controller can apply a similar but inverted profile. In some embodiments, the control profiles for tinting and lightening can be asymmetric. For example, transitioning from a first more tinted state to a second less tinted state can in some instances require more time than the reverse; that is, transitioning from the second less tinted state to the first more tinted state. In some embodiments, the reverse may be true. Transitioning from the second less tinted state to the first more tinted state can require more time. By virtue of the device architecture and materials, bleaching or lightening may not necessarily (e.g., simply) the reverse of coloring or tinting. Indeed, ECDs often behave differently for each transition due to differences in driving forces for ion intercalation and deintercalation to and from the electrochromic materials.

Figure 23:
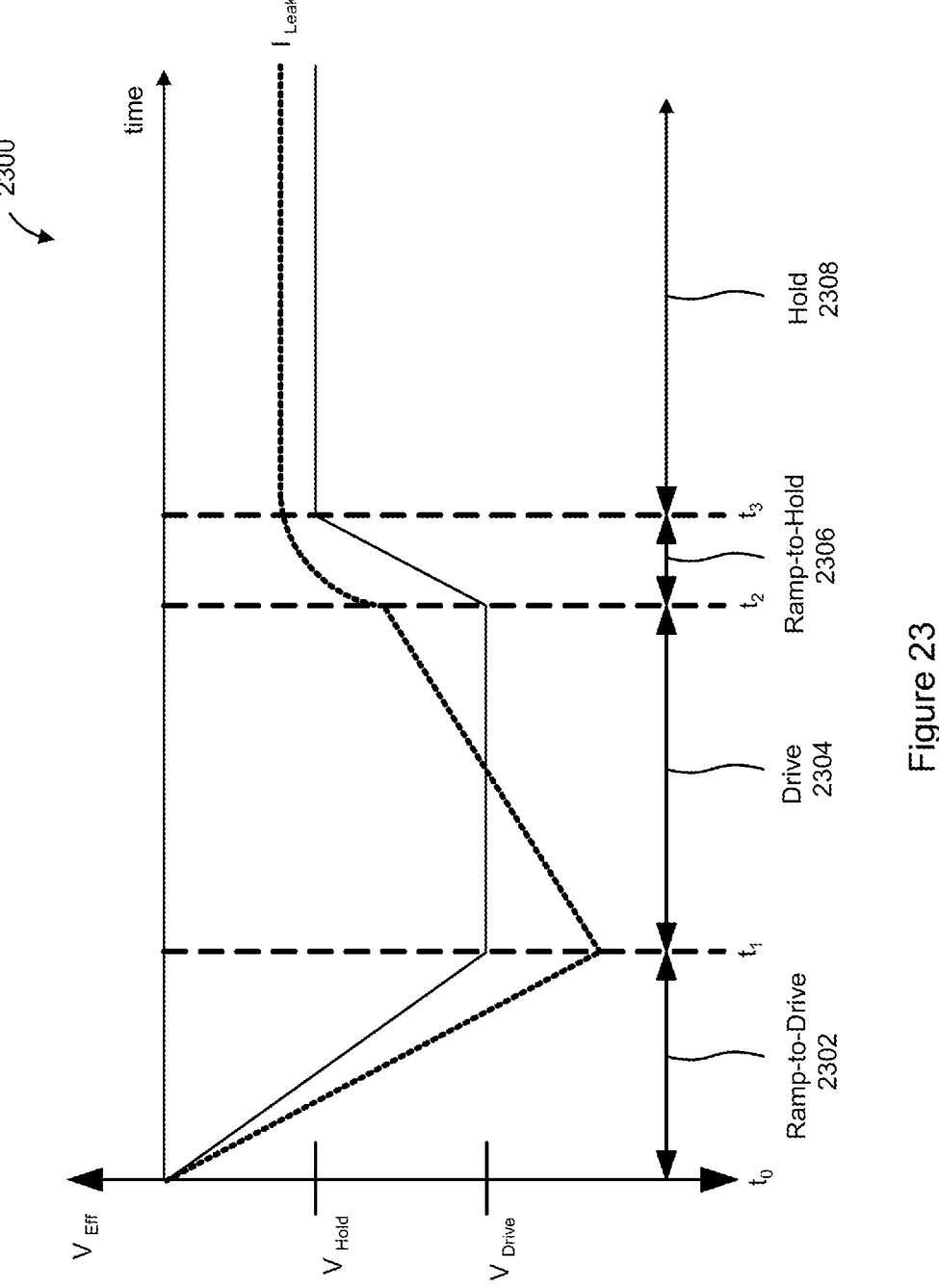
FIG. 23 illustrates a voltage profile as a function of time.

FIG. 23 shows an example control profile 2300 as a voltage control profile implemented by varying a voltage provided to the ECD. For example, the solid line in FIG. 23 represents an effective voltage $V_{Eff}$ applied across the ECD over the course of a tinting transition and a subsequent maintenance period. For example, the solid line can represent the relative difference in the electrical voltages $V_{App1}$ and $V_{App2}$ applied to the two conducting layers of the ECD. The dotted line in FIG. 23 represents a corresponding current (1) through the device. In the illustrated example, the voltage control profile 2300 includes four stages: a ramp-to-drive stage 2302 that initiates the transition, a drive stage that continues to drive the transition, a ramp-to-hold stage, and subsequent hold stage.

In FIG. 23, the ramp-to-drive stage 2302 is characterized by the application of a voltage ramp that increases in magnitude from an initial value at time $t_0$ to a maximum driving value of $V_{Drive}$ at time $t_1$. For example, the ramp-to-drive stage 2302 can be defined by three drive parameters known or set by the window controller: the initial voltage at to (the current voltage across the ECD at the start of the transition), the magnitude of $V_{Drive}$ (governing the ending optical state), and the time duration during which the ramp is applied (dictating the speed of the transition). The window controller may also set a target ramp rate, a maximum ramp rate or a type of ramp (for example, a linear ramp, a second degree ramp or an $n^{th}$-degree ramp). In some embodiments, the ramp rate can be limited to avoid damaging the ECD.

In FIG. 23, the drive stage 2304 includes application of a constant voltage $V_{Drive}$ starting at time $t_1$ and ending at time $t_2$, at which point the ending optical state is reached (or approximately reached). The ramp-to-hold stage 2306 is characterized by the application of a voltage ramp that decreases in magnitude from the drive value $V_{Drive}$ at time $t_2$ to a minimum holding value of $V_{Hold}$ at time $t_3$. In some embodiments, the ramp-to-hold stage 2306 can be defined by three drive parameters known or set by the window controller: the drive voltage $V_{Drive}$, the holding voltage $V_{Hold}$, and the time duration during which the ramp is applied. The window controller may also set a ramp rate or a type of ramp (for example, a linear ramp, a second degree ramp or an $n^{th}$-degree ramp).

In FIG. 23, the hold stage 2308 is characterized by the application of a constant voltage $V_{Hold}$ starting at time $t_3$. The holding voltage $V_{Hold}$ may be used to maintain the ECD at the ending optical state. As such, the duration of the application of the holding voltage $V_{hold}$ may be concomitant with the duration of time that the ECD is to be held in the ending optical state. For example, because of non-idealities associated with the ECD, a leakage current $I_{Leak}$ can result in the slow drainage of electrical charge from the ECD. Such a drainage of electrical charge can result in a corresponding reversal of ions across the ECD, and consequently, a slow reversal of the optical transition. The holding voltage $V_{Hold}$ can be continuously applied to counter or prevent the leakage current. In some embodiments, the holding voltage $V_{Hold}$ is applied periodically to "refresh" the desired optical state, or in other words, to bring the ECD back to the desired optical state.

The voltage control profile 2300 illustrated and described with reference to FIG. 23 is only one example of a voltage control profile suitable for some implementations. However, many other profiles may be desirable or suitable in such implementations or in various other implementations or applications. These other profiles also can readily be achieved using the controllers and optically switchable devices disclosed herein. For example, a current profile can be applied instead of a voltage profile. In some embodiments, a current control profile similar to that of the current density shown in FIG. 23 can be applied. In some embodiments, a control profile can have more than four stages. For example, a voltage control profile can include one or more overdrive stages. For example, the voltage ramp applied during the first stage 2302 can increase in magnitude beyond the drive voltage $V_{Drive}$ to an overdrive voltage $V_{OD}$. The first stage 2302 may be followed by a ramp stage 2303 during which the applied voltage decreases from the overdrive voltage $V_{OD}$ to the drive voltage $V_{Drive}$. In some embodiments, the overdrive voltage $V_{OD}$ can be applied for a relatively short time duration before the ramp back down to the drive voltage $V_{Drive}$.

In some embodiments, the applied voltage or current profiles are interrupted for relatively short durations of time to provide open circuit conditions across the device. While such open circuit conditions are in effect, an actual voltage or other electrical characteristics can be measured, detected, or otherwise determined to monitor how far along an optical transition has progressed, and in some instances, to determine whether changes in the profile are desirable. Such open circuit conditions also can be provided during a hold stage to determine whether a holding voltage $V_{Hold}$ should be applied or whether a magnitude of the holding voltage $V_{Hold}$ should be changed. Examples related to controlling optical transitions is provided in PCT Patent Application No. PCT/US14/43514 filed Jun. 20, 2014 and titled CONTROLLING TRANSITIONS IN OPTICALLY SWITCHABLE DEVICES, which is hereby incorporated by reference in its entirety.

In one or more aspects, one or more of the functions described herein may be implemented in hardware, digital electronic circuitry, analog electronic circuitry, computer software, firmware, including the structures disclosed in this specification and their structural equivalents thereof, or in any combination thereof. Certain implementations of the subject matter described in this document also can be implemented as one or more controllers, computer programs, or physical structures, for example, one or more modules of computer program instructions, encoded on a computer storage media for execution by, or to control the operation of window controllers, network controllers, and/or antenna controllers. Any disclosed implementations presented as or for electrochromic windows can be more generally implemented as or for switchable optical devices (including windows, mirrors, etc.).

Various modifications to the embodiments described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the devices as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this does not necessarily mean that the operations are required to be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method for controlling an interactive target of a facility, the method comprising:

monitoring a location of a mobile circuitry relative to a digital twin that comprises a virtual three dimensional representation of a structural feature of the facility having a real interactive target, wherein the mobile circuitry (I) is movable by a user, (II) has a known location relative to at least a portion of the structural feature, and (III) is coupled to a virtual representation of the real interactive target in the digital twin;

relating a gesture imparted on the mobile circuitry to the digital twin and generating a result, wherein the gesture (i) is imparted by the user, (ii) is signifies a remote input to the real interactive target to cause an alteration of the real interactive target, and (iii) is during coupling with the real interactive target, wherein generating the result comprises determining an action by the virtual representation of the real interactive target that would result from the gesture; and using the result to alter a current state of the real interactive target in the facility, based at least in part on the determined action.

2. The method of claim 1, wherein the facility comprises a control network that is communicatively coupled to the real interactive target to support monitoring location of the mobile circuitry, and/or to support altering the current state of the real interactive target.

3. The method of claim 1, wherein the mobile circuitry:

is included in a handheld pointing device, in a mobile phone, in a handheld gaming controller having a motion function and a clicking/select function, in a laptop computer, in a tablet computer, in a virtual reality (V/R) interface that comprises a display headset, a handheld controller with a motion function, or a select function;

includes, or is coupled to, a motion sensor; and/or is not using an electromagnetic beam or a sonic beam.

4. The method of claim 1, wherein the gesture comprises movement, and wherein the location relative to the structural feature of the facility is established at a first time, and the relative location is maintained as the mobile circuitry moves locally in the facility or remotely from the facility.

5. The method of claim 1, wherein coupling of the mobile circuitry to the virtual representation of the real interactive target in the digital twin is comprised of (i) a spatial relationship between the mobile circuitry and the at least the portion of the structural feature identified in at least two dimensions and (ii) a relative pointing direction of the mobile circuitry to the real interactive target.

6. The method of claim 1, wherein the current state being altered comprises a command setting of an environmental control unit.

7. The method of claim 6, wherein the command setting comprises a tint density of a tintable window, a temperature setting of an HVAC unit, a fan setting of an HVAC unit, or an on/off setting of a lighting unit.

8. The method of claim 6, wherein the environmental control unit controls an environment of the facility.

9. The method of claim 1, further comprising exchanging one or more messages between the digital twin and the mobile circuitry to provide an analysis to the mobile circuitry corresponding to an initial virtual location, and navigate virtually in the digital twin to interact with the virtual representation of the real interactive target in the digital twin.

10. The method of claim 9, wherein the user manipulating the mobile circuitry is located distant from the known location, and wherein the initial virtual location is aligned to a virtual representation of the known location in the digital twin.

11. The method of claim 1, wherein the digital twin comprises virtual three dimensional representations of a plurality of structural features of the facility including a plurality of real interactive targets, and wherein the virtual three dimensional representations are modified in response to addition and/or subtraction of the real interactive targets in the facility.

12. The method of claim 1, wherein the real interactive target comprises a media display, wherein coupling of the mobile circuitry to the virtual representation of the real interactive target in the digital twin includes a selection of an active media element in the media display.

13. The method of claim 12, wherein selection of the active media element comprises a pointing motion, a movement motion, or a clicking action.

14. An apparatus for controlling an interactive target of a facility, the apparatus comprising one or more controllers comprising circuitry, wherein the one or more controllers are configured to:

communicatively couple to a digital twin that comprises a virtual three dimensional representation of a structural feature of the facility having a real interactive target, and to a mobile circuitry that (I) is movable by a user, (II) has a known location relative to at least a portion of the structural feature, and (III) is coupled to a virtual representation of the real interactive target in the digital twin;

monitor, or direct monitoring of, a location of the mobile circuitry relative to the digital twin;

relate, or direct relating, a gesture imparted on the mobile circuitry to the digital twin and generate a result, wherein the gesture (i) is imparted by the user, (ii) signifies a remote input to the real interactive target to cause an alteration of the real interactive target, and (iii) is during user coupling with the real interactive target, wherein generating the result comprises determining an action by the virtual representation of the real interactive target that would result from the gesture; and use the result to alter, or direct alteration of, a current state of the real interactive target in the facility, based at least in part on the determined action.

15. The apparatus of claim 14, wherein:

the one or more controllers are interconnected in a network disposed in the facility, and the network is disposed at least in part in an envelope of the facility, in an electrical shaft, communication shaft, elevator shaft, and/or in an electrical room.

16. The apparatus of claim 14, wherein the real interactive target comprises a media display, wherein the digital twin is configured to identify a selection of an active media element in the media display.

17. The apparatus of claim 14, wherein the one or more controllers are configured to alter the current state of a command setting of an environmental control unit that is configured to control an environment of the facility.

18. The apparatus of claim 17, wherein the command state is a (i) a tint density of a tintable window, (ii) a temperature setting of an HVAC unit, (iii) a fan setting of an HVAC unit, or (iv) an on/off setting of a lighting unit.

19. The apparatus of claim 14, wherein the mobile circuitry is included in a handheld pointing device, in a mobile phone, in a handheld gaming controller having a motion function and a clicking/select function, in a laptop computer, in a tablet computer, in a virtual reality (VR) interface that comprises a display headset, a handheld controller with a motion function, or a select function, a handheld controller with a motion function, or a select function, the mobile circuitry includes, or is coupled to, a motion sensor, or the mobile circuitry is not using an electromagnetic beam or a sonic beam.

20. A method for controlling a real interactive target of a facility, the method comprising:

monitoring a location of a mobile circuitry relative to a digital twin that comprises a virtual three dimensional representation of a structural feature of the facility having the real interactive target, wherein the mobile circuitry (I) is movable by a user, (II) has a known location relative to at least a portion of the structural feature, and (III) is coupled to a virtual representation of the real interactive target in the digital twin;

relating a gesture imparted on the mobile circuitry to the digital twin and generating a result, wherein the gesture (i) is imparted by the user, (ii) is representative of an indication to remotely cause an alteration of the real interactive target, and (iii) is during coupling with the real interactive target; and using the result to alter a current state of the real interactive target in the facility, wherein the current state being altered comprises a tint of an optically tintable window.

21. The method of claim 20, wherein the optically tintable window comprises an electrochromic window.

* * * * *